Figure 3:
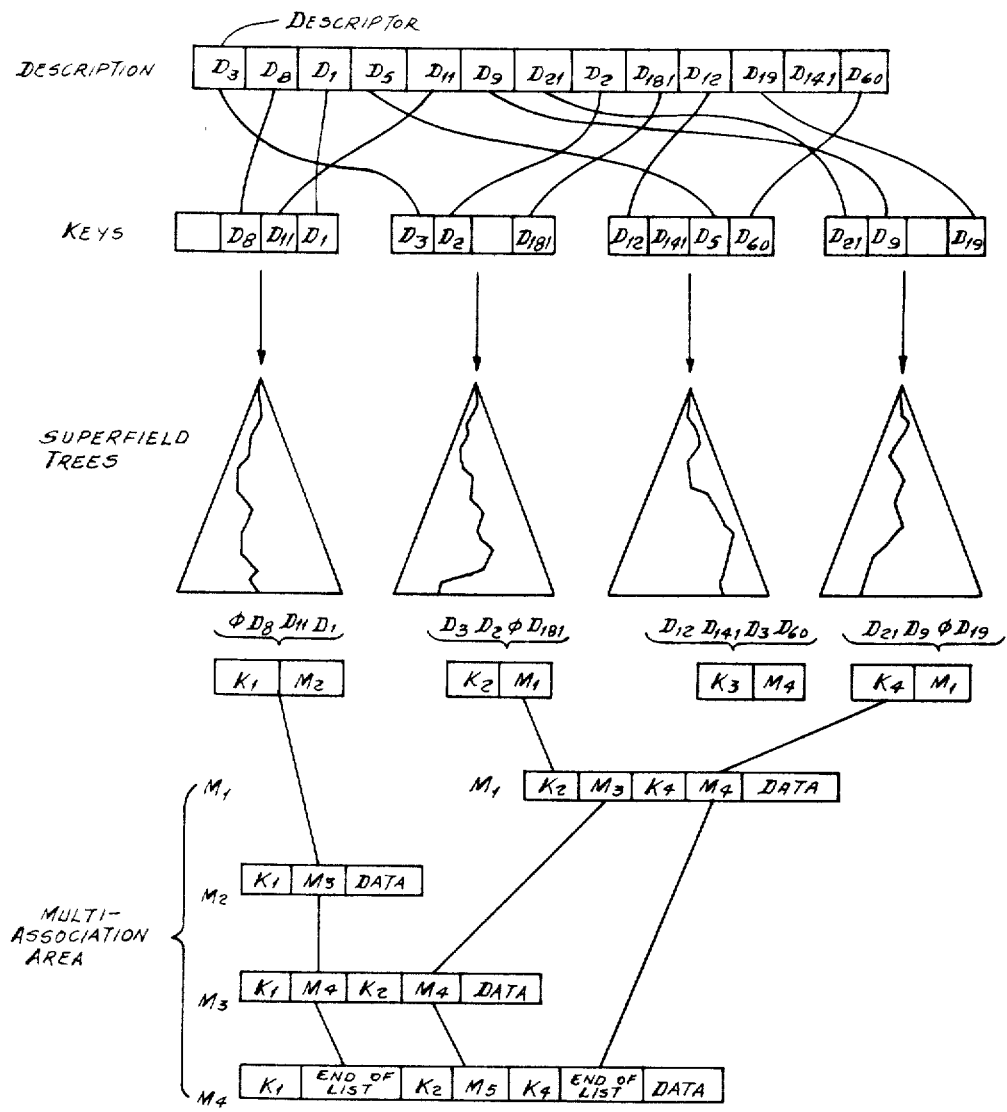

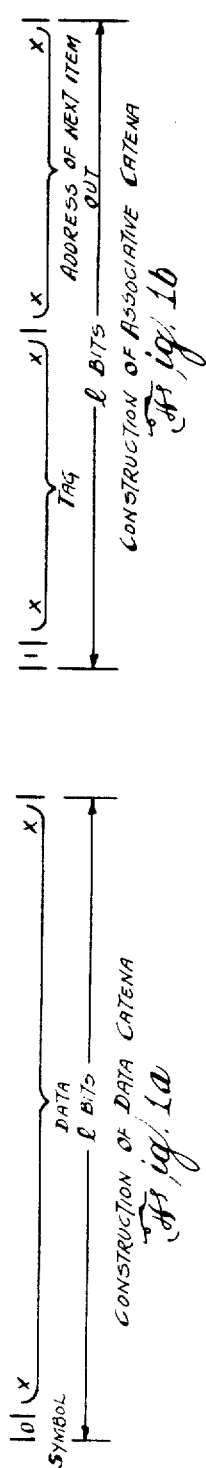
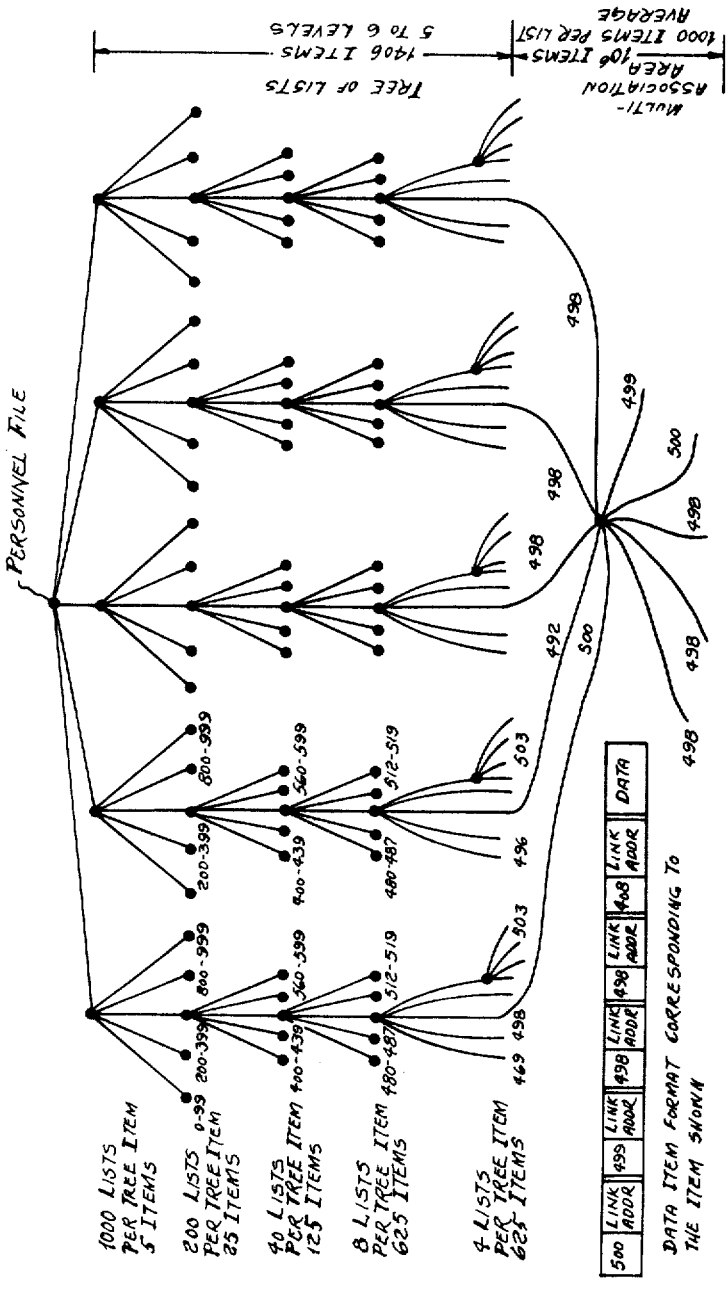

INVENTORS.
NOAH S. PRYWES
SAMUEL LITWIN
HARRY J. GRAY, JR.

BY
ATTORNEY

INVENTORS.
NOAH S. PRYWES
SAMUEL LITWIN
HARRY J. GRAY, JR.

BY

ATTORNEY

INVENTORS.
NOAH S. PRYWES
SAMUEL LITWIN
HARRY J. GRAY, JR.

ATTORNEY

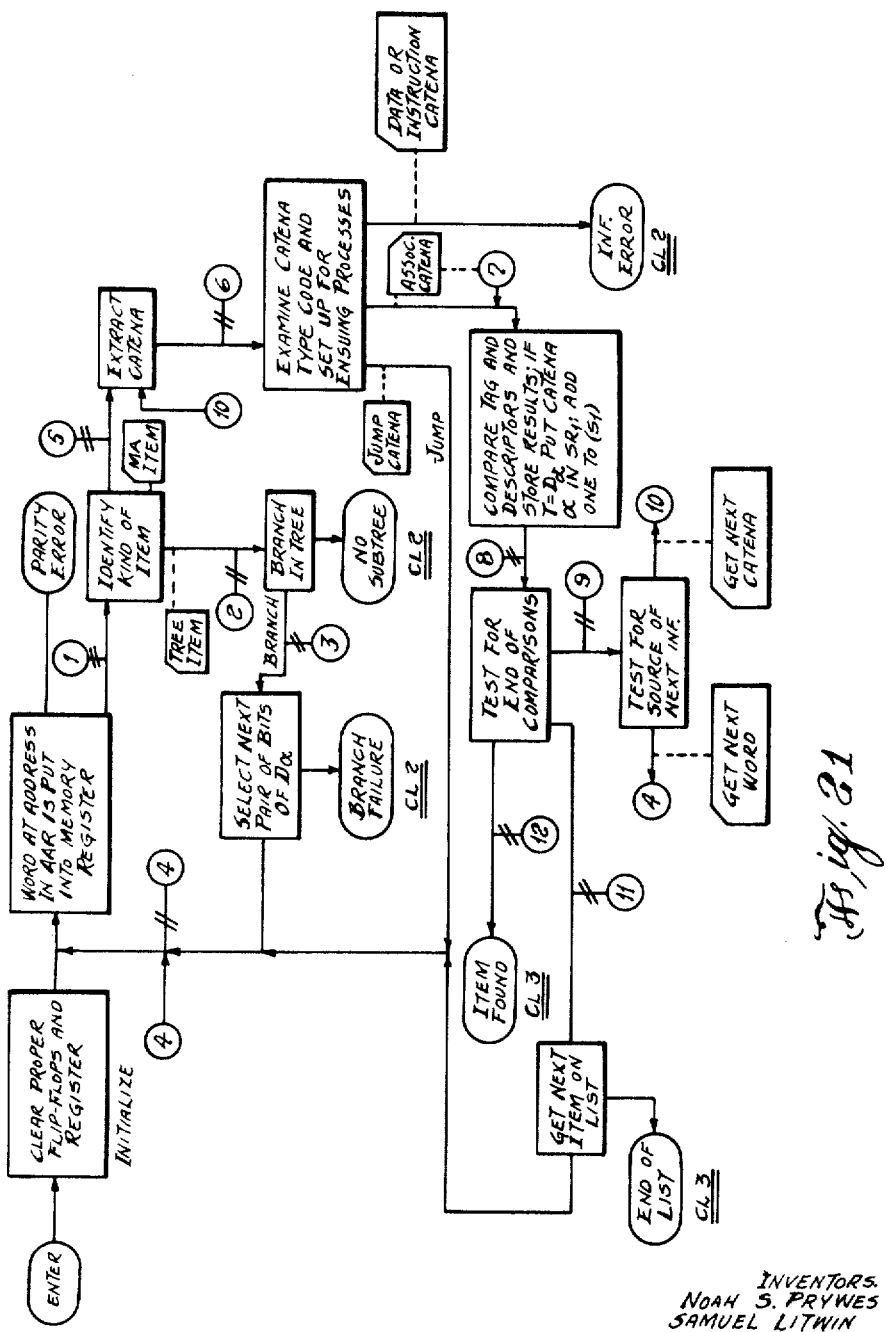

United States Patent Office 3,388,381
Patented June 11, 1968

3,388,381
DATA PROCESSING MEANS
Noah S. Prywes, Cynwyd, Samuel Litwin, Philadelphia, and Harry J. Gray, Jr., Springfield, Pa., assignors, by mesne assignments, to the United States of America as represented by the Secretary of the Navy
Filed Dec. 31, 1962, Ser. No. 248,825
5 Claims. (Cl. 340—172.5)

The invention described herein may be manufactured and used by or for the Government of the United States of America for governmental purposes without the payment of any royalties thereon or therefor.

This invention relates to improvements in computer systems, and more particularly pertains to data processing means operating with an associative memory rather than an addressable memory.

While a computer can store large amounts of information, there remains a need for mechanizing the "conversation" by which the computer conveys the appropriate intelligence in response to many human inquiries made simultaneously from several different origin consoles. Optimally, a large expandable vocabulary wherein the human operators use a restricted language that can be divided into command and descriptive languages, the vocabularies of which are made of words that must have unique meanings in given contexts, will permit the smooth and easy flow of "conversation."

The object of this invention is to provide an information retrieval system wherein retrieval requests can be processed by giving a partial description of the desired items; wherein there is immediate response to single retrieval requests and their processing on a real-time basis; and wherein their is immediate response to a file change, add or delete orders, again on a real-time basis.

Another object is to provide means to mechanize, for performance by a computer, tasks hitherto performed by humans. For example, the Navy Supply Technical Information File is currently being updated quarterly mechanically, while personnel keep notes about changes in the file between updatings. Along with this partly mechanized system, the manual search involved in retrieval is generally lengthy and laborious, involving large numbers and varieties of documents. Considerable savings in time resulting from more efficient maintenance of stocks could be obtained through complete mechanization. The mechanized system of this invention allows clerks to introduce changes, additions and deletions as well as interrogate the file on a real-time basis. Interrogation is based on, for instance, partial description of an electronic or a mechanical part and results in retrieval of other associated information.

A further object is to provide improved data processing and retrieval systems for collections such as personnel files, customers' files, and the Armed Services Technical Information Agency system.

Another object is to meet the need for real-time file retrieval addition and deletion that is also common to artificial intelligence problems where the completion of such processes is necessary before the next step in the procedure is undertaken.

Still another object is to increase efficiency, in terms of speed of processing of the problem and cost, and to facilitate communication with the computer, in a system employing less than ten thousand transistors and associated circuitry with mass memory devices connected to it.

Figure 4:
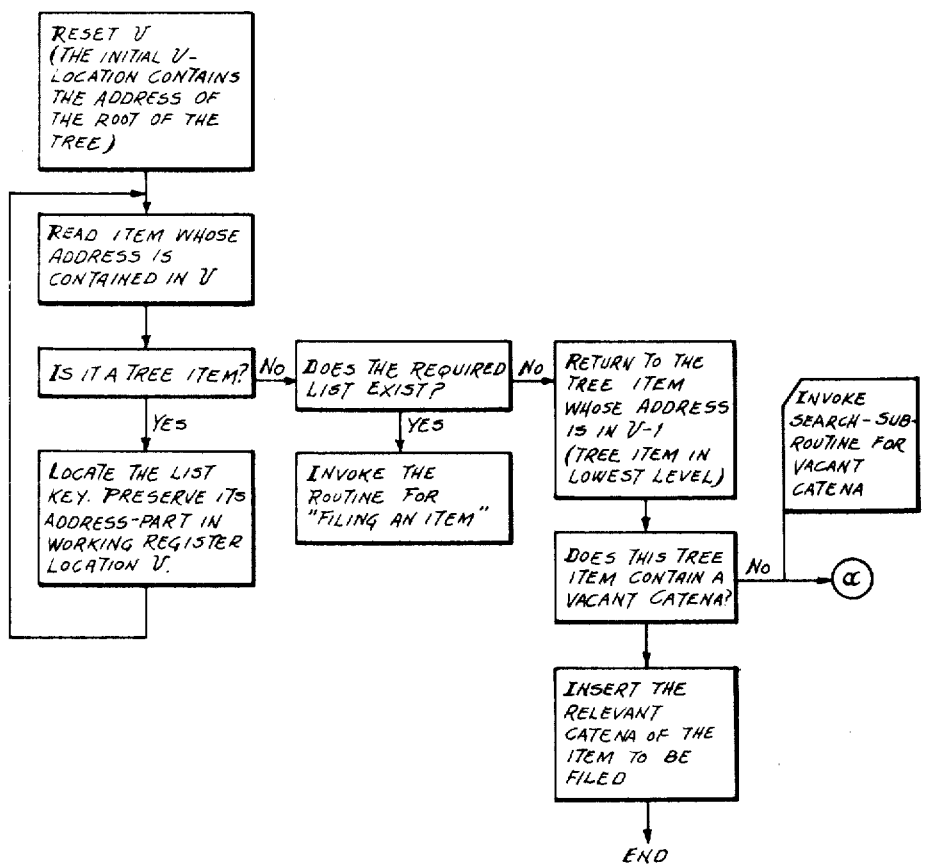
Figure 5:
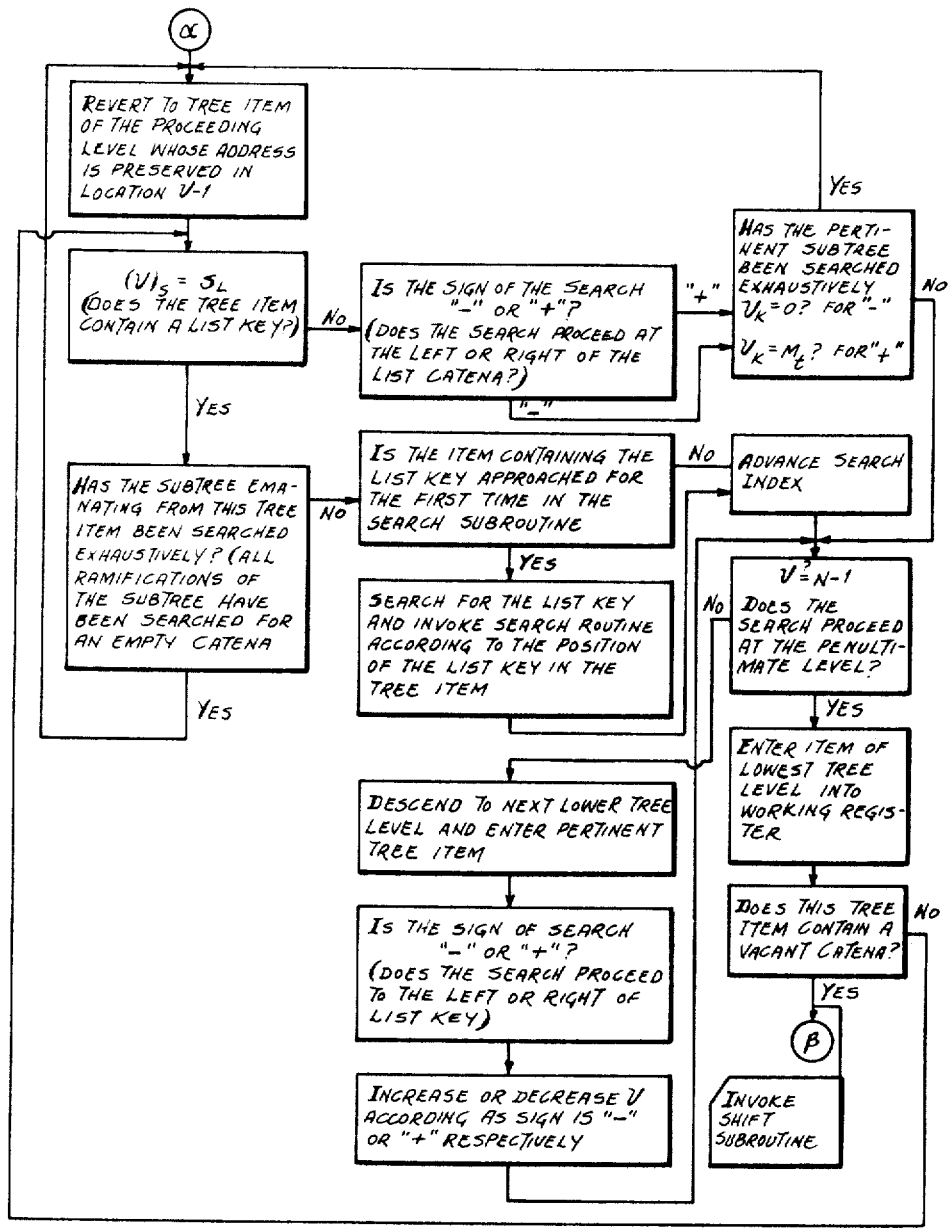
Figure 6:
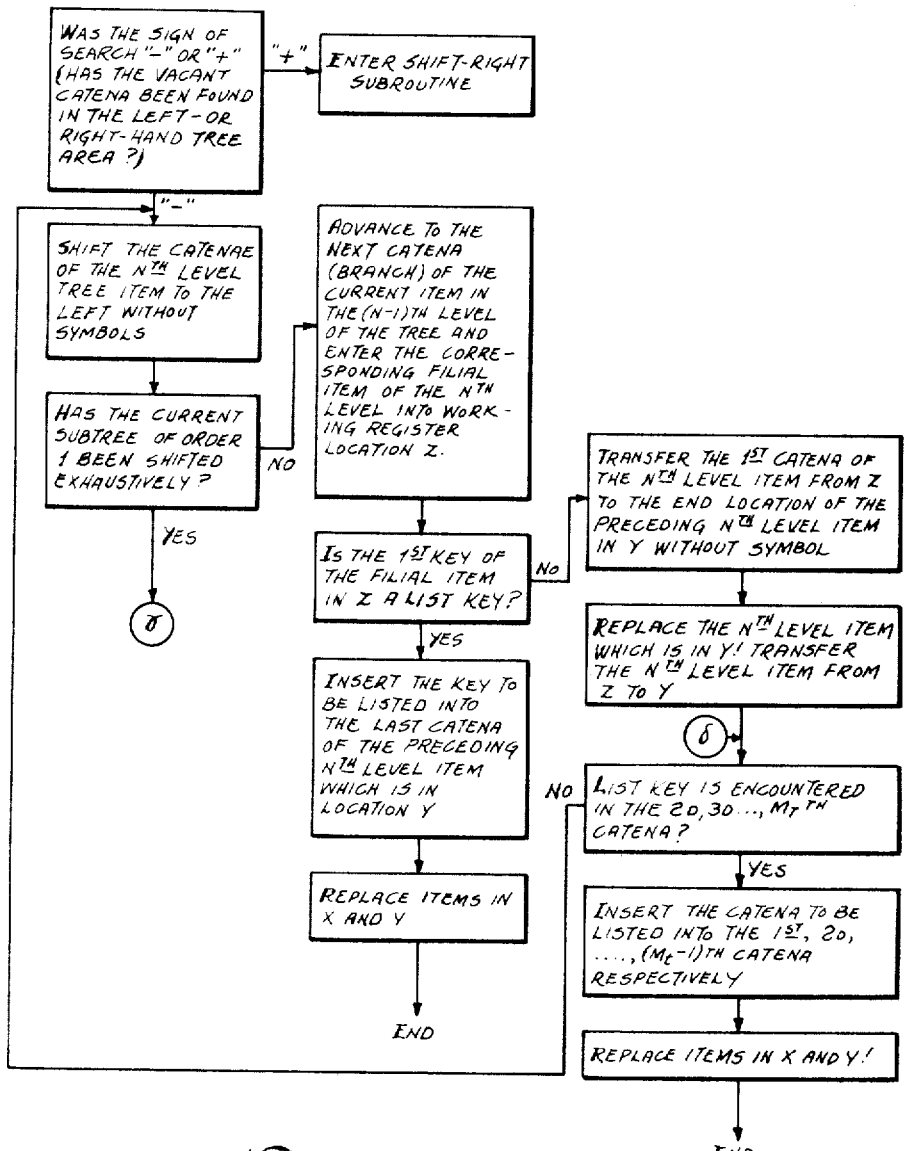
Figure 7:
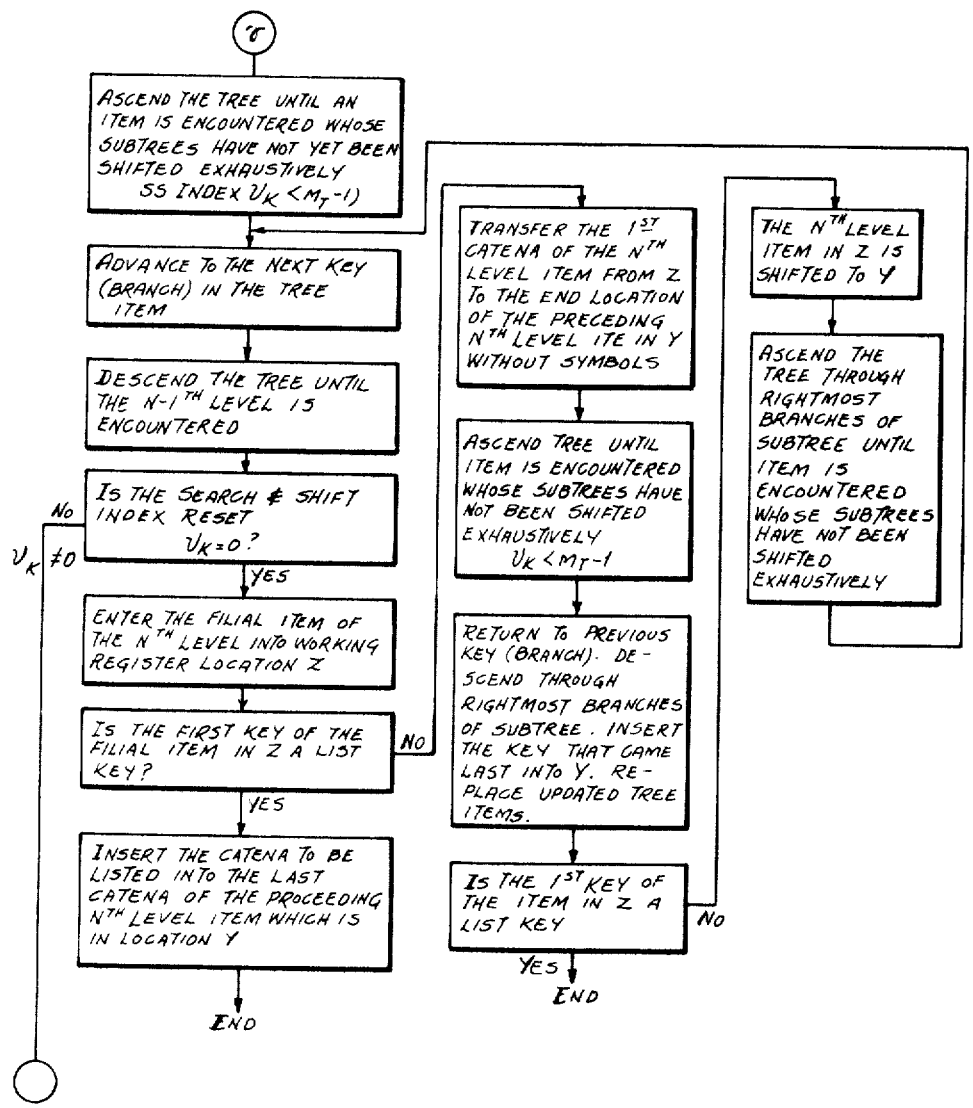
Figure 8:
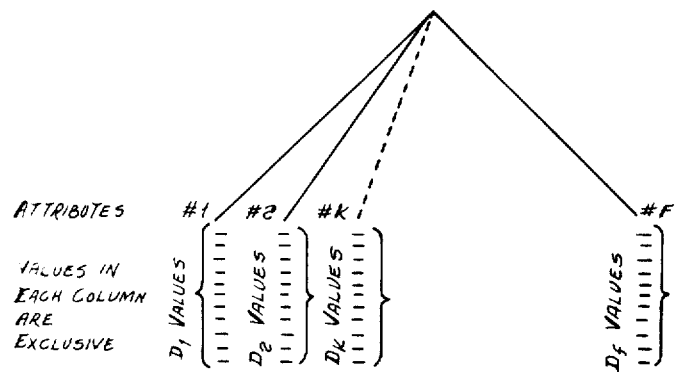
Figure 9:
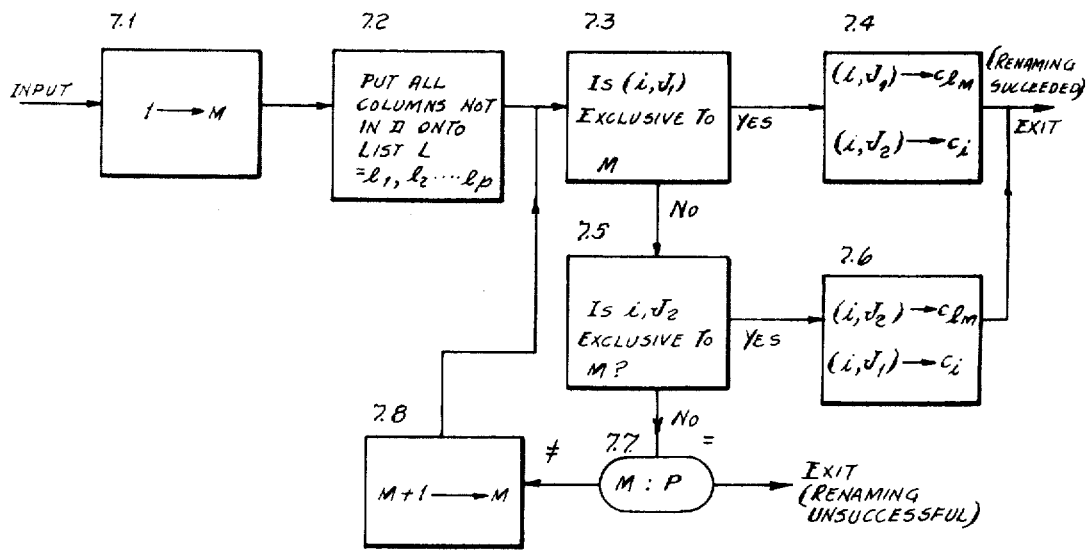
Figure 10:
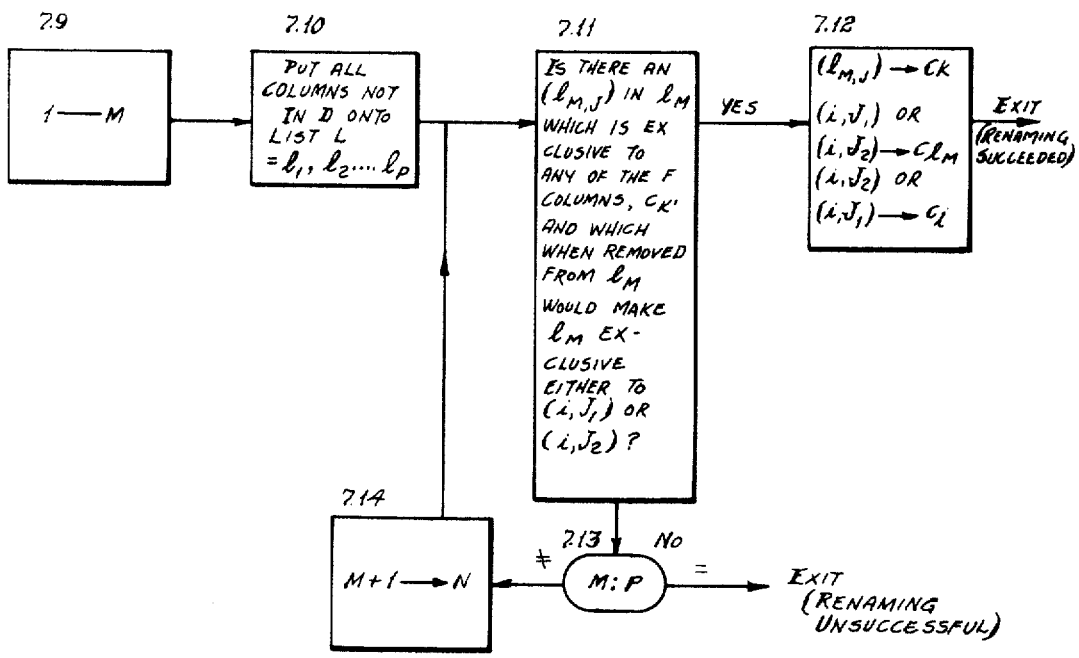
Figure 11:
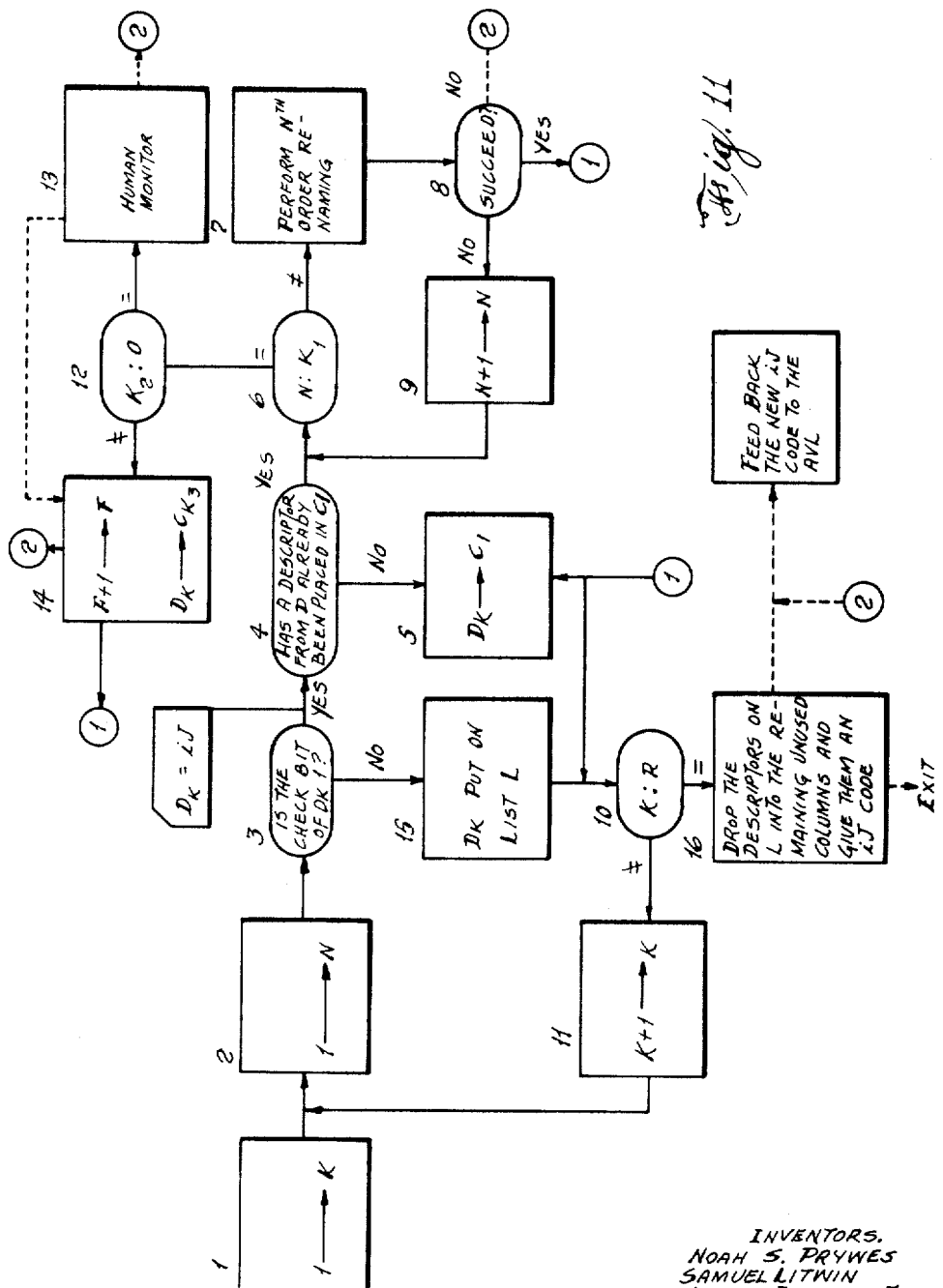
Figure 12:
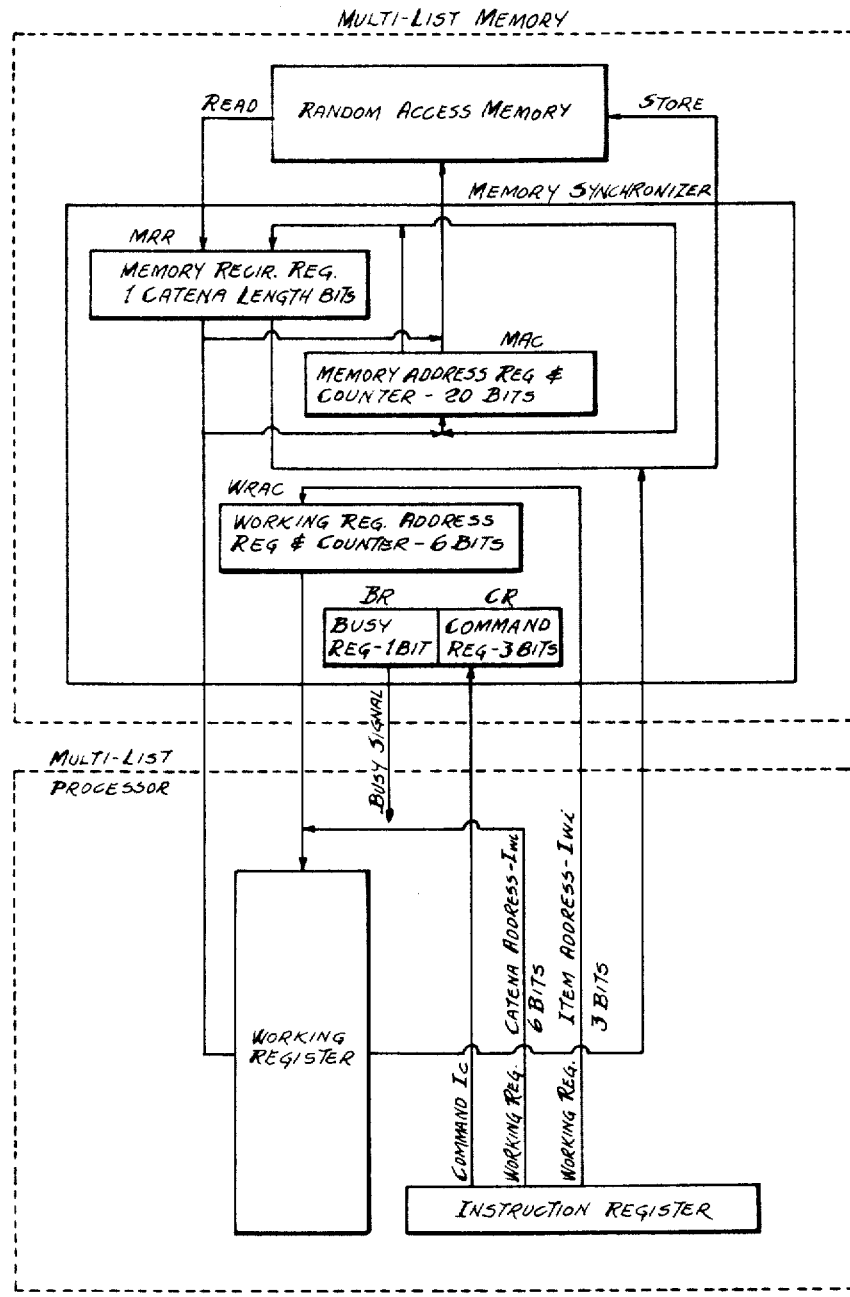
Figure 13:
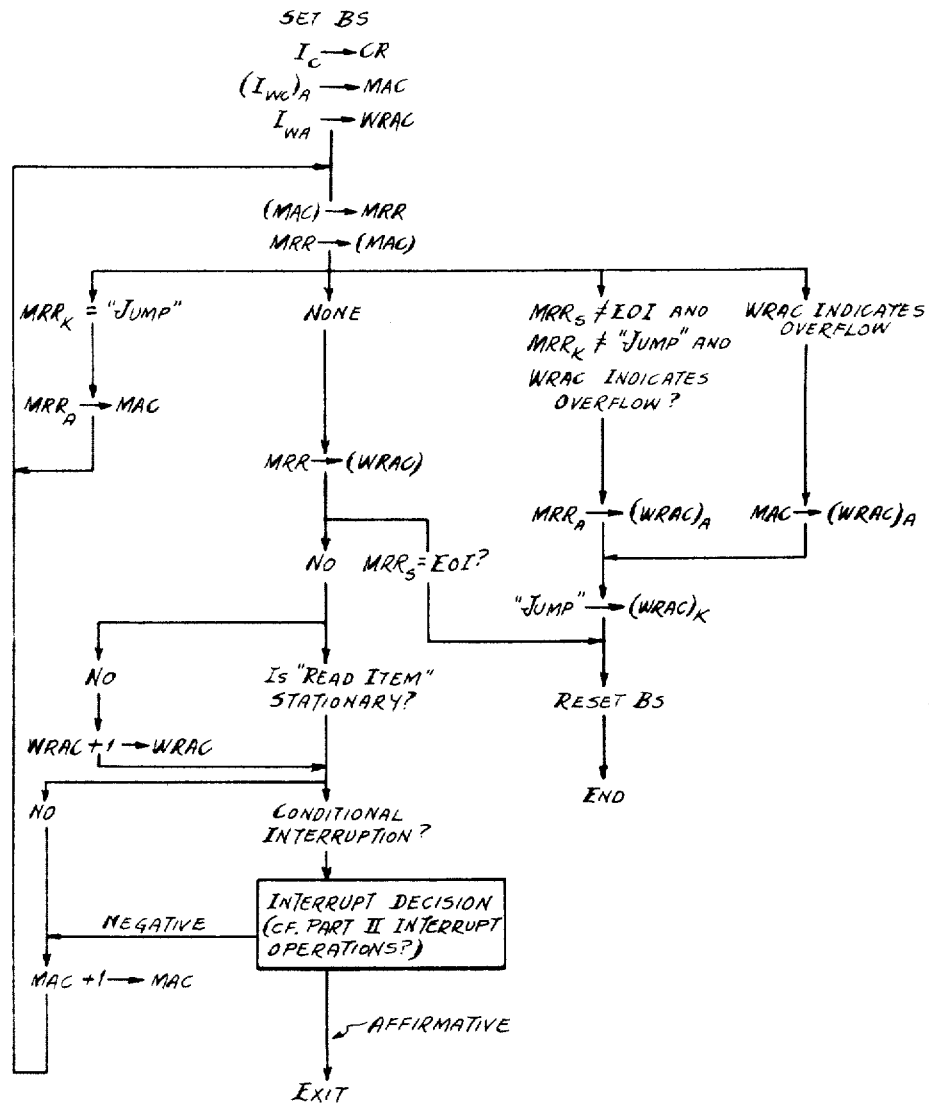
Figure 12:
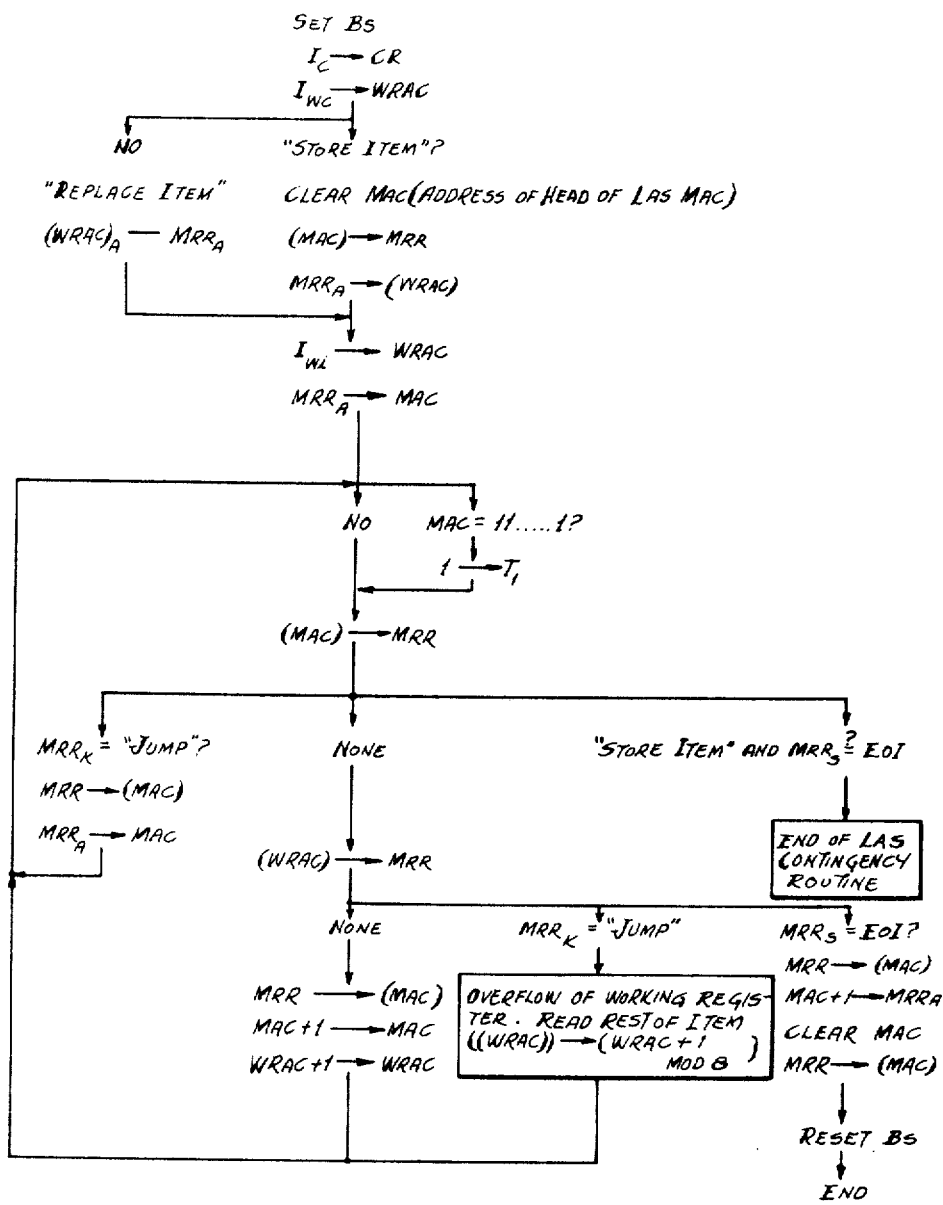
Figure 15:
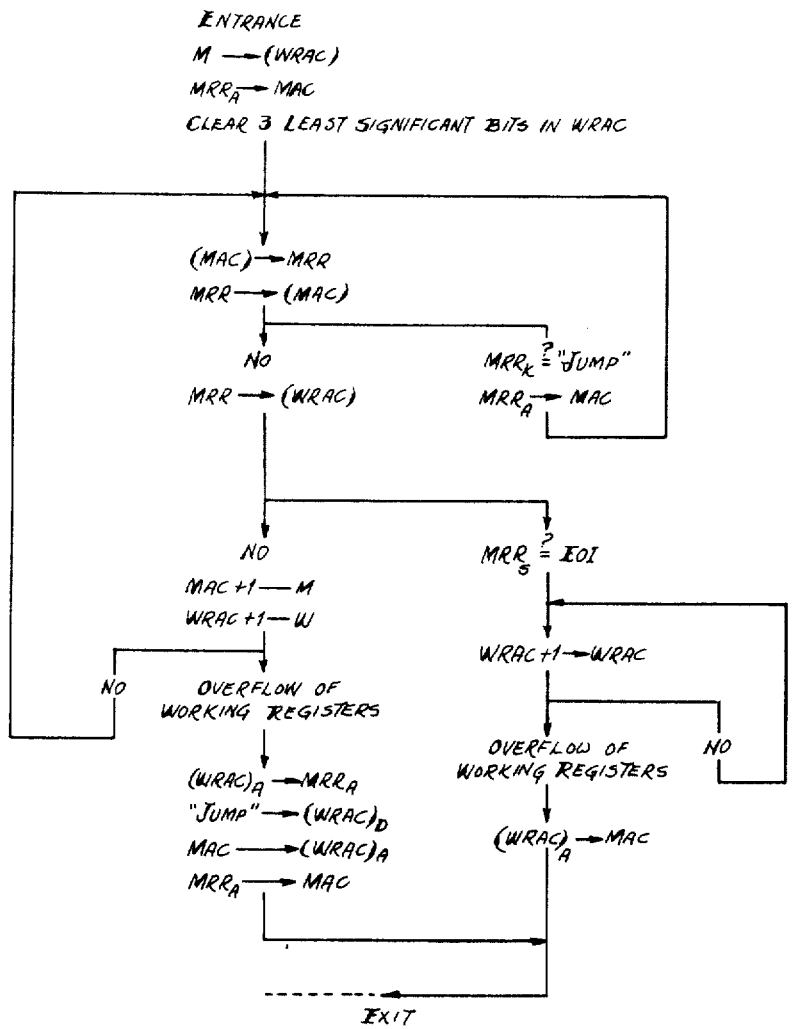
Figure 16:
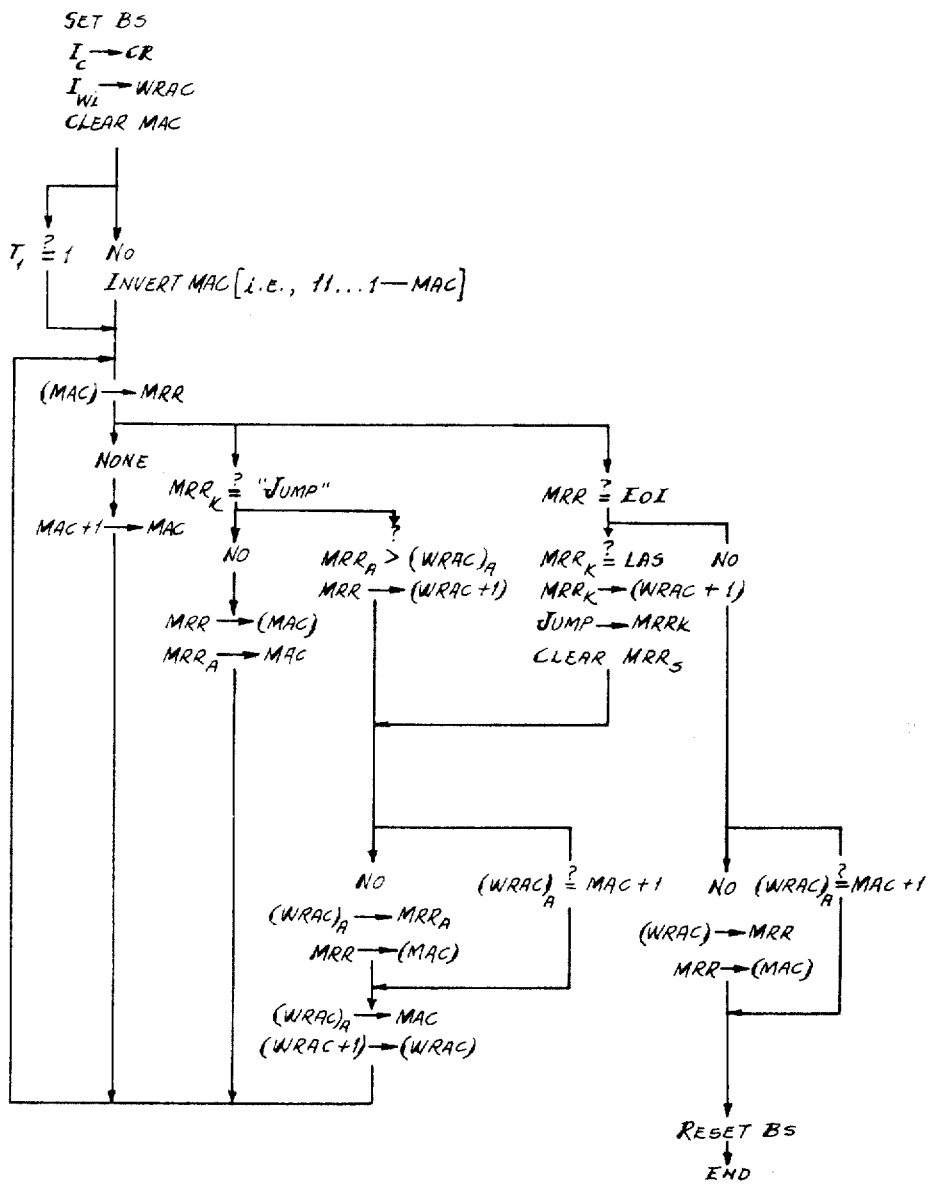
Figure 17:
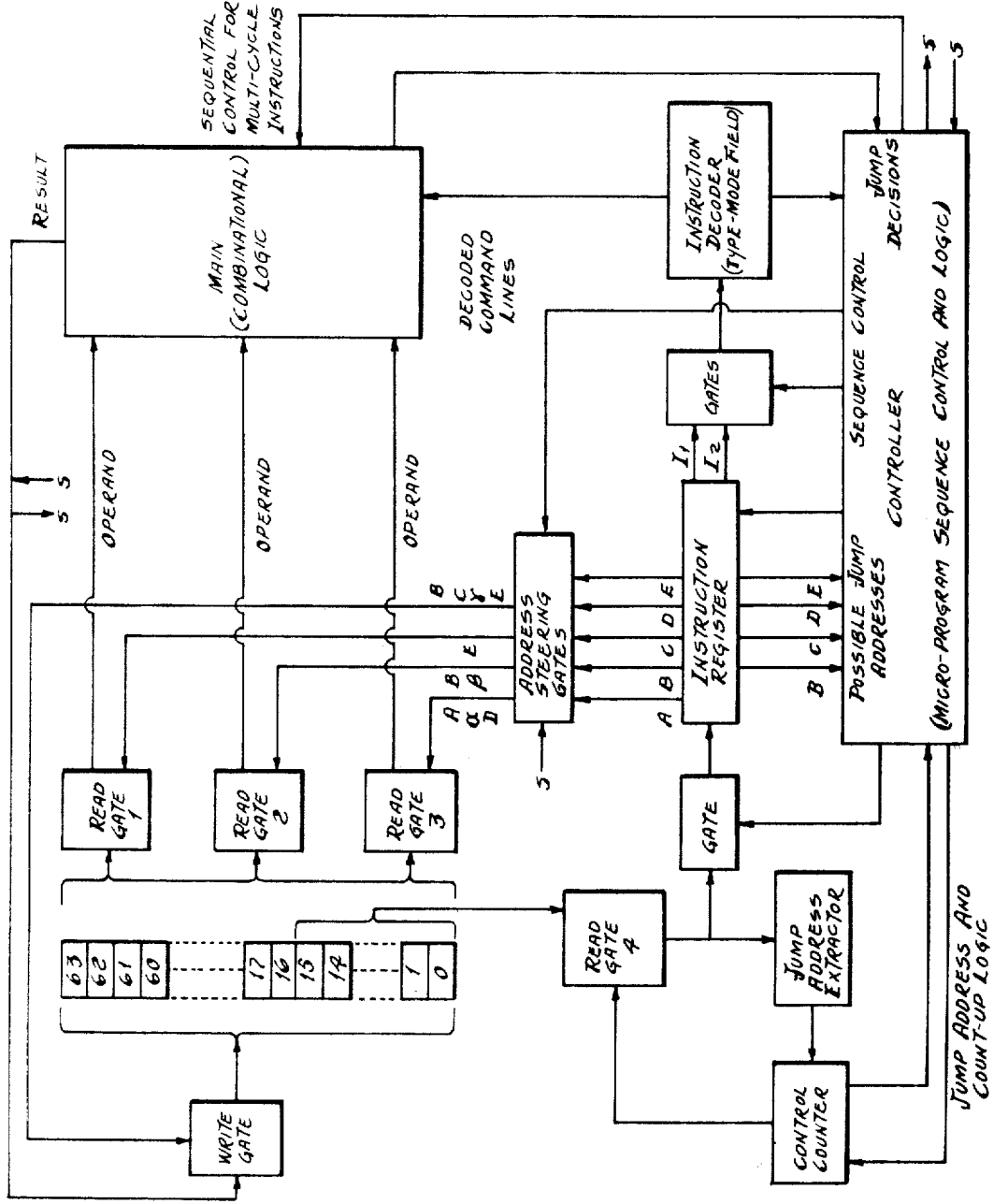
Figure 18:
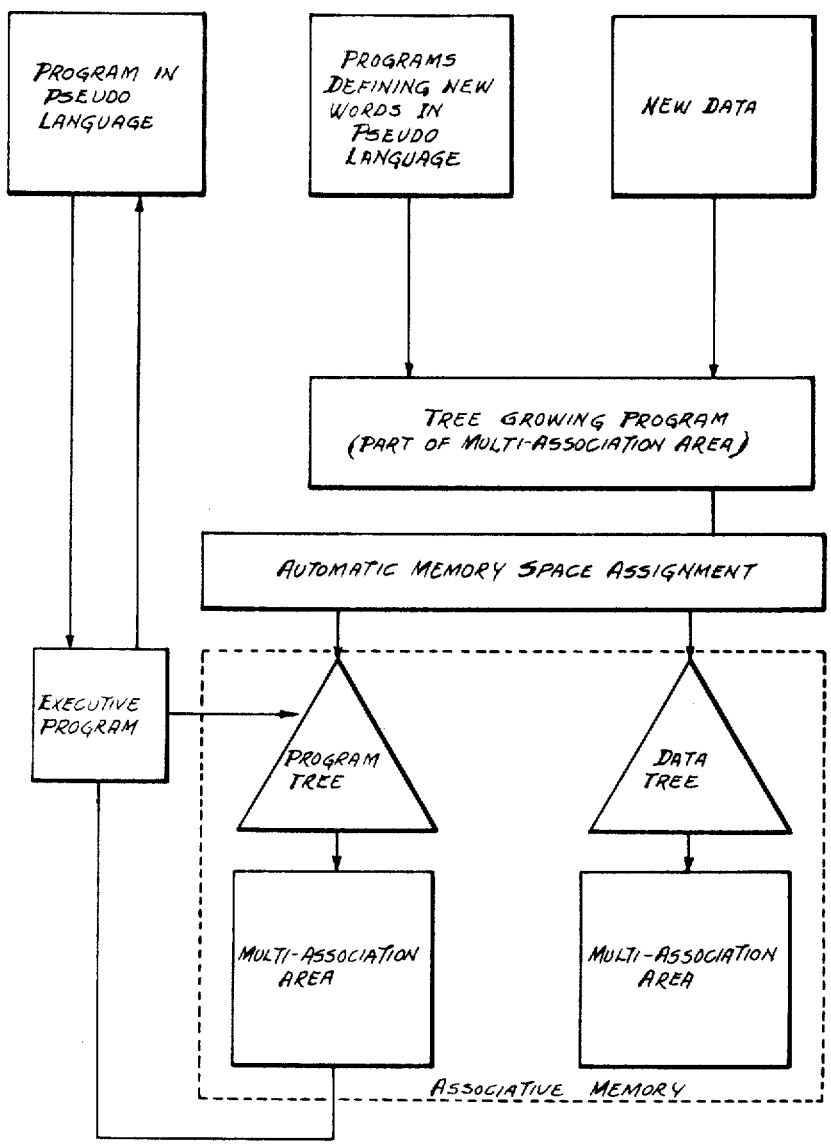
Figure 19:
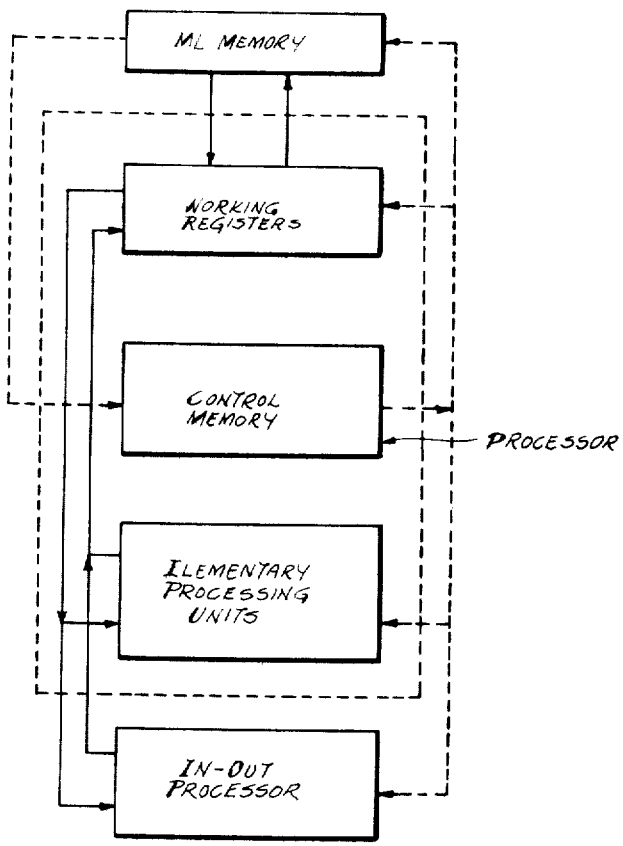
Figure 20:
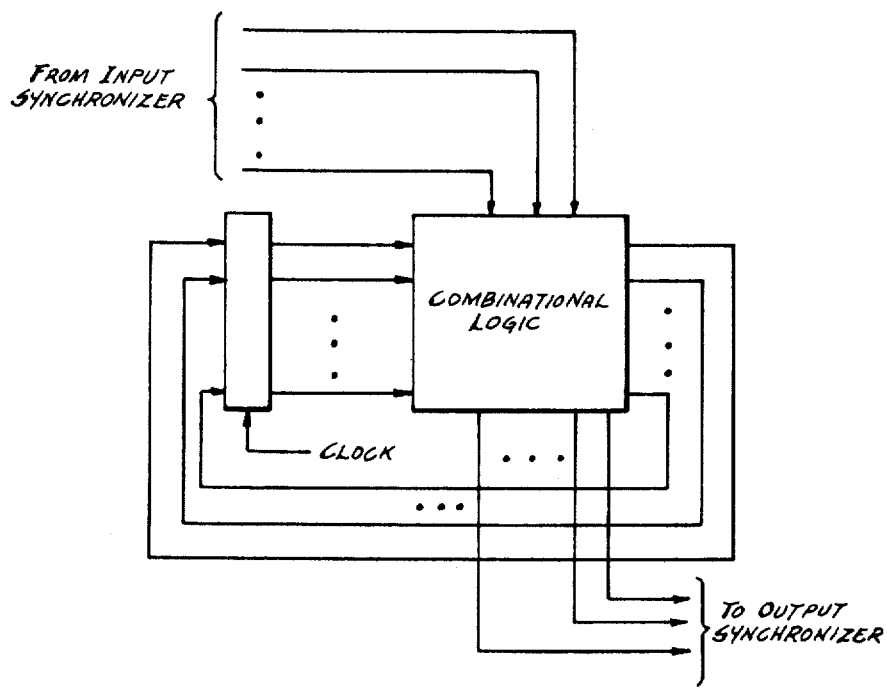

Other objects and many of the attendant advantages of this invention will be readily appreciated as the same becomes better understood by reference to the following detailed description when considered in connection with the accompanying drawings wherein:

FIG. 1a diagrams the construction of a data catena;
FIG. 1b diagrams the construction of an associative catena;
FIGS. 1–2 diagrams the multi-list organization for a file with $10^6$ items, with each item described by 15 fields and 10 exclusive descriptors per field;
FIG. 3 diagrams a summary of the multi-list organization;
FIG. 4 is a block diagram of the system for descending the tree and testing the existence of the relevant list;
FIG. 5 is a block diagram of the search subroutine system;
FIGS. 6 and 7 show a block diagram of the shift-left subroutine system;
FIG. 8 is a schematic diagram of a descriptor language with two strata, $f$ attributes and $d_k$ exclusive values per attribute $(1 \leq k \leq f)$;
FIG. 9 is a schematic diagram of a first order renaming system, wherein $p$ is the number of unused columns in the description;
FIG. 10 is a schematic diagram of a second order renaming system;
FIG. 11 is a flow chart of the attribute assignement;
FIG. 12 is a block diagram of the memory synchronizer system;
FIG. 13 is a diagram of the "read item" flow system;
FIGS. 14 and 15 show a diagram of the "store item" flow system;
FIG. 16 is a diagram of the "delete item" flow system;
FIG. 17 is a block diagram of the multi-list central processor system;
FIG. 18 is a schematic showing of the means providing flow of instructions and data in the interpretive mode;
FIG. 19 is a block diagram of the retrieval system;
FIG. 20 is a block diagram of a synchronous sequential system; and
FIG. 21 is a block diagram showing the means for finding an item when given its exact description.

The desired efficiency and human-machine communication improvements are achieved by the use of an associative memory for storing, deleting and reading of information without requiring addressing; by the use of a hierarchy of memories varying in speed and storage capacity; by the use of a processor organization and timing that minimize instruction retrieval and housekeeping routine times; by the use of a processor list type instruction where a single instruction processes an item of data having a varying length; and by built-in means for the automatic retrieval of programs that can be retrieved by name, allowing for much greater vocabulary and for greater ease of communication with the computer.

Part I herein describes the associative memory and the organization of a hierarchy of memories. The complexity of requests made of an associative memory led to the use herein of an addressable memory in which the associative memory is simulated. The multi-list techniques described in Part I provide the means for such a simulation. The multi-list organization of the memory has two parts, a *Tree* structure where the nodes of the tree consist of memory locations storing descriptors and addresses of other nodes, the addresses providing the branches between the nodes. Successive addressing leads from a single entry point of the tree to an appropriate exit that corresponds to a list defined by descriptors mentioned in the retrieval request. The second part of the multi-list memory is a multi-association area where the file, organized in lists, is actually stored. This area is criss-crossed by the lists originating from the tree mentioned before.

In the following description, the memory organization is described in the first chapter: initially, a balanced tree structure having an equal number of nodes between entry and exists with a separation of descriptors into groups that are called superfields, is assumed. The optimum branching at each node in the tree and in the multi-association area are calculated. The optimum represents a minimum of the product of storage capacity and retrieval time.

The general applicability of organizing an arbitrary information retrieval file into the multi-list balanced tree and superfields structures, which is assumed in chapter 1, is dealt with in chapters 2 and 3. (The analysis of an information retrieval problem by humans, which is to separate descriptors into superfields and obtain balanced trees, is not always possible. The way to do it may not be easily recognizable, and the mechanization of this task is required. First, an algorithm for construction of balanced trees is given in chapter 2. Next, chapter 3 deals with processes for analysis of file data to separate descriptors into exclusive, non-overlapping groups. These processes may be partly manual and partly mechanical. The manual starting of file organization or of making corrections speeds up the process. In a sense, the human starting of the file is similar to "teaching" the machine an appropriate filing process.)

Chapter 4 treats the organization of the hierarchy of memories. Large capacity and high access time memories are required for mass storage of large files, while faster but smaller memories are used for speeding the retrieval operation. An important means to this end is a memory synchronizer, which communicates among the various memories and the processor. The synchronizer must respond to instructions to transfer items of varying lengths and handle the automatic memory space assignment. To do so, the word formats are established. Flow charts for the mechanization define the memory synchronizer.

Alternative multi-list processor timing and instructions, considering micro-instruction versus macro-instruction parameters, are described in Parts II and III, the design in the latter having an instruction memory where micro-instruction routines are stored.

Two main features comprise the execution of a number of instructions per memory cycle and the reading out of entire routines and storing them in working registers. Both features call for extensive use of working registers, which represent the fastest and smallest memory in the hierarchy of memories. The organization and information that flow through these registers are the major subject of the second part. The timing and instructions are described with the aid of diagrams showing the registers and the lines of information flow together with flow charts for the instructions.

Other important features of the processor are the automatic storage and retrieval of programs and the automatic synchronization of the processor and memory. These features, together with the automatic memory assignment, contribute to ease in programming.

The instruction routines are organized into items of variable length similar to information items. Each routine represents a cycle that can be traversed a large number of times in the processing of a problem. Multiplicity of exits from one routine or instruction item to other instruction items are provided for. The main difference between the approaches of Parts II and III is due to the use of the special micro-instruction memory. An overall scheme for automatic programming is described in chapter 3 of Parts II and III.

Summarizing, this invention describes techniques for analysis of a file by humans, machine or both to allow the machine to have a multi-list organized and expandible file, so organized that the rate of growth or decrease depends on the information only; allows the mechanization of an associative memory using an addressable memory; provides processor design that reduces housekeeping routines; and incorporates automatic retrieval of programs in the processor design.

CHAPTER 1—MULTI-LIST ORGANIZATION OF STORAGE AND ITS OPTIMIZATION

(1) Introduction

The present-day organization of digital computing systems was developed for the purpose of solving scientific problems such as the numerical solution of differential equations. There is no guarantee that this "classic" organization is at all well suited to other kinds of problems such as business data processing problems, the problems of simulating intelligence and information retrieval problems. Indeed, the classic organization has all the earmarks of an awkward aproach to the solution of these problems. This awkwardness is best illustrated by the fact that housekeeping routines are required because information does not flow naturally into and out of the memory.

A possible starting point for a new approach could be the abandonment of the use of the addressable memory as such, and instead, the use of an associative memory is proposed where one may store, and later find, information satisfying a certain description. However, it is possible to use an addressable memory in such a way that information can be retrieved, given its description. One way to do this, which is the subject of the following, is to organize the information in the multi-list structure.

The use of an addresable memory for an associative memory permits versatility of requests and responses which are nearly imposible to satisfy with a memory having associative features built into the hardware. The versatility of requests and responses called for is demonstrated in the following.

(1) The associative memory should distinguish between *descriptors*, and *data*. The descriptors serve to classify data items and to constitute in themselves an expandable language. All the data can be resolved into descriptors but this may not be economical or practical.

(2) Retrieval requests may contain incomplete descriptions of items to be retrieved. Several responses to a retrieval request are possible, for example:
  (a) An item satisfying the description may be retrieved: if there are several such items they will be retrieved *sequentially*.
  (b) There may be no items satisfying the description and an indication of this will appear in the response.
  (c) The descriptors in the retrieval request may not be in the memory, in which case these descriptors may or may not be added in the memory and an indication thereof would appear in the response.

(3) Changes in the file may be as follows:
  (a) Incoming items of varying lengths are assigned memory space from a storage reserve and then stored.
  (b) Any descriptors of a new item that are not in the memory would be stored first.
  (c) Similarly, data items and descriptors may be deleted from the memory and the space returned to a storage reserve. The deletion request specifies a partial description of the items to be deleted.

(In this sense the associative memory is self-organizing and expandable both in terms of the information stored and in terms of the numbers and combination of descriptors used for filing and retrieval.)

(4) The processes described above must be executed efficiently. Scanning of a major portion of files or duplication of files must be avoided. In order to be of value to real-time information retrieval, the multi-list system should be several orders of magnitude more efficient than existing systems.

(5) Programs are to be stored and retrieved in a similar manner as that of data. The programs need not concern themselves with detailed machine codes, storage allocation and housekeeping routines. A relatively large command vocabulary is needed.

(2) Definitions and formats

First, it is helpful to make a few definitions of the terms to be used. The smallest complete unit of information is the item which, in a personnel file, may be the name of a person and his description. In the case of a scientific problem it could be the value of a variable together with its symbol, such as $x$, the description of the variable. The description is a set of symbols called *descriptors*, which define the properties of the information in the item. The descriptors are symbolic quantities that serve to describe the item in several attributes, an *attribute* being any characteristic of an item which can have a range of values. For a personnel file, examples of attributes are rank, age, height, etc.

For mechanization an item is made up of smaller elements which are called catenas (the word "catena" used here denotes both "a little one" and "a link"; both meanings apply here to information), each of which contain $l$ bits. FIGS. 1a and 1b show the construction of two types of catenas, the first type of which is a *data* catena that contains information such as a person's name, if a personnel file is being considered. The second type is an *associative* catena that consists of a *key* and an address, the key consisting of a descriptor or a combination of descriptors. (The first bit in each catena tells whether it is a data or associative catena.) An item is represented by as many associative and data catenas as are required. For the storage of items of variable length, $k$ catenae ($k \geq 1$) can be stored at each addressable location. The next $k$ catenae of an item could then be stored in the next consecutive addressable location ($n+1$). If location $n+1$ is already filled, the key in the $k$th catena in location $n$ could indicate this fact with the associated address that gives the location of the next catena in the item. An extra bit would be required per catena to indicate whether or not it is at the end of an item. Items are organized into lists such that all the items on a given list share common keys. The items are not necessarily stored in consecutive address locations, but items in a list are linked by the addresses stored in the associative catenas. Thus reading the first item on the list yields the address of the next item and so forth.

An item may have several associative catenas. The item then belongs to the lists identified by the keys, and the addresses in the corresponding catenas provide the links to other items which belong to these lists. This allows the branching at an item into multiple lists that can be said to be "associated" by sharing an item in common.

(3) The multi-list storage organization

The two processes of branching at items and of organizing items in lists are used for simulating an associative memory in a system with an addressable memory. The branching scheme is used to construct a *tree* which translates the combination of descriptors, given in a retrieval (or change) request, into the address of the first item on a list which contains items satisfying such a description. This list then is followed for retrieving (or changing the contents) of the items. The area of storage in lists, is called the *multi-association* area, as each item in this area may belong to several lists.

The areas of storage corresponding to the tree and to the multi-association are further explained with the aid of the following discussion:

FIG. 2 indicates how a personnel file containing one million names may be organized into a tree and a multiple association area. Each point represents an item and each line below the tree represents a list in the multi-association area. Since for this file there are fifteen attributes with ten values each (giving a total vocabulary of 150 descriptors) the complete descriptive information regarding any name in the file can be given by a 15 digit decimal number. The attribute is indicated by the position of a digit—the digit itself gives the value. Within each item are five associative catenae. In order to have a storage organization based on five associative catenae and, hence, five branches from each item, the 15 attributes are grouped into 5 superfields. The keys in each superfield correspond to the combinations of the descriptors of three attributes. The superfield contains 1000 combinations; thus, there are 1000 lists per superfield and a total of 5000 lists in the system.

The tree structure branches at each point into 5 other points until the first item on each one of the 5000 lists is arrived at. In the multiple-association area, which contains these 5000 lists, 5 lists (each from a different superfield) intersect at an item; this intersection completely defines the 15 descriptors of the item stored in this location through the five associate catenae in the item. In order to retrieve items according to a combination of descriptors, it is necessary to follow the correct branches from the top of FIG. 2, going through five or six addressable locations until the appropriate list is found and then to examine the list for the items satisfying the retrieval requirements.

As indicated in FIG. 2, the tree structure requires the storage of 1406 items (five catenae per item, except at the lowest branches). FIG. 2 shows only a portion of the entire tree, with the size of the tree indicated on the left of the figure. Since there are $10^6$ items and $10^3$ lists per superfield, there would be on the average $10^3$ items per list in the multi-association area.

One advantage of this storage organization is the efficiency which is reflected in capability of retrieval requiring a search through only a small part of the total storage, and in avoiding a duplication of storage. Other advantages are the ability to retrieve by partial description corresponding to the key in only one of the five superfields, and also, the ease of expandability in addition of items and descriptors (the latter is further explained in chapter 2).

In the multi-list system, information can be stored in any available space, thereby avoiding the reservation of extra specific space locations for additions. The addresses of the available spaces are in a *List of Available Space*. When a deletion is made the space thus made available is added to the list of available space. When addition of item occurs an available space is transferred out of the list of available space and into the list where the newly stored item belongs.

The multi-list type of information structure provides multiple paths (through the trees for each superfield) in the storage space. The machine will be programmed to choose one path. The choice of a short path to a desired location may be made heuristically.

In the above discussion the complete description of an item can be broken into a number of superfields to improve the efficiency. The number of superfields chosen in the discussion is $m=5$. The freedom of choice of the number of branches at an item must be maintained in both the tree and multi-association areas.

Further discussion in this chapter requires the making of a number of assumptions which are justified in succeeding chapters. These assumptions are as follows:

First, it is assumed that a tree utilizing all its branches (in the case of FIG. 2 there are five branches at every node), except in the lowest level, can always be constructed. Such a tree is called a balanced tree since its growth is uniform in the sense that all branches on one level must be utilized before the next level is initiated. (In FIG. 2 there are vacancies in the 6th level only.) A process for generating such trees is described in chapter 2.

Another assumption concerns the possibility of dividing the totality of descriptors in an arbitrary information retrieval file into attributes. In the example of the personnel file attributes, such as rank, age, etc., are obtained readily by humans upon examination of the file. The groups of descriptors belonging to each attribute in the personnel file are exclusive in that no one item (person) can have two descriptors belonging to the same attribute. Generally all descriptors having the same attribute are *exclusive*. In more complex problems the separation of descriptors into exclusive-attribute groups may require a more searching analysis of the information in the file. A process for machine analysis of the file and determination of attribute-descriptor groups is described in chapter 3.

Various means of storage must be used to complement each other. For instance, the List of Lists, which is often referred to in quest of major files, can be stored in a true random access memory where there may be also space for tree areas. The multi-association areas as well as lengthy texts can be stored in slower access types of storage. In using this type of a hierarchy of memories it is important to assure fast flow of information between the various means. This can also be useful when a considerable amount of processing is planned on a particular amount of information, such information can be brought into the random excess memory where the processing is performed. The easing of flow of information between memories is the purpose of the memory synchronizer described in chapter 4.

A minimum of instruction retrieval and housekeeping routines were assumed in the calculation of efficiency, in the following section. The design of a special processor, which is described in Part II of this application was called for to justify this assumption. Its main purpose is to process all logical operations concerning a word in a single memory cycle.

(4) The maximization of efficiency

In the example in the previous section (FIG. 2), at most five branches can originate from tree nodes and multi-association items. This dictated the need for five superfield trees.

A study of this example would indicate that a similar organization could have been based on other numbers of trees (between 1 and 15). The objective of the following section is to demonstrate that a judicious choice of the number of branches at nodes and the number of superfield trees can be made to optimize efficiency.

If an "efficient" machine is defined as one in which the amount of computation performed per unit cost is large, one may use as a measure of efficiency, the product of computing time and equipment cost. Maximum efficiency corresponds to the minimum of this product. It is assumed that operating costs are a constant.

A memory cycle will be chosen as the unit of time. As already indicated it is assumed that the memory is truly random access and that an item is examined and all necessary logical operations are performed in a memory cycle (see Part II). Cost is assumed proportional to memory size alone since in the system under design, the amount of logical circuitry is expected to be relatively small. Hence, the unit of cost will be the cost of storage for a catena.

Three types of problems to be handled are the retrieval, filing, and deletion of an item. Item filing consists of inserting the item ($m$ associative catenae in the item) into $m$ lists by searching for the place to put the item in the $m$ lists and is similar to $m$ information retrieval problems. The deletion problem is similar to the filing problem. Conditions for optimum efficiency will be obtained for the retrieval problem.

Calculations of retrieval time, cost, and efficiency will be given for the tree and mutiple association areas singly and then combined.

In the tree, let $n$ be the number of levels in the tree, $m_t$ the number of branches at the branching junctions in the tree, and "$a$" the number of lists that originate in the lowest level of the tree and that penetrate the multi-association area. (In the example of FIG. 2 $n=5.5$ on the average, $m_t=5$, and $a=5000$.) For balanced trees:

$$a = m_t{}^n;\ n = \frac{\ln a}{\ln m_t} \qquad (1)$$

for $\qquad 1 < m_t \leqslant a$

The lack of symmetry in the lowest level of the tree, as for example in FIG. 2, introduces a slight and insignificant error.

To traverse the tree from its entrance to the entrance of the multi-association area, for the case where the $m_t$ catenae in an item are processed simultaneously (in parallel ($p$)), the time (T) in the tree structure ($t$) is taken from Eq. 1.

$$T_{tp} = n = \frac{\ln a}{\ln m_t} \qquad (2)$$

If the catenae in an item are processed sequentially ($s$), $r_t m_t$ catenae may be compared on the average before the branch to be followed from a junction is found where $r_t \leqq 1$. The time to traverse the tree is (in catena units)

$$T_{ts} = nm_t r_t = m_t r_t \frac{\ln a}{\ln m_t} \qquad (3)$$

The cost of the tree in catena units is $$S_t = m_t a \left[ \frac{1}{m_t} + \frac{1}{m_t{}^2} + \ldots + \frac{1}{m_t{}^n} \right] = \frac{m_t(a-1)}{m_t - 1} \qquad (4)$$

The inverse of efficiency (I) for the tree alone is the product of S and T. For parallel processing of the catenae in an item $$I_p = S_t T_{tp} = \frac{m_t(a-1)\ln a}{(m_t-1)\ln m_t} \qquad (5)$$

and for sequential processing, $$I_s = S_t T_{ts} = \frac{m_t{}^2(a-1)r_t \ln a}{(m_t-1)\ln m_t} \qquad (6)$$

As a function of $m_t$, $T_{ts}$ (Eq. 3) has a rather broad minimum at $m_t=0$, and $I_s$ (Eq. 6) has a rather broad minimum at $m_t=4.25$. The latter corresponds to maximum efficiency as defined.

From Eqs. 2, 4, and 6, $T_{tp}$, $S_t$ and $I_p$ decrease with increasing $m_t$. However, as $m_t$ increases, the improvement in these criteria becomes rather small and, in the case of $S_t$, has an upper limit. For example, increasing $m_t$ beyond the value of 10 can decrease storage requirements by a maximum of about 10 percent. To the computer system designer using presently known techniques, $T_{tp}$ is not very significant as a criterion since it does not reflect the additional cost of parallel processing of catenae, especially when $m_t$ becomes very large. Hence, it appears that a system composed of retrieval trees has an optimum at $m_t \sim 4$.

The multiple association area is organized into lists which penetrate it from the tree structure. Assume that $b$ items are stored in this area. (In FIG. 2, $b=10^6$.) Each of the $b$ items consists of a variable number of data catenae and a maximum of $m_a$ associative catenae. The $m_a$ associative catenae allow $m_a$ lists to intersect at any item. One addressable location is associated with each of the $b$ items.

Let there be $f$ *inclusive* attributes ($f=15$ in FIG. 2). The word "inclusive" indicates here that any of the $b$ items can belong to as many as $f$ attributes simultaneously. The attributes are further divided into $d$ descriptors each, which are "exclusive" since any item can belong to only one descriptor in an attribute. The number of descriptors in each attribute can be represented by a subscript indicating the attribute to which it belongs. Thus, in attributes 1, 2, ..., $f$, there are $d_1, d_2, \ldots, d_f$ descriptors, respectively. ($d_1=d_2=\ldots,=d_{15}=10$ in FIG. 2.) The maximum number of lists that can intersect at each addressable location is $m_a$. Each list represents a combination of $k$ descriptors (in $k$ attributes). Thus the $m_a$ lists represent combinations of $k_1, k_2, \ldots, k_{m_a}$ descriptors respectively, where $$k_1 + k_2 + \ldots + k_{m_a} = f \qquad (7)$$

($k_1=k_2=\ldots=k_5=3$ in the example of FIG. 2.) Each of the combined groups of $k_1, k_2, \ldots, k_{ma}$ attributes is thus organized into what has been called a superfield. The number of lists that represent all the combinations of descriptors in the $k_1$ attributes is (in superfield I):

$$a = \prod_{k=1}^{k=k_1} d_k \qquad (8)$$

(This product is equal to 1000 in the example of FIG. 2.) Similar expressions can be stated about the number of lists in the other superfields. The total number of lists ($a$) penetrating the multi-list associative area is:

$$a = \prod_{k=1}^{k=k_1} d_k \prod_{k=k_1+1}^{k=k_1+k_2} d_k + \ldots + \prod_{k=k_1+k_2+\ldots k_{m_a-1}+1}^{k=f} \qquad (9)$$

Every one of the $b$ items can belong to a maximum of $m_a$ lists; however, on the average, an item belongs to $pm_a$ lists, where $0 < p \leq 1$. Therefore, on the average, there are $pm_a$ associative catenae per item. In sampling the catenae in an item sequentially by performing compare operations only $r_a(pm_a)$ catenae need be compared on the average before the desired branch to be followed is found (where $0 < r_a \leq 1$). The average number of items per list in any of the $m_a$ superfields corresponds to the total number of items in the superfield divided by the number of lists in this superfield.

This average number of items in a list is also the number of addressable locations that have to be read in performing a retrieval by examining all items in a list. It corresponds to the retrieval time ($T_{ap}$) when all catenae in an item are read and examined in parallel. In the superfield I, which represents the combination of $k_1$ descriptors, the expression for this retrieval time is $$T_{ap} = \frac{pb}{\prod_{k=1}^{k=k_1} d_k} \qquad (10)$$

($p < 1$ indicates that there may be less than $b$ items in superfield I.)

If the retrieval is done by operating on associative catenae sequentially, the retrieval time is $$T_{as} = \frac{r_a p^2 m_a b}{\prod_{k=1}^{k=k_1} d_k} \qquad (11)$$

The constant in Eq. 11 refers to the retrieval time of data catenae.

The number of addressable locations (A) in the multi-association area ($a$) is equal to the number of items.

$$A_a = b \qquad (12)$$

The cost (S) required to store these items in catena units is $$S_a = pbm_a + \text{constant} \qquad (13)$$

The constant in Eq. 13 refers to the number of data catenae involved.

In order to clarify the significance of these relationships, let us make a simplifying assumption as stated previously.

The process for obtaining the balanced tree described in chapter 2 leads to an assumption that it is possible to effectively make $$d_1 = d_2 \ldots = d_f = d$$

The process for determining attributes described in chapter 3 leads to an assumption that it is possible, effectively, to make $$k_1 = k_2 \ldots = k_{ma} = f/m_a$$

(although this may not be the most desirable organization). Thus Eq. 1 becomes:

$$a = m_a d^{f/m} \qquad (14)^*$$

*If the number of lists emanating from a tree is $a$ then, to fit the context of the previous analysis, this is equivalent to assuming $$d = \sqrt[k]{a}$$

where $k$ is the number of attributes combined in the tree.

Eq. 10 becomes:

$$T_{ap} = \frac{pb}{d^{f/m}a} \qquad (15)$$

and Eq. 11 becomes:

$$T_{as} = \frac{r_a p^2 b}{a} m_a^2 + \text{const.} = r_a p^2 \frac{m_a b}{d^{f/m}a} + \text{const.} \qquad (16)$$

When $m_a$ increases, $T_{ap}$, $T_{as}$, and $S_a$ increase, so the efficiency decreases. On the other hand, $a$ also increases with the decrease in $m_a$. As an extreme illustration, the case of $m_a = 1$ can be considered where $T_{ap}$, $T_{as}$ and $S_a$ are minimum. Then $a = d^f$, which may be much greater than $b$. In this case, the tree structure, which depends on $a$, grows greatly. The consideration of both the tree structure and multi-association area is then called for. The relative access time and cost of storage per catena for the tree and multi-association areas should be considered. These two areas may use different storage devices. For instance, a random access core memory and a disc memory may be used for the tree and multi-association areas respectively. Let the relative access time and cost of these two memories be $c_1$ and $c_2$. In the case of core and disc memories $c_1 \approx 10^{-2}$ and $c_2 \approx 10^2$. Another consideration will be the number of times that the tree area is traversed per search in the multi-association area. The average retrieval request consists of a logical combination of descriptors within certain ranges of descriptor variation (for instance there may be a search for an individual in an age, rank, etc., range). Traversing the tree will reveal which of the combinations of descriptors do not exist in the file in which cases a search in the multi-association area is superfluous. Let the constant $c_3$ represent the number of times of the multi-association area search per traversal of the tree area.

The retrieval time for processing all catenae in an item in parallel will be considered first:

$$T_p = \frac{1}{c_3} T_{tp} = \frac{1}{c_1} T_{ap} \qquad (17)$$

From Eqs. 2, 14, and 15, $$T_p = \frac{1}{c_3} \left( \frac{\ln m_a}{\ln m_t} + \frac{f \ln d}{m_a \ln m_t} \right) + \frac{p}{c_1} \frac{b}{d^{f/m}a} \qquad (18)$$

By setting $dT_p/dm_a = 0$ and making the simplifying assumption $c_1 = c_3$, it can be shown that $T_p$ is a minimum when $$m_a = \ln \left( d^{f/m}a \left[ 1 - \frac{pb}{d^{f/m}a} (\ln m_t) \right] \right) \qquad (19)$$

if $m_t$ is assumed to be constant. Since $m_a$ is positive ($1 < m_a \leq f$), $$\frac{pb}{d^{f/m}a} \ln m_t < 1 \qquad (20)$$

In the range in which we are interested, using an equality sign in Eq. 20 gives a good first approximation for the solution of Eq. 19. If $\ln m_t$ and $p$ are of the order of magnitude of unity, we can further simplify the first approximation to $$\frac{d^{f/m}a}{b} 1; \quad m_a = \frac{\ln d^f}{\ln b} = f \frac{\ln d}{\ln b} \qquad (21)$$

The solution of Eq. 19 will be at a value of $m_a$ slightly smaller than its value in Eq. 21. If Eq. 21 is applied to Eq. 15, it is found that $T_{ap}$ is of the order of magnitude of unity. Thus, the average number of items per list in the multiple association area at the optimum condition of Eq. 21 is of the order of magnitude of unity.

The retrieval time when associative catenae are processed sequentially is $$T_s = \frac{1}{c_3} T_{ts} + \frac{1}{c_1} T_{as} \quad (22)$$

From Eqs. 3, 14, and 16, $$T_s = \frac{1}{c_3}\left(r_t m_t \frac{\ln m_a}{\ln m_t} + \frac{f \ln d}{m_a \ln m_t}\right) + \frac{r_a p^2 m_a b}{c_1 d^{t/m} a} + \text{constant} \quad (23)$$

It is easy to show that $T_s$ is a minimum when (again assuming $c_1 = c_2$)

$$\frac{1 - \ln d^{t/m} a}{1 + \ln d^{t/m} a} = \frac{r_a p^2 m_a b \ln m_t}{r_t m_t d^{t/m} a} \quad (24)$$

if $m_t$ is assumed to be a constant. An approximate solution of Eq. 24 is also given in Eq. 21.

|  | Name | Address | Account # |
|---|---|---|---|
| Item in File: 40 Characters | Smith John M | 3529 Market Str. Phila. 4, Pa. | 25673 |
| Fields | Smi J | 529 Ma 4 Phila. Pa | 25673 |
| Number of possible combination | 26×26×26 26 | 10³ 26×26 64 4 | 64000 |
| Number of descriptors (at base 4) | 10 | 5 5 4 | 8 |
| Total combinations of descriptor, $4^{32}$ |  |  |  |
| Total customers, $4^8$ |  |  |  |

Number of super fields, $m = \frac{\log 4^{32}}{\log 4^8} = 4$

Superfield I, 8 Descriptors—1st part of last name.
Superfield II, 8 descriptors—Last part of last name, initial and last part of street number.
Superfield III, 8 descriptors—Street, portion of street number and District.
Superfield IV, Account number.

Chart I-4.—Descriptor code for customer name and account number

For the total cost in catena units, $$S = S_t + S_a \frac{1}{c_2} \quad (25)$$

From Eqs. 4, 13, and 14, $$S = \frac{m_t}{m_t - 1}(m_a d^{t/m} a - 1) + \frac{pbm_a}{c_3} + \text{constant} \quad (26)$$

This has a minimum which is also approximately given by Eq. 21 (for $c_2 \approx 1$). Hence, in all the cases considered, the optimum number of catenae in an item is approximately $$m = \frac{\ln d^t}{\ln b} = \frac{\ln \text{(number of possible descriptors)}}{\ln \text{(number of items in the file)}}$$

and that at this value of $m$, the average number of items in a list in the multiple association area is of the order of unity.

The results of the calculation of optima can be considerably affected by a change of choice of memory organs and the values of $c_1$, $c_2$, and $c_3$. The purpose of this calculation is to demonstrate that: (a) an optimum value of $m$ exists and (b) outline a method for its derivation.

For item filing and deletion, the optimum value of $m_a$ for minimum $T_s$ is unity which requires an excessively large memory. However, if many more items are retrieved than are filed, the optimum value of $m_a$ for minimum $T_s$ clearly is near that obtained from Eq. 21. This value of $m_a$ also minimizes $T_p$ and the product of cost and time.

(5) Discussion

The multi-list organization of an arbitrary information retrieval can be summarized with the aid of FIG. 3. The top line shows a description of an item. The attributes are assigned positions in the description of items. The assignment of positions for attributes is described in chapter 3. As indicated above, efficiency is improved if the description is divided into superfields, each comprising a group of exclusive attributes. The assignment of descriptors to specific positions corresponding to attributes and the separation into superfield keys is shown in the second line in FIG. 3. This is followed by superfield trees which decode the respective keys into list addresses which traverse the multi-association area where the items are stored. The structuring of the trees and their expansion is further discussed in chapter 2.

To illustrate how an item can be expressed in terms of superfields, the example of Chart I-4 will be considered on how the descriptor code for a customer's name and account number can be obtained. The item is given in the first line of Chart I-4 and consists of a name, address, and account number. Forty characters are assumed to be alloted for the item in the file even though only thirty six appear in the example. The second line shows the fields chosen, each corresponding to an attribute, in which the item is to be described. The third line shows the number of possible combinations in each field that can exist. The fourth line shows how many digits in base 4 are required to represent the item in each field. For example, in the case of the name, $4^{10} > 26^4$. The total number of possible descriptor combinations is clearly $4^{32} = d^t$.

The total number of items (customers) in the file is $4^8$ as indicated in the account number column. Hence, from Eq. 21, the optimum $m$ is 4. The division into four superfields is indicated. Retrieval based on superfield IV alone is unique. However, retrieval on the basis of superfield I will give all people whose names begin with SMI and similarly for the other superfields.

A general comparison between the multi-list system and other systems is difficult because of the great variety of retrieval problems. Large improvements in efficiency have been obtained for all complex information retrieval problems that have been considered by the authors.

For the problem of FIG. 2, $b = 10^6$, and $d^t = 10^{15}$. From Eq. 21, the optimum value of $m$ is 3. (FIG. 2 was drawn for $m = 5$ for simplicity.) For $m = m_t = m_a = 3$, the retrieval time requires approximately 23 memory cycles for parallel processing (Eq. 18) where in the conventional case the entire file of $10^6$ items is searched.

To compare the storage requirement, assume 74 bits are needed to store the data. $10^{15}$ field-descriptor combinations require at least 50 bits. Hence the total storage per item not stored in lists is 124 bits. For $10^6$ items in the file, 124 million bit storage is required. In the list organization, however, the total storage per item would consist of 74 bits for the data part as before. These bits can be stored in two catenae, 38 bits per catena where the extra two bits are symbols for identifying data catenae. There are also three associative catenae, each containing 20 bits per address part (to accommodate $10^6$ addresses), 17 bits per descriptor part (to accommodate the $10^5$ lists per superfield) and one bit per symbol part-again, 38 bits per catena.

There are five catenae per item or a total of 190 bits per item. Since there are $10^6$ items in the file and from Eq. 4 there are less than 89,000 items in the tree, the storage requirement is of the order of 207 million bits which is less than double the requirement for the system in which no list organization is used. The composition of items in the two cases is shown in Chart I-5.

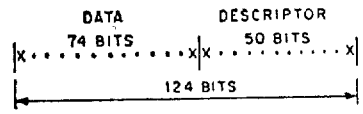

(a) CONVENTIONAL STORAGE ORGANIZATION

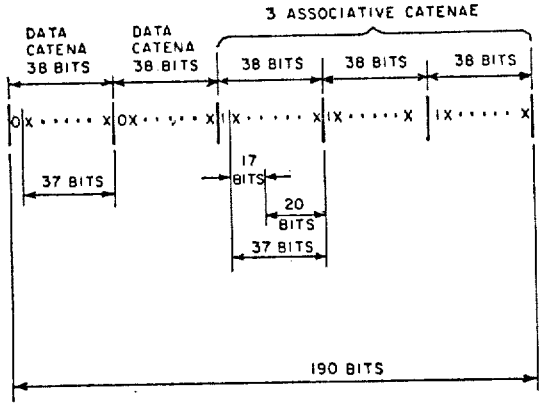

(b) Multi-list storage organization in 38 bit catenae

Chart I-5.—Composition of items

The ratio of the efficiencies is approximately $$\frac{I_p \text{ (conventional)}}{I_p \text{ (multiple-list)}} \frac{10^6 \times 124 \times 10^6}{23 \times 207 \times 10^6} = 26{,}000$$

This comparison was based on parallel processing with truly random access storage. An optimum of the product of cost and time can also be found when using a combination of a multiple head magnetic drum or disc system and a core memory, where the tree structure is stored in the core memory and where the file itself constitutes the multiple association area which is stored in a magnetic drum or disc system. For $m_t=5$ and $m_a=3$, the magnetic core system will have 75,000 addressable locations (Eq. 4).

Since the multi-list structure was suggested by the study of human thought processes, it is interesting to apply the foregoing results to a system of the size of the human brain. Invloved in this case are a number of memory systems, the larger of which may have $10^8$ items. (G. A. Miller, "A Note on the Remarkable Memory of Man," IRE Trans. on Electronic Computers, vol. EC–6 (1957), p. 194). The value of $m$ varies from 4 to 10 (authors interpretation of G. A. Miller's article "The Magical Number Seven, Plus or Minus Two: Some Limits on Our Capacity for Processing Information," The Psychological Review, vol. 63, No. 2 (1956), pp. 81–97. See N. S. Prywes, "Data Processing Aspects of Some Psychological Experiments, Perceptual and Motor Skills," January 1961, pp. 155–160). Taking the larger number $m=10$, from Eq. 21, assuming the system is optimum, the number of possible combinations of descriptors is $10^{80}$. The tree structure has about 9 levels and the number of items per list is between one and ten. Hence any item can be retrieved in about 15 memory cycles. This retrieval would correspond in the brain to retrieval times of the order of one second. From Eq. 26, the memory capacity of this system will be $10^{11}$ bits. At present, a truly random access memory of this capacity is not in existence. However, the retrieval time using even the slower disc memories will be considerably less for the multi-list memory than for the human brain so that it appears that it may be possible to simulate some of the brain functions in better than real time.

CHAPTER 2.—CONSTRUCTION AND EXPANSION OF A BALANCED DECODING TREE (1) Introduction The multi-list tree takes as inputs a variety of complete and/or incomplete codes called keys, and gives as outputs either a single location or a list of locations in the multi- association area. Unlike the conventional digital decoder such as the common diode matrix, the exact structure of the inputs to the multi-list tree cannot, in general, be known beforehand. Hence, the structuring of the tree is dependent upon the nature of the inputs. It is the object of this chapter to show how the trees are automatically structured in accordance with these inputs, while the subject of generation of the inputs themselves is left to chapter 3. The object of the next chapter is to show how a given information retrieval problem is processed for multi-list retrieval through an appropriate selection and structuring of a descriptor language which serves as tree inputs.

(2) Definitions

The practicability and efficiency of applying a computer to the filing or documentation problems may well depend upon the ability to adapt the ordering concepts, that prevail in a library or file, to the computer language. The following definitions will therefore attempt to relate the two areas in descriptive terms.

The objects of the information handling system are called items. These may be the separate individuals in a personnel file, an individual book in a library, or a stock item in a warehouse. The individual property, quality, or charactreistic of an item, is called a *descriptor*. An item *description* consists of a *set* of these descriptors. For the purpose of retrieval, a set of descriptors would be given that would constitute a *complete* description of the item to be retrieved, while any proper subset of this set would represent a partial description of the item.

A descriptor, in turn, is comprised of an attribute and its *value*, the attribute being a representation of one of a class of descriptive properties (i.e., color, or weight, or height, or rank). The value of the attribute would then be a particular element of the class (i.e., red, or 160 lbs., or 6 ft., or corporal).

If there are two different descriptors which could not appear in the same description of an item, such as in the case of rank where an item is either one rank or the other (i.e., major vs. corporal), then these two descriptors will be said to be exclusive. On the other hand, a set of descriptors is *inclusive* if they ever appear in a description. By extension, a set of descriptors is mutually exclusive if it is mutually "pairwise" exclusive. All descriptors having the same attribute are mutually exclusive.

We shall relate now the the above concepts to the tree, which is the fundamental scheme of the multi-list organization of the memory.

A tree in the sense of the multi-list structure is a network of *nodes* and branches arranged in levels. A number of *branches* fixed in advance and in conformity with the conditions of minimum retrieval time (cf. chapter 1) emerges from each node. The branches are associated with an ordered set of numerical values which constitute *keys* enabling a trace through the tree. A key may be a descriptor or an ensemble of descriptors belonging to inclusive attributes.

The descriptor classes of a single tree correspond to a number of attributes $1 \leqslant k_1 \leqslant f$, where $f$ is the maximum number of attributes assumed initially. In a system of more than one tree $f$ is equally divided between the number of trees in the system (cf. section 4 of this chapter).

One basic memory unit, the so-called *catena*, is associated with each branch of the tree, in other words, the numerical value which represents a key is stored in a catena. Though the ordered set of keys that designate the branches emerging from a single node has very little in common with an item as it was defined previously, it is nonetheless denoted as a tree item because, being an ensemble of keys, there exists a certain technical similarity.

The branches emanating from the nodes of the lowest tree level enter the multi-association area as lists. A list is a string of items which have at least one key in common. The items of a list are linked by providing each item with an address which leads to the next item on the list. The description of an item located—metaphorically speaking—at the intersection of *i* lists consists of *i* keys and addresses (catenae) where each key corresponds uniquely to one list.

*Filing* is the action that takes place when a new item is to be added to the information stored in the form of lists in an associatively organized memory.

*Deletion* is the action that takes place when an item is to be removed from the information stored in the form of lists.

*A Balanced Tree* is a tree that expands such that a balance of the lists emerging from the tree is maintained. This is accomplished by filling the levels of the tree to completion, i.e., no new levels are to be initiated as long as there are vacant catenae available in the preceding level. Consequently the only incompletely filled level of the tree is the lowest one. At the instant at which the lowest level is filled entirely the tree is *completely* balanced, i.e., the lists are uniformly distributed over the branches of the tree. While the number of branches is fixed in advance, in conformity with the rules of chapter 1, the number of levels in a balanced tree depends only on the number of different lists that have to be accommodated in the tree structure. In traversing the balanced tree from the root to the multi-association area via different paths, the number of nodes (and, hence, the number of tree items) encountered can at most differ by ONE. In other words, a search which requires the traversal of the balanced tree is almost equal in time for all the lists which would not be the case in a lopsided tree. By virtue of this property the balanced tree is particularly well suited as a decoding network for the fast retrieval of information.

The tree in the figures is portrayed in an inverted form, i.e., the root point is located at the top and the branches are oriented downward. With respect to this orientation we refer to the trace from the root toward the end branches as *descending* the tree, and the trace from the end branches toward the root as *ascending* the tree.

*List Keys* are keys which yield an affirmative comparison to a given *Reference Key* which may belong to an item to be listed or to an intem to be retrieved.

In the discourse on tree items we shall sometimes wish to distinguish between *Parent Items* and *Filial Items* where the catenae of a filial item are associated with the branches emanating from a catena of a parent item. With regard to the tree area, *Right* and *Left* are used in a metaphorical sense. For example, the right-hand area with respect to a certain list key describes the tree area in which those keys are embedded whose values are larger than the particular list key. The left-hand area corresponds to the area in which the keys, with values smaller or equal to the list key, are embedded.

A *Subtree* is a tree which encompasses all the branches and ramifications of branches emanating from any tree item. The order of the subtree depends on the level where it starts to branch. If the root of a subtree is located on the lowest level the order of the subtree is zero; if the root coincides with the root of the entire tree, the order is *n*; and if the root is located between the lowest and highest level the order of the subtree is *n—v*, where *v* indicates the level count beginning from the root of the entire tree.

(3) *The construction of a balanced tree*

The balanced tree is built up by adding progressively more keys as more data items are entered into the multilist memory. The keys of the first data item to be filed in the memory constitute the tree item corresponding to the root of the tree. Keys of subsequent data items may either have been entered into the tree previously or may be encountered for the first time. Accordingly, various cases of incorporating these keys in the tree structure arise. These cases are discussed and illustrated in this section. As shown in chapter 1, an optimum number of branches is between four and five, but for the sake of simplicity the nodes of the trees, in the examples of this section, have only three branches. Also the addresses associated with the keys are omitted, and instead they are indicated by directed lines connecting the catenae of a parent item to the corresponding filial items.

When a new item is to be added to the information stored in a multi-list organized memory the relationship of the keys characterizing the new item to those making up the tree has to be examined (e.g., for equivalence or inequivalence). If all the relevent lists that exist, i.e., items that have the same keys as the current item, were filed previously then the lists are located and the new item is incorporated in the corresponding lists according to a desirable order (e.g., in Push-Down fashion (Push-Down storage in the context of the present discussion means to insert the item to be filed at the top of the corresponding lists) or according to alphabetical order, etc.). The following example illustrates the essence of "Filing in Push-Down Fashion." Charts I–6a and I–6b illustrate the state of the tree before and after the filing of a new item, the keys of which are 27 and 78.

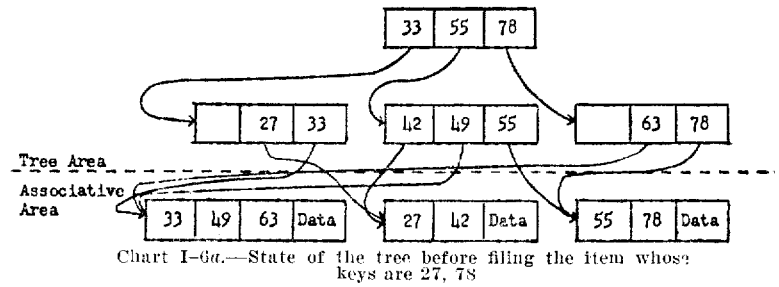

Chart I–6a.—State of the tree before filing the item whose keys are 27, 78

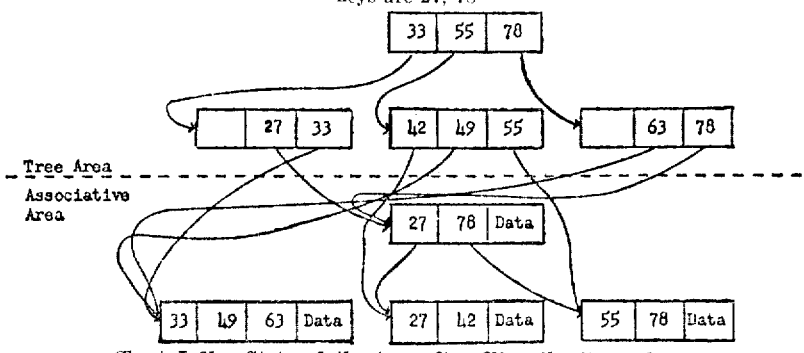

Chart I–6b.—State of the tree after filing the item whose keys are 27, 78

When only part or none of the required lists exist, new lists have to be added. In order to maintain the monotonic order of the key values the keys corresponding to the new lists have to be entered at a very definite location in the lowest level of the tree. If the tree item corresponding to this location contains a vacant catena the addition of a new list is a relatively simple matter. The vacant catena is easily located; then the key corresponding to the new list and the address which refers to the item to be filed are inserted in such a manner that the monotonic order of the keys is maintained. If, for example, the values of the keys to be entered in the tree of chart I–7a, were $K<17$ and $71<K<89$, vacant catenae would be available. However, to accommodate an item whose keys are 33 and 91 the existing key values have to be shifted such that both keys can be inserted in the proper order. This is shown in chart I–7b. So-called list keys, 55 and 93, which yield an affirmative comparison with respect to the reference keys 33 and 91 (i.e., $33<55$, $91<93$) are embedded in incompletely filled tree items. To preserve the monotonic order 17, 29 and 89 are shifted to the left before 33 and 91 are entered in the appropriate positions of the tree items.

cant catenae (one or more) are available in the particular item.

An alternate approach may allocate for the new tree item only as many catenae as actually are needed at the time. Whenever in an incompletely filled tree item, i.e., one which contains less than $m_t$ catenae, the need for an additional catena arises, the incompletely filled tree item is deleted and the memory space for a new tree item with the required number of catena is allocated from the unused memory space. A readjustment of the link addresses to preceding and subsequent items is necessary. This scheme may save memory space by minimizing the number of unoccupied catenae in the lowest tree level but on the other hand a large number of catenae are wasted because of the necessity to link the deleted tree items in the list of available space by so-called "jump" catenae (cf. chapter 4). This scheme would be more cumbersome to describe than the one discussed in the rest of this section.

When the tree item which is to contain the list key at the lowest level is completely occupied a search is conducted of the corresponding subtrees for the nearest tree

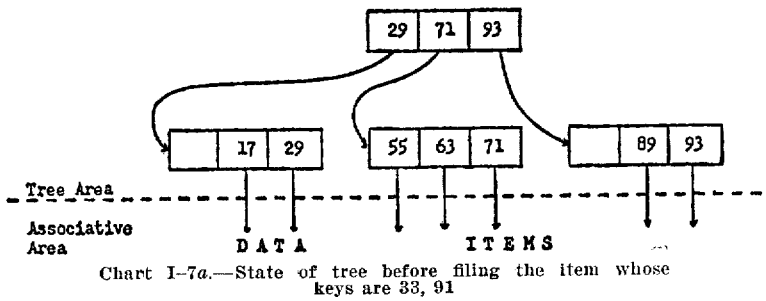

Chart I–7a.—State of tree before filing the item whose keys are 33, 91

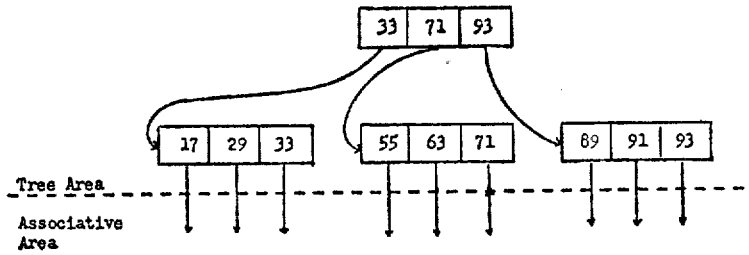

Chart I–7b.—State of tree after filing the item whose keys are 33, 91

When, due to the addition of a new list, the insertion of a new key requires a certain parent key to be ramified into filial keys, the memory space for the complete tree item (in conformity with the standard number of branches) is immediately allocated. The new tree item contains only two keys in the beginning, namely, the parent key located in the last catena of the new tree item and the key whose insertion provoked the formation of the new tree item. The first, second, etc., up to the penultimate catena of the new tree item remain vacant until the insertion of an additional key, due to the addition of a new list, requires their usage. Thus, vacant catenae will always be found at the left of an incompletely filled tree item; hence in the search for an empty space the inspection of the first catena yields the information if any vaitem containing an empty location. The order of the subtrees increases with the advancing search as shown in chart I–8a. When a vacant catena is located all the keys of the subtrees, within the limits of which the search is made, are shifted to the right if the vacant catena is found on the right of the list key and to the left if the vacant catena is located on the left. When after recursive shifting the catena to the left of the list key is vacated the new key, which served during the search as the reference key, can be inserted.

(It is well to keep in mind that in all cases discussed here the value of the list key is greater than the value of the reference key, in order to preserve the monotonic order of the keys the reference key must be inserted at the left of the list key.

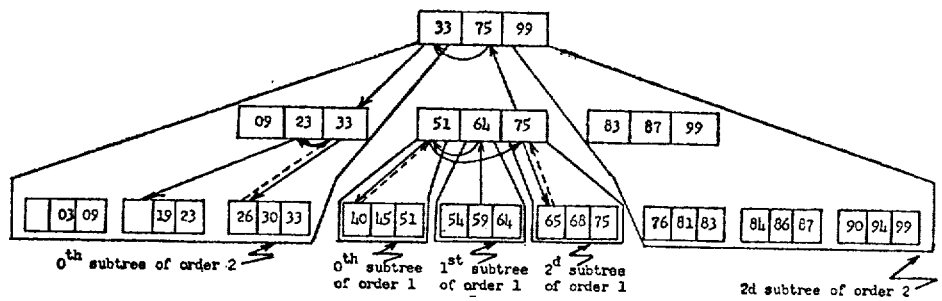

Chart I–8a.—Pattern of search for a vacant catena to accommodate the key value 57

Chart I–8a portrays the search pattern for the nearest vacant catena. Suppose that a new key, the value of which is 57, has to be added in the tree shown. The search covers the subtrees of order ONE and one subtree of order TWO. The search would have been extended to the second subtree of order TWO had not a vacant location been found in the 0th subtree of order TWO.

After the vacant catena is located all the keys between 19 and 54 inclusive are shifted to the left such that 57 can be inserted in the proper order. This is shown in Chart I–8b.

The suquence in which the subtrees of order $n-\nu$ are searched depends upon the position of the list key in a certain tree item. Because the number of brances, $m_t$, is fixed (by efficiency considerations, see chapter 1), the sequence of the search can be stored in a table. Upon locating the list key by machine inspection the pertinent row of the table is invoked and the search proceeds in a pattern determined by the search indices and signs of the table.

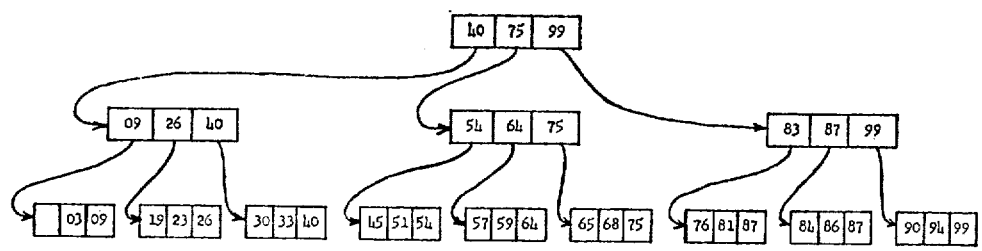

Chart I–8b.—State of the tree after insertion of key value 57

*(4) The search and shift algorithm for a vacant catena*

Flow charts for the search and shift processes are shown in FIGS. 5, 6 and 7.

The flow graph of chart I–8a portrays an illustrative example of the search process for a vacant catena.

The search commences from the lowest level tree item containing the list key. It proceeds then in a systematic fashion to include subtrees of increasing order. In order to obtain the nearest vacant catena the subtrees to the left of the list key are searched from the right (except for the lowest level tree items in which vacant catena are always found at the left of an item), while the subtrees to the right of the list key are searched from the left. Each subtree is searched exhaustively before the search is extended to other subtrees of the same order. When all subtrees of order $n-\nu$ are searched exhaustively the search is extended to subtrees of order $n-\nu+1$, etc.

Suppose, $m_t$, the number of branches is 5. The following table will be stored in the memory:

| Position of List Key Catena in the Tree Item | Search Index and Sign | | | |
|---|---|---|---|---|
| q=0: | +1 | +1 | +1 | +1 |
| q=1: | −1 | +2 | +1 | +1 |
| q=2: | −1 | +2 | −3 | +4 |
| q=3: | −1 | +2 | −3 | −1 |
| q=4: | −1 | −1 | −1 | −1 |

The significance of the table can best be explained with the aid of an example shown schematically in Chart I–9. Let us assume that the second subtree of order $n-\nu$, whose root is a list key, has been searched exhaustively. The other subtrees of order $n-\nu$ are now in line to be searched next. The row in the table which refers to the position of the list key catenae in the item, determines the search sequence to locate the vacant catena closest to the list keys. Since the position of the list key in the tree item on the $\nu^{th}$ level of the tree corresponds to $q=2$ the third row of the table is invoked. The search indices contained in the corresponding row (−1, +2, −3, +4) determine the search pattern in the following way:

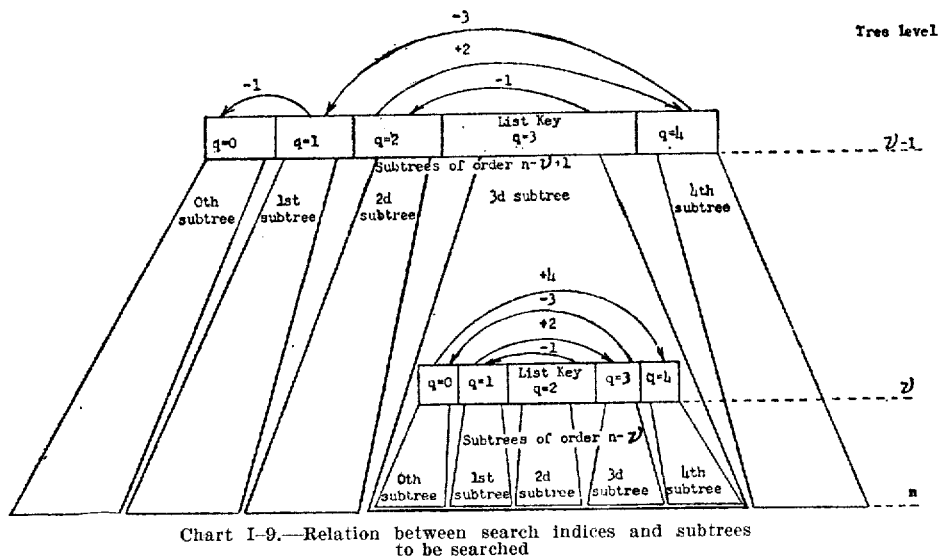

Chart I-9.—Relation between search indices and subtrees to be searched

First −1 is added to the address of the list key in the working register, which leads to the root of the 1st subtree as indicated in Chart I-9 by the leap line bearing the index −1. Consequently the 1st subtree is the next in line to be searched. Upon completion of the search of this subtree the addition of the next search index, +2, to the address of its root will lead to the root of the 3d subtree, as indicated by the leap line with the index +2. Hence, the 3d subtree is to be searched next. From there the addition of the index −3 will lead to the search of the 0th subtree followed by the addition of +4 and the search of the 4th subtree.

If no vacant catena is found in the $n-\nu$ order subtrees the search will proceed to subtrees of order $n-\nu+1$. The list key on level $\nu-1$ is found in the tree item position corresponding to $q=3$; consequently the row with indices −1, +2, −3, −1 will be invoked yielding the sequence of search indicated by the leap lines in Chart I-9, to wit: 2d subtree, 4th subtree, 1st subtree, 0th subtree.

When a vacant catena is encountered the shift routine is invoked. The shift operations for a vacant catena found to the left of the list key (search sign="−") or to the right (search sign="+") are the same in principle though somewhat different in detail.

The keys between the vacant catena and the list key are shifted to the left or right according as the vacant catena is located to the left or right of the list key. FIGS. 6 and 7 describe the shift algorithm for a left-shift.

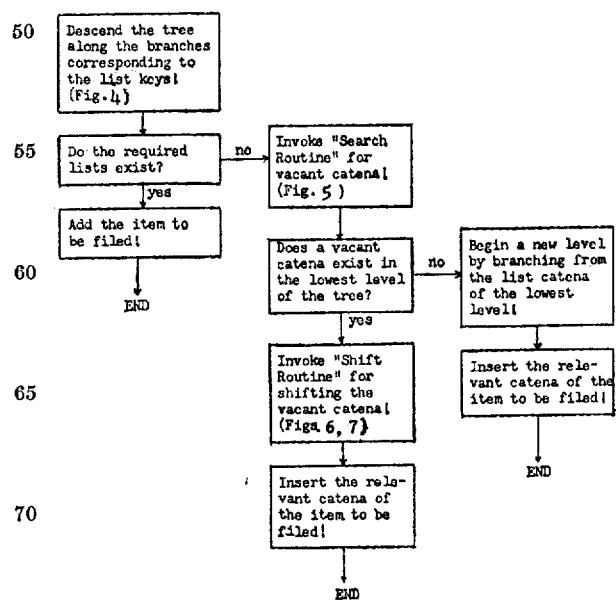

Chart I-10.—Block diagram of subroutines for filing a new item in a multi-list structure

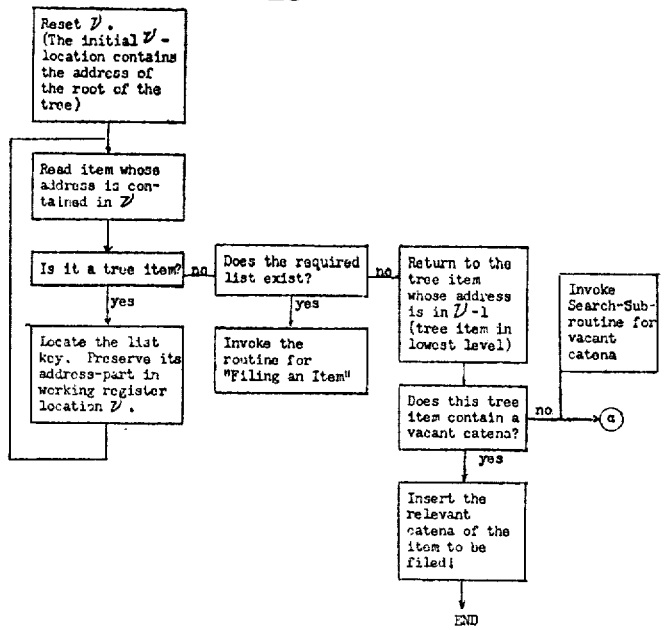
FIG. 4.—Routine for descending the tree and testing the existence of the relevant list
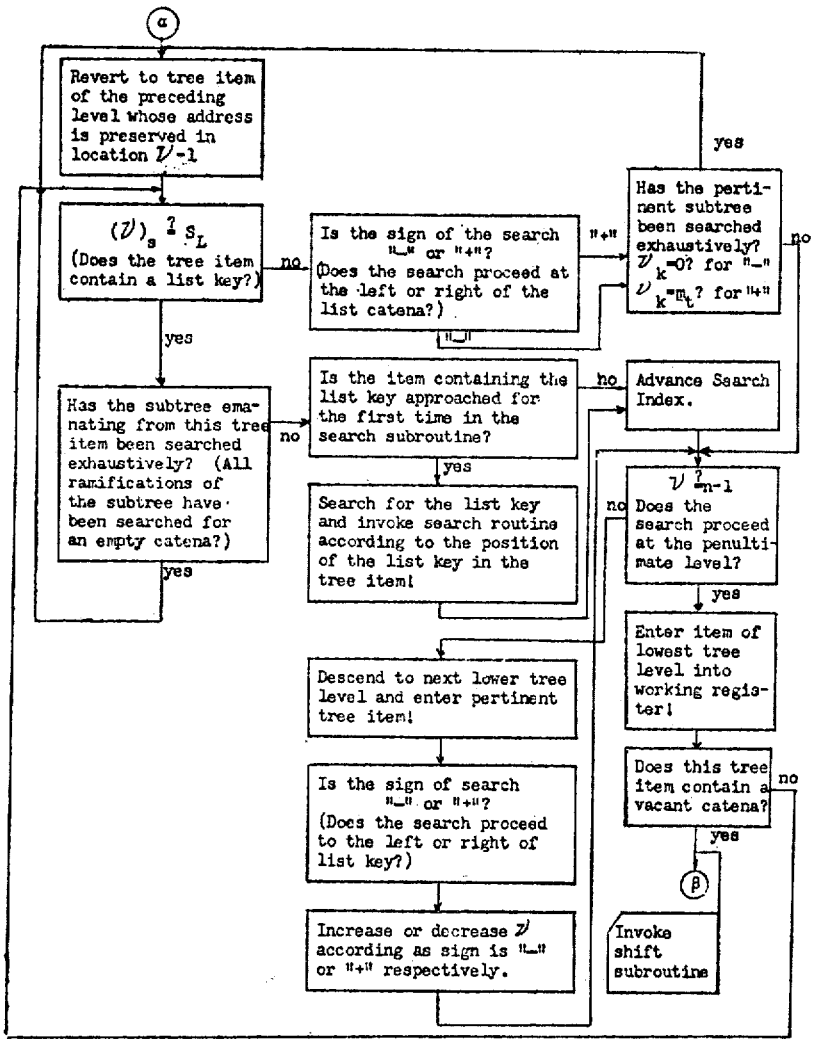
FIG. 5.—Search subroutine

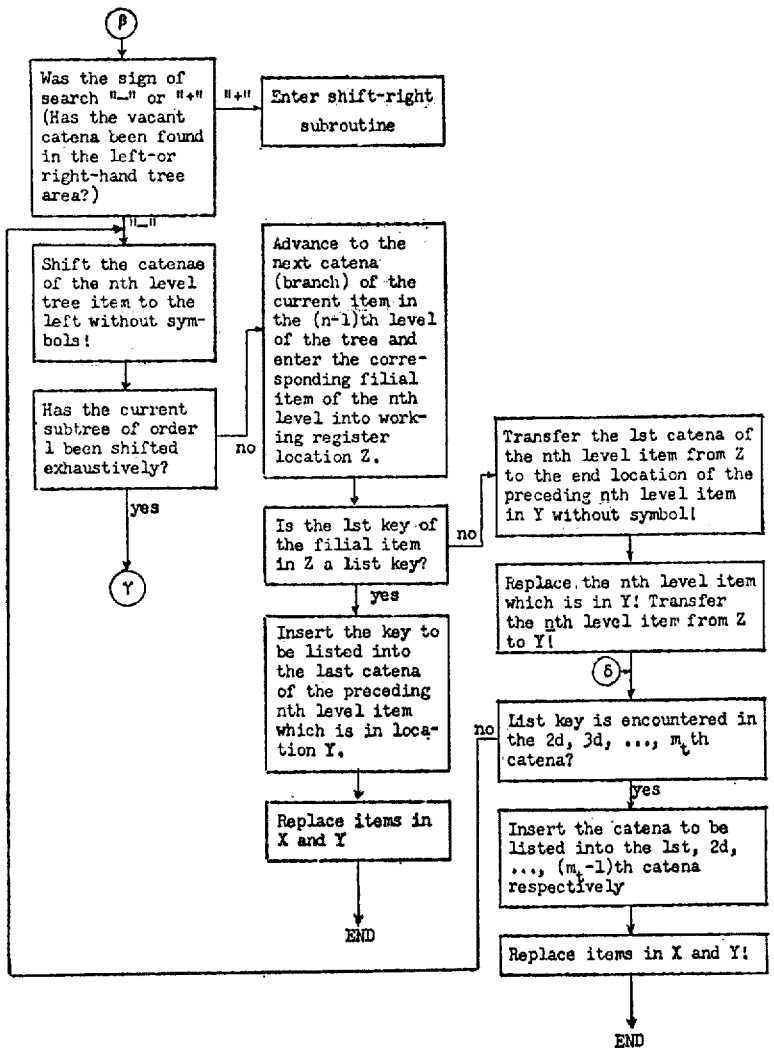

FIG. 6.—Shift-left subroutine

In the preceding sections of this chapter the use of the tree as a stratagem for the simulation of an associative memory is described and illustrated.

In addition to this, the ability to have branches associated with monotonically increasing numerical values make the tree an efficient tool for sorting an arbitrarily arranged ensemble of numbers. Such a tree also facilitates correlation studies.

Another application of the tree is as an efficient interpreter of list processing languages such as IPL or LISP. In this application the object language instructions are encoded on the tree whose end branches lead to the lists on which the instructions controlling the target machine are filed. The tree will have as many end branches as there are object language instructions. The appropriate list of the target machine instructions will follow the tree in the proper sequence for execution.

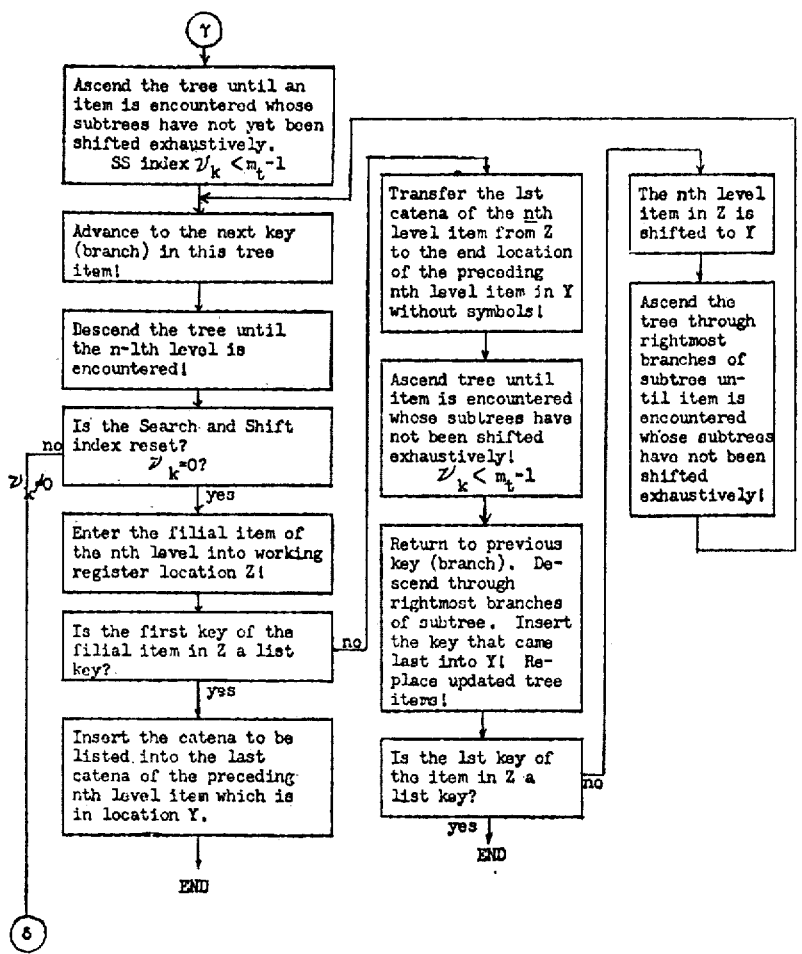

FIG. 7.—Shift-left subroutine

CHAPTER 3—AUTOMATIC STRATIFICATION OF INFORMATION

(1) Introduction

Much of the development of science has been concerned with the organization of knowledge into strata. Within such a structure new developments are recorded and, as a result, may change the structural organization. Humans have found such stratified organizations useful for retrieving facts and for applying deductions to create what is a contemporary concept of civilization. In the field of information storage and retrieval we find similarly a need for structuring the information in strata. That is, the use of content addressed memories by themselves is not sufficient to solve the retrieval problem, and additional stratification of the descriptor language is necessary.

The problem treated in the following is thus: Given an arbitrary information file how are the elements of description of the data in the system to be arranged, so as to effect a desired stratification. A procedure is discussed by which the input data are semi-automatically processed into "exclusive" attribute groups for input to the multilist trees, thereby improving efficiency in terms of speed, storage capacity and versatility of retrieval. The stratification scheme should be flexible, so that changes in the stratified structure of the descriptor language can be easily carried out. This is necessary for two reasons. (1) Every item input to the file, based on its description, should be capable of changing the organization of the descriptor language. (2) We visualize a human-machine tandem system in which a human monitor can easily change the descriptor language organization, thereby affecting the processing of new items considerably. This might amount to a human starting or reorganizing periodically a filing system and letting the machine continue with the system. In this case, the human monitor teaches the machine by example.

The desirable stratified description language is described in section 2, and how this structuring fits into the retrieval system is discussed in section 3. The problem that faces us after that is establishing the feasibility of a process leading to such a stratified structure. Toward this end we have flow charted in section 4 a process that, we judge, should achieve the desired stratification. Next, we have carried out in section 5 a small scale simulation of the process by humans. We plan in the future to conduct larger scale machine simulation and treat a proof of feasibility more rigorously.

(2) Description of the desired structure of a descriptor language

The desired stratification of the descriptor language consists of separating the entire vocabulary into exclusive attribute groups. The descriptors in each attribute group represent exclusive values, i.e., no description contains more than one descriptor from a single attribute. Thereby an attribute-value stratification illustrated in FIG. 8 is obtained. The only condition here governing the separation of the descriptor vocabulary into attribute groups is that descriptors representing values in a single attribute would be exclusive. These exclusive attribute groups have already been defined in chapters 1 and 2. Two attribute groups have been defined as well as being "inclusive" in that a description of an item in the information file may contain descriptors belonging to any combination of attributes.

The field of information retrieval includes a diversity of files ranging over business, scientific and language data. The stratification of business data in the structure portrayed in FIG. 8 is sometimes obvious as its importance has been evident to the initiators of the particular business system. An example would be a military personnel file. Such a file may have a very large number of items but relatively few descriptors. The attributes in the descriptor language would be age, rank, serial number, name, height, etc., while the specific years of age, the specific rank, specific serial number, the alphabetic breakdown of the name, specific height, etc., would be values corresponding to the respective attributes. In scientific problems, the stratification of the descriptor language is very complex. It is the contention of this chapter that both business and scientific problems can be organized into attribute-value strata and therefore be handled efficiently by the information retrieval system. (No solution to language problems is in sight.) As an example of a scientific information retrieval system, we will consider the ASTIA catalog.

The ASTIA catalog differs from the personnel file in that it has a large number of descriptors. The structure of the ASTIA descriptor language is portrayed in chart I-15. As is shown, it is organized in three strata: The descriptor vocabulary of 10,000 descriptors is divided among 19 fields which are distributed into 292 groups. An example from this catalog is: Field: aeronautics; group: aerodynamic configurations; description: air foil; airplane model, etc. The position of this example in the stratified ASTIA language is illustrated in the middle of chart I-15. This stratified structure is generated by the human analysts. It is expandable by the analyst to include any degree of specialization but is lacking as to any organized or algorithmic cross referencing capabilities. Chart I-16 illustrates the structure of a descriptor language similar to ASTIA but structured in exclusive value-attribute groups. The stratification into three levels, similar to ASTIA can be maintained. The entire descriptor vocabulary is divided into $f$ inclusive attribute-groups. On the average, then, the number of exclusive values per attribute-group is obtained by dividing the entire vocabulary (10,000) by the number of attribute-groups ($f$). (If $f$ is taken as $f=30$), then there are approximately 300 values per attribute, the choice of $f$ will be discussed further.) The attribute-groups in chart I-16 correspond in strata level to the fields in chart I-15. The second level of stratification is obtained by dividing the values corresponding to one attribute-group into the individual attributes which correspond to the same level of "groups" in the ASTIA system. We have not considered, so far, machine processes for the second level of stratification. It is assumed that it will be based on study to determine the subgroups of exclusive descriptor which are inclusive (namely appear together in a description) with common descriptors in other attributes.

It is our contention in the following that a descriptor language of the size of the ASTIA catalog can be divided into a relatively small number of exclusive-attribute-groups (approximately 30). That such a separation into attribute groups is possible can be satisfactorily demonstrated in two ways. First, by simulating processes that perform such separations, which is the subject of sections 4 and 5 of this chapter, and second, by rigorous treatment of the subject which we plan to perform at a later time. However, our initial assumption that such a separation is possible was based on statistics of descriptor distributions in descriptions of items and on the probabilities of existence of a solution to the descriptor separation problem.

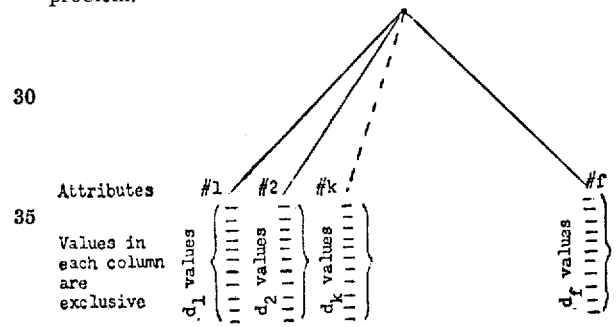

FIG. 8.—Schematic diagram of a descriptor language with two strata: $f$ attributes and $d_k$ exclusive values per attribute ($1 \leq k \leq f$)

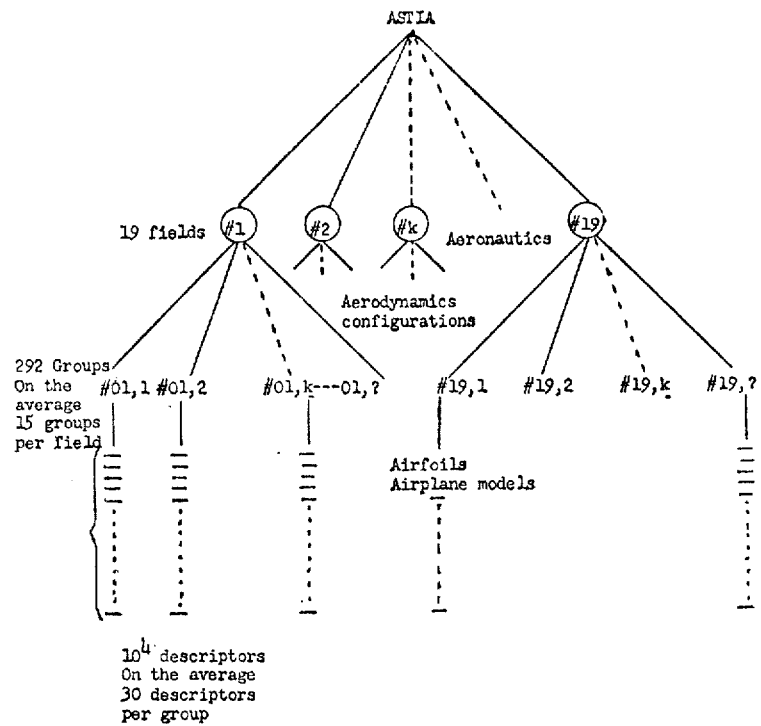

Chart I-15.—Schematic diagram of ASTIA descriptor language with three strata: 19 fields, 292 groups and 10,000 descriptors

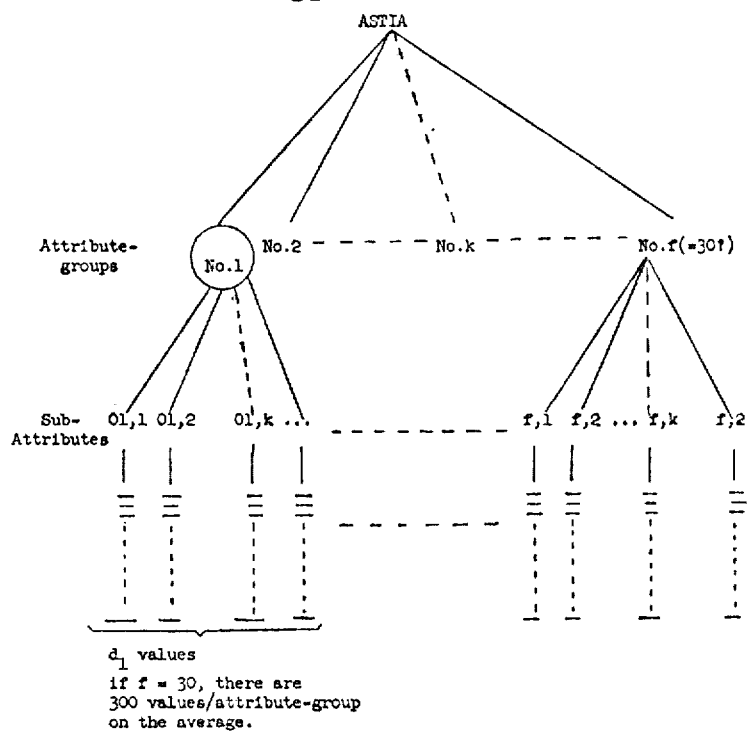

Chart 1-16.—Schematic diagram of descriptor language with three strata that is proposed for possible use in ASTIA. The attributes are inclusive, but the values corresponding to a single attribute are exclusive Available ASTIA data indicates that the longest description of a document in that file consists of 20 descriptors ("Optimization and Standardization of Information Retrieval Languages and Systems." Technical Status Report No. 2, Contr. AF49 (638), 835, Applied Mathematics Department, Remington Rand Univac, Blue Bell, Pa., June 1961.) Therefore, there exists 20 "inclusive" descriptors. These must then belong to at least 20 exclusive attributes. In chart I-16, 30 exclusive attribute-groups are assumed ($f=30$) with an average number of values per attribute group corresponding to 300 ($d_k$ average$=300=d_1=d_2=d_3$ etc.), where $f$ is a reasonably small number slightly larger than the minimum number of such attributes (which is for the case of ASTIA equal to 20). This arrangement is such that descriptor combination which would contradict the exclusiveness of descriptors in each attribute group correspond to descriptions not actually used in the file. Since the latter consists of the great majority of such descriptions the arrangement of descriptors in exclusive attribute groups should be possible. This reasoning is rather intuitive, but it is further substantiated in this chapter by a statement of flow charts which separate the descriptors into the exclusive attribute groups and by simulation examples. We plan to follow this by large scale machine simulation and/or more rigorous analysis.

Human initiation of such a stratified descriptor language consists of assigning descriptors to attributes. We consider the description as a number where the digits corresponding to a value in a particular attribute are assigned specific positions. If the descriptors are stated in rows then the columns correspond to attributes. The woman initiator of the file would examine a number of incoming items and assign the descriptors to positions corresponding to exclusive attributes. The machine process that is proposed in section 4 either initiates the assignment of descriptors to exclusive-attribute-groups or continues such a process after the initiation has been done by humans. This assignment is based entirely on the descriptions of the items coming into the file. Also a human monitor can use his judgement from time to time in transferring from one attribute group to another or to initiate new attribute groups. He can also create new descriptors by combining a number of descriptors previously used into a new one, and by assigning this combination as a new value to specific attribute.

An examination would indicate that a decrease in the total number of attributes ($f$) improves retrieval and item addition and deletion efficiency. For one thing, the description of the longest item consists of the values in all the attribute groups, and the less there are of such attribute groups the shorter would be the description. Also, since descriptors are assigned positions in a complete description, the positional significance reduces the number of digits necessary and must be sufficient to define such an individual descriptor only in an attribute group, instead of defining it in the larger vocabulary. In other words, the context within which a descriptor is stated conveys part of the information. Other advantages of such a system are evident from its application to the multi-list retrieval schemes. Also, it is felt that similar advantages would result in using other retrieval schemes.

*(3) Function of descriptor language stratification in information retrieval*

The block diagram of chart I-17 outlines the tasks performed by the assignment of attribute programs in the overall information retrieval process of the multi-list system. The process is initiated by orders for retrieval (or storage). This is accomplished by an item description which may appear in natural language (block 1 of chart I-17).

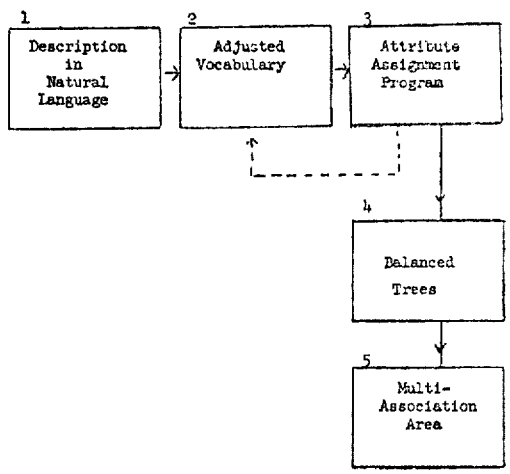

Chart I-17.—Gross flow chart showing the part of the attribute assignment program in the multi-list information retrieval process.

In block 2 the input description is encoded in machine code in accordance with the Adjusted Vocabulary, which is an updated list of descriptors previously encountered. This encoding may utilize a tree structure (as described in chapter 2) which translates a natural language descriptor into an updated machine code. As will be shown, the machine code may change frequently as it is designed to make machine operation efficient. In the case of a new descriptor, which does not appear on the Adjusted Vocabulary, it is processed in block 3 and then entered in the Adjusted Vocabulary in block 2. A description input is referenced to the attribute assignment program block when two or more descriptors in the incoming description have previously been assigned to the same attribute group, i.e., previously they may have been considered "exclusive," while in the new item they are found to be "inclusive." Thus, there is a reassignment of such descriptors in block 3, and then a correction of the Adjusted Vocabulary is called for.

Block 3 contains a program which takes as its input a new descriptor, or one that has been previously reassigned, and assigns it to an exclusive attribute group. It may happen that a previously assigned code will have to be reassigned. These "adjusted" codes, and additional codes which may change in the attribute assignment program, are fed back to the Adjusted Vocabulary. Fixed positions in a description are assigned to the various trees in block 4 and the appropriate keys can now be added to the respective balanced trees. The balanced trees, as described in chapter 2, perform a decoding function which locates the items of retrieval (or storage) in the multi-association area, shown in block 5.

The purpose of the Adjusted Vocabulary is to maintain freedom of changing machine code assignments of descriptors, without affecting the descriptor language used to communicate with the machine. To handle a variety of exceptions, additional bits may be provided in the Adjusted Vocabulary to identify descriptors stated in codes other than the ones generated in the Attribute Assignment program.

A descriptor ($d$) is designated, after it is assigned to an attribute, by a code consisting of a subscript pair, $i$, $j$, where $i$ is the attribute-group designator and $j$ is the serial index designating the value. A descriptor, as input to the Attribute Assignment program from the Adjusted Vocabulary, may be encoded in two ways depending on an auxiliary bit as follows:

If the auxiliary bit is "1," then the code is the number $i$, $j$. If a descriptor, thus coded, appears in a current input description, it must be determined whether the current description makes the descriptor inclusive or exclusive to the currently assigned column (attribute). In the case that the descriptor is inclusive it may be included in another column and renamed. (Columns are denoted by $c$ with a subscript.) Note that only the current input description could cause this inclusiveness, the reason being that if any descriptions input previous to the current description had caused the inclusiveness, then the descriptor in question would have been renamed at that time and shifted to a column.

If the auxiliary bit is a "0," the code is any number whatever within the range of defined code numbers or natural language descriptors. In this case the descriptor may be assigned to an attribute group and named appropriately.

(4) *The automatic attribute assignment program*

It is the object of this program to organize all input descriptions into at most $f$ (initially) columns, where, in time, each column will represent a set of exclusive attributes, and then to distribute these $f$ columns among the $m_a$ (initially) trees. Note that the word "initially" is used in connection with $f$ and $m_a$. This means that, given an arbitrary set of descriptors it might only be possible to estimate, initially, the entire number of exclusive attribute groups; therefore, the program can be initiated with this estimated number, $f$. However, it should always be possible to increase or decrease the number of attribute groups should it be found, either by machine or human, to be necessary.

The purpose of the program is to sift the descriptors by some process of elimination into exclusive attributes. The rule by which the exclusive attribute columns are formed is simply that all descriptors in a given column must be exclusive. The words "column" and "row" will become clear in the example which follows, where the exclusive descriptors are arrayed into columns, and inclusive descriptor groups are represented by rows.

The process for doing this is first briefly described and is then followed by a corresponding set of steps and by a flow chart.

(5) *Program description*

For a given input descriptor there may be none or one or more exclusive columns to which it can be assigned. If there is one exclusive column then obviously the descriptor is placed there. If more than one exclusive column exists, then the descriptor may be assigned to any of them.

In the case where there are no exclusive columns to which the descriptor may be assigned there arises the necessity of shifting descriptors to other columns in order to provide an exclusive column. For instance, if a descriptor $d_{i,j}$ exists in a column $c_i$, thus preventing $c_i$ from being exclusive to the input descriptor $d_{i,j}$ may be moved to another column $c_k$. By such a process $d_{i,j}$ would become $d_{k,j}$, and the input descriptor could be assigned to $c_i$ thereby becoming $d_{i,j}$. This does not mean that the input descriptor has the same attribute as the former descriptor in $c_i$, but that $c_i$ now represents a different set of exclusive attributes. Such a process is called a "first order renaming."

If for every $c_i$ there is no descriptor $d_{i,j}$ which can be shifted to some $c_k$, so as to make $c_i$ exclusive to the input descriptor, then a second order renaming is attempted. Here a $d_{k,j}$ in a column $c_k$ can be shifted to an exclusive column $c_x$ so as to make $c_k$ exclusive to $d_{i,j}$. Note that before the shift of $d_{k,j}$ to $c_x$, $d_{i,j}$ was inclusive to $c_k$. Now upon the shift of $d_{i,j}$ from $c_i$ to $c_k$, $c_i$ becomes exclusive to the input descriptor, which can be assigned to $c_i$. This process is a second order renaming, and such a process can be extended to $n^{th}$ order renaming.

However, some upper limit on the order should be set, and any deadlock reaching that order would be considered an *absolute* deadlock. In this case, the conclusion is reached that the input descriptor, being inclusive to every column has an attribute which does not belong to any of the columns. At this point the number of exclusive attribute sets $f$ is either increased by one and is assigned to one of the trees, or a new tree may be started, or recourse is made to a human monitor. In time, both the numbers of attribute groups $f$ and the trees $m_a$ may increase. At any given time there will be a number of errors in the system, in the sense that a human would not consider as exclusive all of the descriptors classified by the machine as exclusive. But the machine can only relate what it has seen and it is the entire body of preceding information (descriptions) which determines in general the extent of error in the system. Use can also be made here of the human, who periodically monitors the system and removes the errors. He effectively adds a "correlative impulse" to the system which restores it to a state of smaller error. Note, however, that the actions of the automatic program are intended likewise to make the system tend toward an errorless state, but that its success depends upon the correlation of all past descriptive data and the chronological sequences of its inputs.

(6) *Program description in flow charts and corresponding steps*

The above renaming program is further described by the flow chart for first and second renamings in FIGS. 9 and 10. The renaming program is part of a larger process described in FIG. 11. In the following, the flow charts are expalined with the aid of steps corresponding to the numbered boxes in the flow charts.

The input is a description D which consists of a sequence of descriptors $d_1, d_2, \ldots, d_k, \ldots d_r$. Two constants appear in the program $k_1$, and $k_2 \cdot k_1$ is the allowable number of renamings, $k_2$ is a "0" or a "1" indicating recourse to a human monitor or a continuation of program control calling for an increase in the number of columns, respectively. The $f$ indicates the total number of columns at a given time. The constants are subject to change by the machine operator during the course of the program.

The process steps of the Attribute Assignment Program (for the flow chart of FIG. 11) are as follows:

(1) $k$ indexes the descriptors 1 through $r$. Set $k=1$.

(2) $n$ indexes the order of renaming. Set $n=1$.

(3 Is the auxiliary bit of the $k$th descriptor equal to "1"? If it is, then the Attribute Assignment Program had previously processed it and had at that time given it a code $(i, j)$, indicating that it was placed in the $i$th column and was the $j$th distinguishable descriptor in the column. In this case, go to step 4. If $d_k$ (the $k$th descriptor is in natural language and the auxiliary bit is "0," go to step 15.

(4) Since the descriptor name $(i, j)$ tells us its previous column was $c_i$ we try to place it there; however, if some preceding descriptor in the current description $(d_1, d_2, \ldots, d_{k-1})$ was placed in $c_i$, then two descriptors that were previously assumed exclusive are now found to be inclusive. Therefore, if a descriptor from D has not already been placed in $c_i$, go to step 5, otherwise, go to step 6.

(5) Put $d_k$ into $c_i$ and go to step 10.

(6) Have $k_1$ renamings been performed? If not, go to step 7. If so, go to step 12.

(7) Perform an $n$th order renaming. The renaming is required because two (or more) of the descriptors in D are in the same column. Let these two descriptors be denoted $(i,j_1)$ and $(i, j_2)$. (If there are more than two descriptors in a column then the following applies to the entire set of such descriptors taken pairwise.) FIGS. 9 and 10 show first and second order renamings respectively. The details of a general micro program flow chart for an $n$th order renaming are left for a later report; however, the inductive procedure can now be applied. These renaming processes have already been discussed previously.

(8) Has the renaming succeeded? If not, go to step 9, otherwise go to step 10, and also feed the new $i$, $j$ code back to the Adjusted Vocabulary.

(9) Increase $n$ by 1 and return to step 6.

(10) Have all $r$ descriptors $(d_1, d_2, \ldots, d_{k=r})$ been placed? If not, go to step 11. If so, go to step 16.

(11) Increase $k$ by 1 and go to step 2.

(12) $k_1$ set to "0," calling for a human monitor? If so, go to step 13, otherwise go to step 14.

(13) A human attempts to make an appropriate renaming so as to make some column exclusive to $d_1$. If he cannot do so, then he returns control to step 14. If he succeeds, then the program feeds back all new $i$, $j$ codes to the Adjusted Vocabulary.

(14) The number of columns is increased by one and $d_k$ is put into this new column. The new $i$, $j$ code is fed back to the Adjusted Vocabulary and the program returns to step 10.

(15) If the check bit is "0," then this descriptor has never been processed by the Attribute Assignment Program before and must be assigned a column and a position in the column, i.e., an $i$, $j$ code. These assignments are made, however, after all those descriptors that have an $i$, $j$ code have been placed; therefore, this descriptor is put onto a list L, and the program returns to step 10.

(16) All of the $i$, $j$ coded descriptors have been assigned places, and what remains is to drop the descriptors on the list L into the remaining unused columns. There have to be enough columns available because the maximum description length always determines the minimum number of columns.

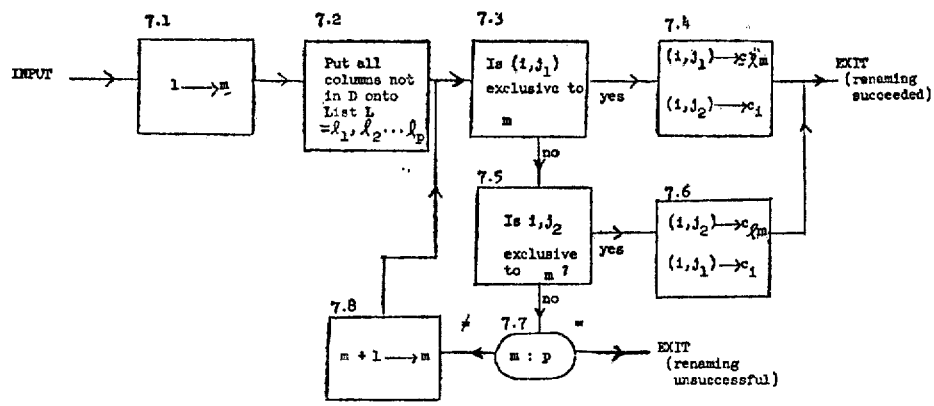

NOTE: p is the number of unused columns in the description.

FIG. 9.—First order renaming

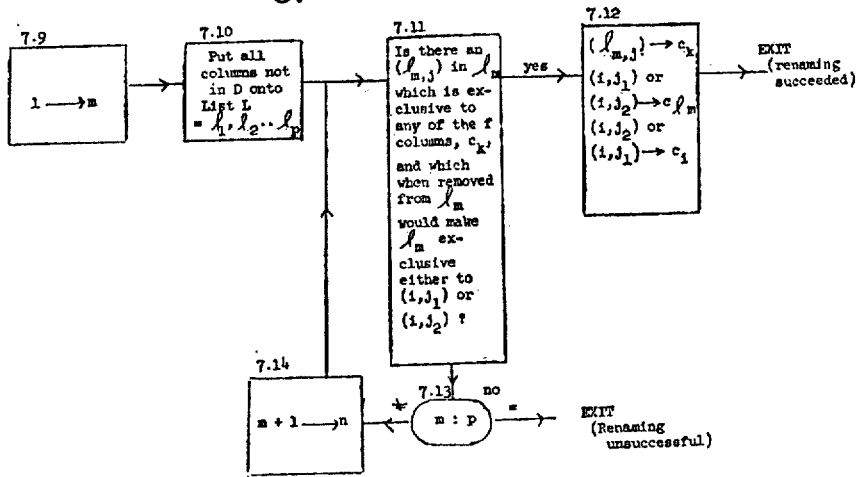

FIG. 10.—Second order renaming

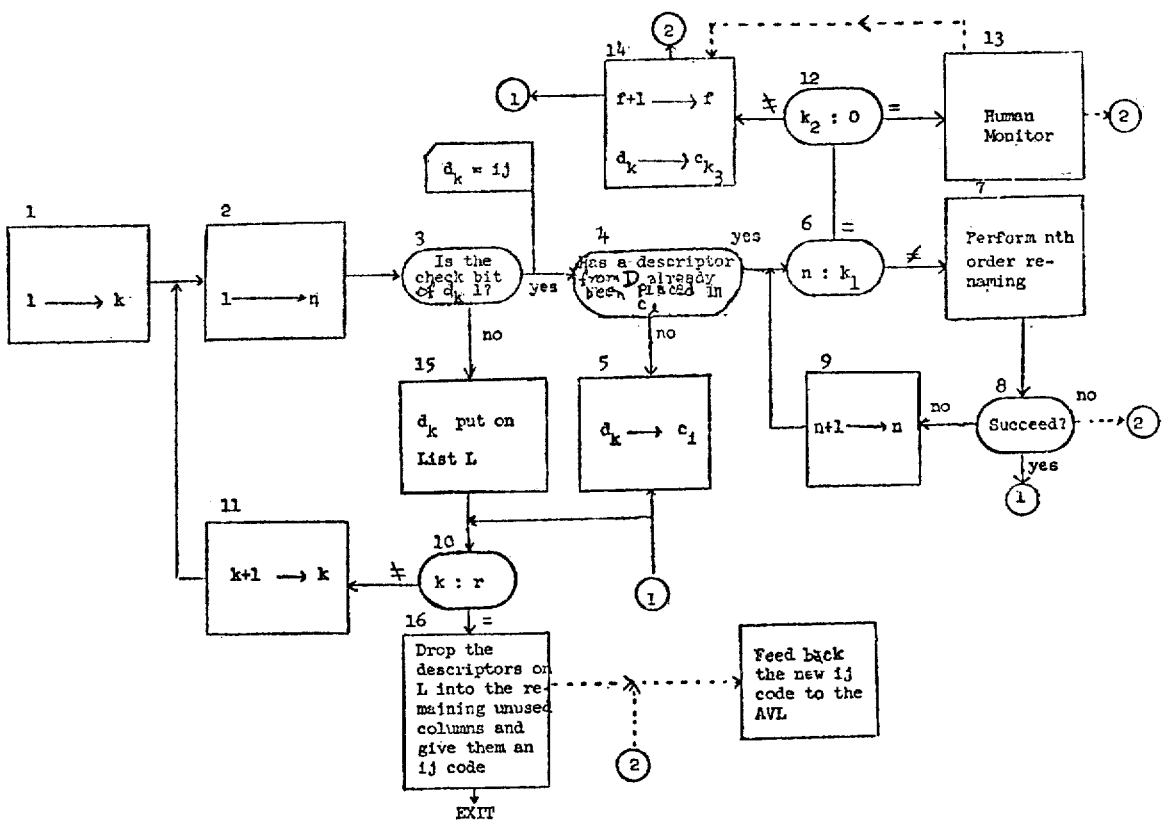

FIG. 11.—Flow chart of the attribute assignment

*(7) A hand simulated example*

In the following example a list of seven items are to be encoded into exclusive attribute groups. There are four tables in this chapter used to aid in the explanation of the process. The first presents the seven input items as they would appear at the machine input, in natural language; however, for conciseness, two digit decimal numbers are used to represent natural language descriptors. Table 3 consists of the Adjusted Vocabulary. The noncircled numbers indicate the $i, j$ codes of the descriptors at the end of the processing of the seven items. The circled codes are the intermediate codes assigned during the process and later renamed. The $i, j$ code consists of four digits. The first two designate $i$ and the last two, $j$.

Table 4 shows the placement of descriptors into appropriate columns. The $i, j$ codes are used to establish the placement in Table 4, but only the $j$ part of the $i, j$ code is retained since the column indicates "$i$." However, in the Adjusted Vocabularly the entire $i, j$ code is recorded.

There is a short discussion on the entry of each item in Table 4, that relates the algorithm to the flow chart in the preceding section (FIG. 11). Table 5 is auxiliary to the discussion and shows the input items with their current $i, j$ codes (current at the time of addition of each item). Also, Table 5 is effectively a synthesis of the information in Tables 2 and 3, and it is inserted for convenience of explanation.

TABLE 2.—DESCRIPTION CORRESPONDING TO FIRST SEVEN INPUT ITEMS IN CHRONOLOGICAL ORDER (1) 11, 19, 32
(2) 32, 25, 08, 18
(3) 11, 18, 25
(4) 41, 16, 08
(5) 11, 41, 34, 25
(6) 16, 34, 25, 08
(7) 16, 32

TABLE 3.—ADJUSTED VOCABULARY

| Natural Lang. Descriptor | i,j codes |
|---|---|
| 11 | 0101 |
| 19 | 0201 |
| 32 | 0301 |
| 25 | 0102  0501 |
| 08 | 0202  0102 |
| 18 | 0401 |
| 41 | 0102  0402 |
| 16 | 0302  0202 |
| 34 | 0203  0302 |

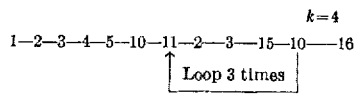

TABLE 4.—ATTRIBUTE ASSIGNMENT COLUMNS

| Items | Column 1 | 2 | 3 | 4 | 5 | After Addition of Item |
|---|---|---|---|---|---|---|
| 1 | 01 | 01 | 01 | | | 1 |
| 1 | 01 | 01 | 01 | | | |
| 2 | 02 | 02 | 01 | 01 | | 2 |
| 1 | 01 | 01 | 01 | | | |
| 2 | | 02 | 01 | 01 | 01 | 3 |
| 3 | 01 | | | 01 | 01 | |
| 1 | 01 | 01 | 01 | | | |
| 2 | | 02 | 01 | 01 | 01 | |
| 3 | 01 | | | 01 | 01 | 4 |
| 4 | | 02 | 02 | | | |
| 1 | 01 | 01 | 01 | | | |
| 2 | | 02 | 01 | 01 | 01 | |
| 3 | 01 | | | 01 | 01 | 5 |
| 4 | | 02 | 02 | 02 | | |
| 5 | 01 | 03 | | 02 | 01 | |
| 1 | 01 | 01 | 01 | | | |
| 2 | 02 | | 01 | 01 | 01 | |
| 3 | 01 | | | 01 | 01 | |
| 4 | 02 | | 02 | 02 | | 6 |
| 5 | 01 | 03 | | | 01 | |
| 6 | 02 | 03 | 02 | | 01 | |
| 1 | 01 | 01 | 01 | | | |
| 2 | 02 | | 01 | 01 | 01 | |
| 3 | 01 | | | 01 | 01 | |
| 4 | 02 | 02 | | 02 | | 7 |
| 5 | 01 | | 02 | 02 | 01 | |
| 6 | 02 | 02 | 02 | | 01 | |
| 7 | | 02 | 01 | | | |

Discussion of Table 4 (entry by entry)

(1) The first description contains three new descriptors, none having been processed previously; therefore, $r=3$ in the flow chart of FIG. 11. All of the descriptors would go onto list L (block 15) and would then be distributed among the first three (unused) columns. The flow chart sequence for this assignment would be as follows:

$$k=3$$
$$1-2-3-15-10-11 \longleftarrow 16$$

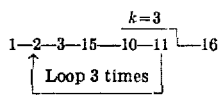

The number sequence in this diagram corresponds to the block sequence in the flow chart of FIG. 11 (and later of FIGS. 9 and 10) of the preceding section. The number sequence is read from left to right while loops are indicated by reverse directed arrows. The number of times looped includes the first pass. The loop exit is indicated by a line out of the top (or bottom) of some step within the loop.

(2) In the second item, descriptor 32 has an assigned name of 0301 and hence can be assigned immediately to column 03. The remaining 3 descriptors are new and are dropped arbitrarily into columns 01, 02 and 04. The descriptors receive an assigned code when they are dropped into columns, and these codes are fed back to the Adjusted Vocabulary.

The sequence of process flow chart steps used to assign item 2 are:

$$k=4$$
$$1-2-3-4-5-10-11-2-3-15-10\longrightarrow 16$$

Loop 3 times (3) In item 3 all three of the descriptors have previously been assigned codes, but descriptors 11 and 25, which were previously exclusive and were in column 01 are now inclusive because they both appear in the same description. A first order renaming is sufficient to separate the two inclusive descriptors. Since column 04 is a part of the item (descriptor 18) either 11 or 25 can be moved to columns 02, 03 or 05. Only column 05 yields to a first order renaming; hence, descriptor 25 (0102) is renamed to column 05 and becomes 0501, and the Adjusted Vocabulary is adjusted by erasing the code 0102 for descriptor 25 (denoted by an encirclement of 0102 in Table 3) and entering 0501. Descriptor 11 (0101) then remains in column 1 and descriptor 18 (0401) in column 04. The process flow chart steps are:

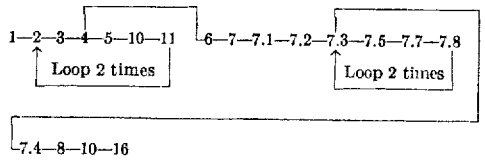

(Here we jump to FIG. 9 for details of the renaming process. Let $j_1=02$, $j_2=01$, $l_1=02$, $l_2=03$, $l_3=05$.)

(4) In item 4 descriptor 08 can be dropped into column 02 again without conflict, and descriptors 41 and 16, which have never been assigned a code are dropped into columns 01 and 03. The reader must note that Table 4 is only a schematic used as a guide in explaining the process. The information contained in that schematic is stored explicitly in the multi-association area as the assigned descriptor code number. Hence, when we say that a descriptor is "dropped" into a column without conflict it merely means that an encoding on a balanced tree can be initiated immediately without a renaming.

The process steps for the entry of item 4 are:

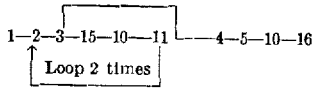

(5) In item 5 descriptors 11 and 41 are seen to be inclusive. A first order renaming again suffices to remove the conflict. Descriptor 41 (0102) is renamed to column 04 (becoming 0402). The process steps are (let $j_1=02$, $j_2=01$, and $l_1=02$, $l_2=03$, $l_3=04$).

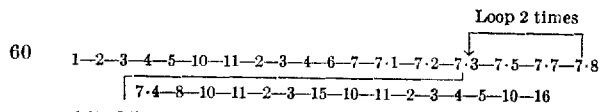

(6) The process steps for entering item 6 are:

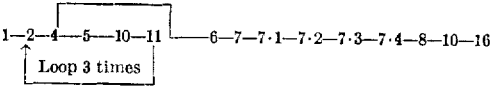

(7) Here for the first time we encounter a second order renaming. Descriptors 16 and 32 must be separated, but both are inclusive to every other column. The second order renaming is effected by shifting descriptor 34 (0203) from column 02 to 03 (renaming it to 0302) and 16 (0302) from column 03 to 02 (renaming it to 0202). Then descriptor 32 (0301) can be dropped into column 03 without conflict. The process flow chart steps are (let $j_1=01$, $j_2=02$, and $l_1=01$, $l_2=02$, $l_3=04$, $l_4=05$):

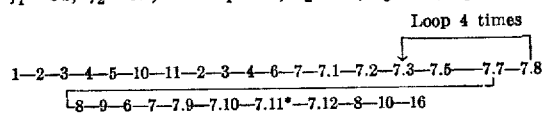

1—2—3—4—5—10—11—2—3—4—6—7—7.1—7.2—7.3—7.5——7.7—7.8
└8—9—6—7—7.9—7.10—7.11*—7.12—8—10—16

\* $(v_m, j)=0203$, $c_k=c_{03}$, $(i, j_2=0302)$ is exclusive to $c_{02}$ when 0203 is removed.

TABLE 5.—AUXILIARY TABLE TO DISCUSSION OF TABLE 4

| Item Added | Descriptors Indexes | | | | | | | |
|---|---|---|---|---|---|---|---|---|
| | 1 | | 2 | | 3 | | 4 | |
| | Natural Lang. | $i$ | Natural Lang. | $i$ | Natural Lang. | $i$ | Natural Lang. | $i$ |
| 1 | 11 | New | 19 | New | 32 | New | | |
| 2 | 32 | 0301 | 25 | New | 08 | New | 18 | New |
| 3 | 11 | 0101 | 18 | 0401 | 25 | 0102 | | |
| 4 | 41 | New | 16 | New | 08 | 0202 | | |
| 5 | 11 | 0101 | 41 | 0102 | 34 | New | 25 | 0501 |
| 6 | 16 | 0302 | 34 | 0203 | 25 | 0501 | 08 | 0202 |
| 7 | 16 | 0302 | 32 | 0301 | | | | |

CHAPTER 4—THE MEMORY SYNCHRONIZER

(1) Introduction

A salient feature of the multi-list machine is the associative organization of a conventional memory, i.e., the list organization of the memory provides a stratagem to direct the flow of data in and out of the memory on the basis of content rather than of location. This organization, which makes up an associative memory, is conceivably compounded of a variety of storage devices, such as a core memory for fast access but limited capacity, or magnetic drums with intermediate access speed and intermediate capacity, or tapes with a large memory capacity but limited access speed.

To render such an hierarchy of memories an efficient tool for the storage and retrieval of information in a list-type computer, a coordinating or synchronizing unit, the so-called memory synchronizer, is incorporated in the structure of the list machine memory. The memory synchronizer has several purposes, described below, that are realized in the execution of the four basic synchronizer instructions, "Read Item," "Store Item," "Replace Catena" and "Delete Item," which are described in section 4. One purpose of the memory synchronizer is to handle the memory space assignment of incoming or deleted data. The memory space assignment is a basic requisite for an associative memory, and for this reason the memory synchronizer is described here rather than in Part II, together with the processor design with which it communicates.

A second purpose is the synchronization between processor and memory. Once an instruction, which activates the memory synchronizer, is initiated its operation continues automatically until either an "Interrupt" signal is received or a terminating symbol in the item structure itself is encountered. By virtue of this quase-independence of the memory synchronizer, the processor is relieved of further control of the information flow so that the time can be utilized to operate on the information which flows automatically into the working register. Thus, the memory synchronizer saves programming and machine time, at the expense of a relatively small additional amount of circuitry. The reason is that it takes over the functions to which a relatively excessive amount of programming is devoted.

Another purpose of the memory synchronizer is the coordination between a hierarchy of memories of varying speed and capacity. It can be utilized to obtain overall problem speedup, provided easy flow between memories is assured.

In section 2 of this chapter the functional units of the memory synchronizer are described with the aid of a block diagram. In section 3, the functions of the memory synchronizer are discussed in detail. In section 4 the tasks of the memory synchronizer in response to the four instructions listed are explained with the aid of the corresponding flow charts.

(2) Block diagram of the memory synchronizer

The memory synchronizer constitutes a communication link between the random access memory and the multi-list processor. Any memory access must be effectuated via the memory synchronizer, hence, the memory synchronizer may be considered as an integral part of the memory itself. FIG. 12 presents the functional units of the memory synchronizer and their interconnections in detail.

The *Memory Recirculation Register* (MRR) constitutes an intermediate station in the sequential flow of information from and to the random access memory. The retrieval from and the storage in the memory takes place only in entire units, the so-called catena units; however, from the MRR the contents of the catenae can be dispatched piecemeal to other registers, i.e., symbols, keys (tags), and addresses can be separated and assembled in the MRR. In the flow charts this procedure is indicated by attaching the subscripts $s$, $k$, and $a$, for symbol, key, and address, to the word representing the contents of the register; e.g., $MRR_a$ stands for the address portion of MRR. Absence of any subscript implies an operation on the entire catena.

The *Memory Address Register and Counter* (MAC) contains the address of the catena to be read into MRR in the read-operation, or the address of the location where a catena is to be stored in the store-operation. These operations appear in the flow charts as follows: (MAC) MRR or MRR (MAC), respectively.

The *Working Register Address Register and Counter* (WRAC) controls the flow of information between MRR and the working register, i.e., the setting of this register determines where in the working register the information is directed to or taken from. The three most significant bits of WRAC specify groups of 8 catenae which are called items. Eight items may be specified by these three bits. The three least significant bits of WRAC which specify 8 catenae are constructed as a counter. WRAC may be set by a six bit instruction code, as $I_{wc}$, or by a three bit instruction code as, $I_{wi}$. $I_{wi}$ sets the three most significants bits of WRAC and implies zero-setting for the three least significant ones which in the Read and Store operations act then as a counter. WRAC essentially constitutes a mod 8 counter counting from a multiple of 8 given by $I_{wi}$ until overflow occurs, i.e., up to $I_{wi}+8$. Thus the maximum length of the automatic "Read Item" executed by the memory synchronizer is eight catenae.

In order that the memory synchronizer may continue the execution of instructions which, once initiated, are independent of others executed concurrently in the working register the so-called *Command Register* (CR) is incorporated in the structure of the memory synchronizer.

This register contains the command to be executed in the memory synchronizer which, together with the location of the operands, is given by the instruction. (Instructions are discussed in detail in Part II.) The *Busy Signal* is set at the beginning of a command execution in the memory synchronizer and is reset at the end of it. Other communications between Memory Synchronizer and Processor are described in Part II.

variable number of catenae, rather than providing instructions for each catena in an item.

(ii) Insertion of a *"jump"* catena in the storage space: The memory space for storing the catenae of an item is obtained from the List of Available Space (in brief: LAS). Normally the available space is contiguous, i.e., the catenae of an item are stored in consecutive locations. If the number of consecutive locations is not sufficient

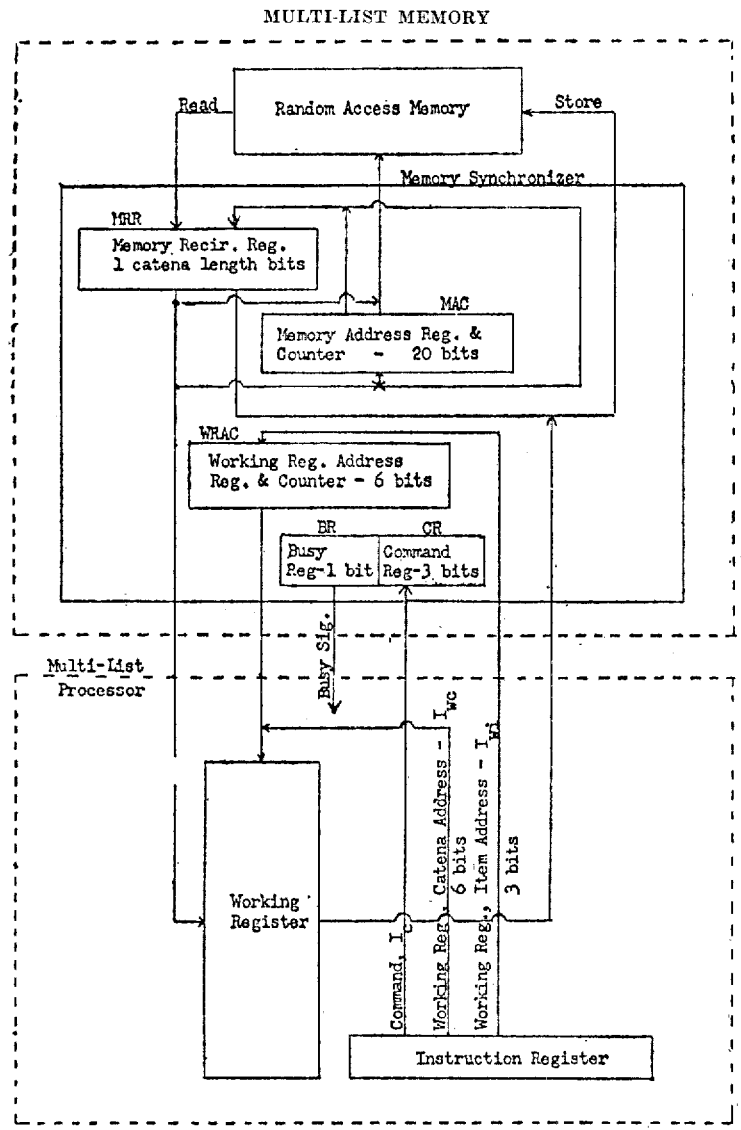

FIG. 12.—Block diagram of the memory synchronizer (3) *Functions of the memory synchronizer*

(i) Application of instructions to an entire item: The basic memory units, the so-called catenae, are handled sequentially in the random access memory in both reading and storing. The memory synchronizer permits the application of certain instructions, as "Read," "Store," "Replace" and "Delete," to an entire item composed of a to accommodate all the catenae of an item to be stored, jump catenae are insterted to provide the links between areas of the LAS which only together have a sufficient number of consecutive locations. The memory synchronizer executes this type of non-contiguous storage by (a) obtaining the available space from the LAS, (b) storing the item at these locations, (c) inserting jump catenae in the appropriate positions, and (d) inserting the address of the new first available space into the head of the LAS (HELAS) so that the LAS is readily accessible for future storage requirements.

(iii) Removal of jump catenae from the storage space: Since the jump catenae do not contain any information, their presence in the working register does not serve any useful purpose. It is therefore the task of the memory synchronizer to weed out the jump catenae when reading from the random access memory, thus eliminating housekeeping from the processor's burdens.

(iv) Insertion of jump catenae in the working register: An item may have a number of catenae exceeding the capacity allotted for the item in the working register. When such a contingency arises the memory synchronizer will insert a jump catena at the end of the working register space alloted for the storage of the item. The address part of the jump catena will contain the address in the random access memory where the rest of the item is located.

(v) Storing an item the length of which exceeds the allotted space in the working register: In storing an item, which has a number of catena exceeding the capacity provided for the item in the working register, the jump catena at the end of the item (cf. iv) is used to bring the rest of the item through the working register and to complete the storing in the memory. In this fashion items may be transferred from one type of memory to another in the hierarchy of memories.

(vi) Deletion of an item: In the deletion operation the memory synchronizer returns the catenae of the item to be deleted to the LAS (having deleted the item information). When contiguity betwen blocks of deleted catenae is established the contents of the jump catenae linking these blocks are also deleted.

(vii) Interruption of the "Read" sequence: The "Read Item" operation permits the interruption of the read-out process, e.g., as the result of a "Compare" instruction executed during the "Read" cycle in the multi-list processor. The interruption of the "Read" cycle occurs at an instant (cf. "Read Item" flow chart) which leaves intact the memory address of the last-read catena, whose comparison in the working register caused the interruption in the "Read" cycle. The retention of this catena address in MAC enables the programmer to replace the corresponding catena in the random access memory after suitable modifications have been performed in the working register (cf. "Replace Catena" flow chart). The interruption leaves the initiation of a new "Read" cycle at the discretion of the programmer.

(4) *Flow charts for the memory synchronizer operations*

The following notations will be used in the memory synchronizer flow charts:

BS indicates "Busy Signal,"
$I_s$ indicates the symbol in the instruction catena,
$I_c$ indicates a command in the instruction catena,
$I_{wi}$ indicates a working register item address,
$I_{wc}$ indicates a working register catena address.

The functional units, such as MRR, MAC, WRAC, are indicated in FIG. 12.

($x$) indicates the content of a register whose address is $x$.
(($x$)) indicates the content of a register whose address is stored at address $x$.
EOI indicates End of Item.
The arrow → indicates the transfer of information in the direction of the arrow.

The branches of a branch point represent the different outcomes of a decision; the continuation of the decision in question represents the affirmative outcome, while a negative outcome leads to the branch headed by a "No" in case of a single decision or a "NONE" when several decisions are involved.

(i) *"Read Item"*

(a) Instruction Format:

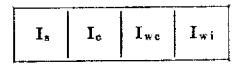

$I_c$ (6 bits): "Read Item."
$I_{wc}$ (6 bits): Address of catena in the working register that contains the address of the item to be read from the memory.
$I_{wi}$ (3 bits): Address of the working register into which the item is read.

(b) Modes of Operation:
The "Read Item" operation can be executed in two modes according to the way the catenae of the item that is to be read, are fed into a fixed location or into successive locations in the working register.

In order that the item may be read into a fixed location of the working register WRAC must remain stationary (must not count) during the "Read Item" operation; hence this type of read-in will be called *Stationary "Read Item."* In this case, no limitations exist on the length (in catena units) of the item to be read; however, the synchonizer has to wait for a "go-ahead" signal from the processor before relaying the next catena to the working register.

If the catenae of the item to be read are to be entered into successive catena locations of the working register, WRAC must be augmented by unity after each entry of a catena. In this case the memory synchronizer does not have to wait for the "go-ahead" signal from the processor; consequently, the "Read Item" operation is, here, quasi-independent of the operations performed in the working register during the read-in cycle of the item. A so-called "Interrupt Read" feature is also incorporated in the memory synchronizer. The interruption of the "Read Item" cycle may be subject to the outcome of a compare operation in the working register. The interrupt must occur before the memory address of the catena, the comparison of which provoked the interruption, is deleted, i.e., before MAC is advanced to a new address. The retention of this address in MAC leaves the replacement of the corresponding catena by its replica modified in the working register at the discretion of the programmer (cf. "Replace Catena" Chart I–24). The initiation of a new "Read" cycle after an interruption is also left up to the programmer as explained in Part II.

(c) Description of the flow chart (cf. FIG. 13):
The address of the first catena of the item to be read is located in the address portion of ($I_{wc}$). The first catena is transferred from the memory via MRR to the working register position designated by $I_{wi}$. Successive catena of the item to be read are similarly transferred to the working register.

If the "Read Item" operation is not stationary and the item to be read contains more than 8 catenae then the first seven catenae are read consecutively into seven working register catena locations beginning from $I_{wi}$. A "Jump" descriptor is inserted into the key portion, and the memory address of the next catena of the unfinished item is inserted into the address portion of the eighth catena. This termination, short of overflow, leaves the working register ready for a continuation of the "Read Item" operation after the contents of the working register is processed. If the "Read Item" operation is stationary, no overflow will occur regardless of the length of the item. In this case, the most likely interruption will occur through the "Interrupt Read" command. This contingency will leave the mode of continuation of the memory synchronizer operation at the discretion of the programmer.

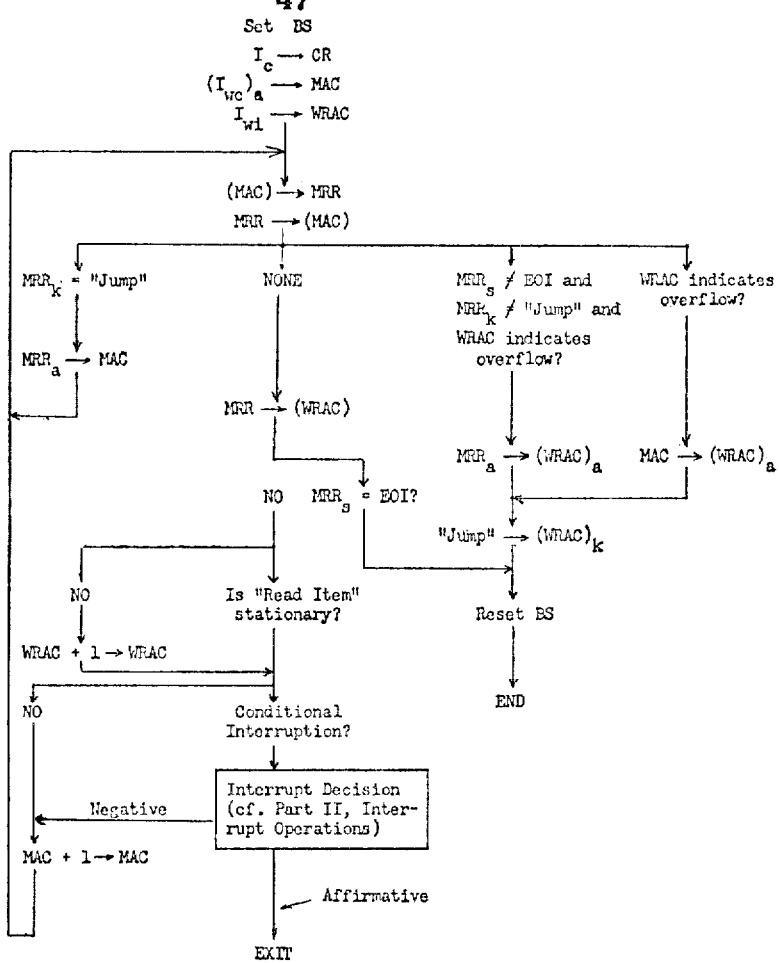

FIG. 13.—"Read Item" flow chart (ii) "Store Item" or "Replace Item"

(a) Instruction format:

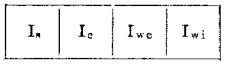

$I_c$ (6 bits): "Store Item" or "Replace Item"

$I_{wc}$ (6 bits): In the "Store Item" operation: Working register catena location into which the synchronizer places the memory address of the item to be stored.

In the "Replace Item" operation: Working register catena location containing the memory address of the item to be replaced.

$I_{wi}$ (3 bits): Working register item address containing the item to be stored or replaced.

(b) Modes of operation:

"Store Item" and "Replace Item" are two closely related operations effectuating the transfer of information from the working register to the memory. In the "Store Item" operation, new memory space to be taken from the LAS has to be allocated for the item to be stored. In the "Replace Item" operation, an item which is stored in the memory is to be replaced by a modified version which exists in the working register; no memory space is needed from the LAS. The two operations are equivalent in all respects, except for the allocation of memory space.

(c) Description of the flow chart (cf. FIGS. 14 and 15):

The item to be stored or replaced is found in the working register item location designated by $I_{wi}$.

If the required operation is "Store Item" the address of the memory space to be allotted for the item to be stored is taken from the head of LAS and transferred via MRR into MAC and then into the working register location designated by $I_{wc}$.

If the required operation is "Replace Item" the money address of the item to be replaced is taken from the working register location designated by $I_{wc}$ and transferred via MRR into MAC.

The LAS is categorized into two classes, which have different priorities with respect to their employment as available space. Those catenae which were not used during the current memory organization are said to belong to the class of unused LAS catenae. Those catenae which were used before, but were returned to the LAS by invoking "Delete Item" operations, are said to belong to the class of used LAS catenae. Blocks of used LAS catenae are likely to be interspersed among items belonging to other lists. These "deleted" blocks are interconnected by jump catenae.

The memory space for an item to be stored will be assigned from the class of unused LAS catenae as long as members of this class are available. If this class is exhausted, i.e., the memory location 11 . . . 1 has been encountered, flip-flop $T_1$ will have been set. This indicates that further storage space has to be provided by the class of used LAS catenae. If the class of used LAS catenae also becomes exhausted during a "Store Item" operation the "End of LAS" Contingency Routine is invoked.

If a "Jump" is encountered among the catenae coming from LAS, the contents of the jump-carrying catena is returned to the memory without alteration.

If the item to be stored exceeds the capacity allocated for its storage in the working register, a jump catena will be encountered in the last catena of the item space. This jump catena refers to the memory location of the rest of the item which automatically is transferred into the working register after the storage of its preceding contents is

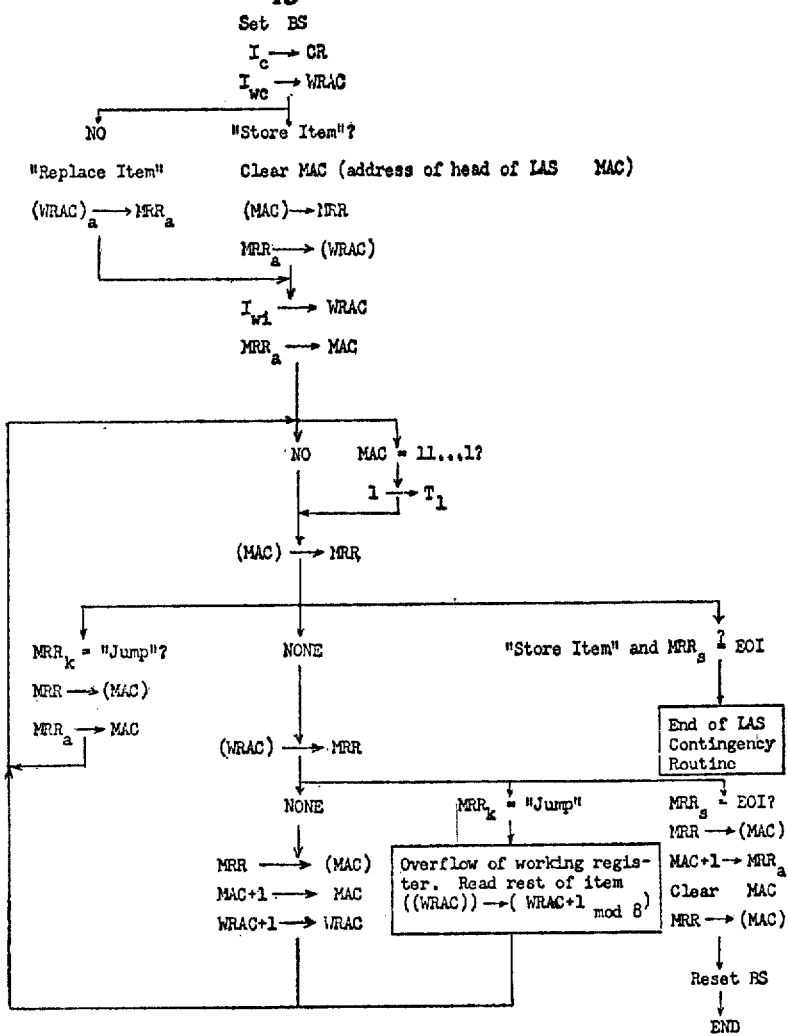

FIG. 14.—"Store Item" or "Replace Item" flow chart

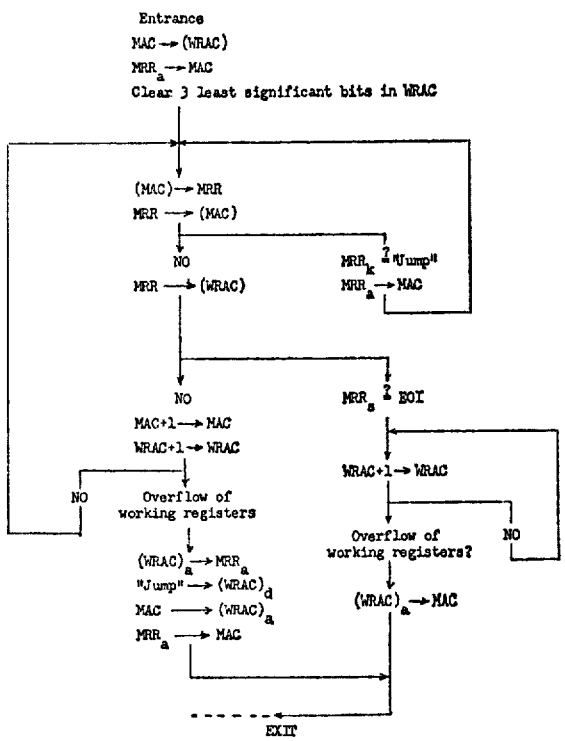

FIG. 15.—"Store Item" or "Replace Item" flow chart: Overflow of working register item capacity; read rest of item completed. Transfer and storage of portions of the item are repeated until the entire item is stored. This feature of the "Store Item" mechanism lends itself readily for a transfer of items among different memories in a hierarchy of memories. If the EOI of the item to be stored is encountered the address of the next available catena is placed into the Head of the LAS and the "Store Item" operation is terminated.

(iii) "Replace Catena"

(a) Instruction Format:

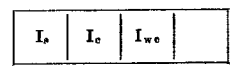

$I_c$ (6 bits): "Replace Catena"

$I_{wc}$ (6 bits): Working register address of the replacement catena.

It is implied that the memory location of the catena to be replaced was retained in MAC (cf. i, "Read Item").

(b) Description of the flow chart (cf. chart I-24):

In the "Replace Catena" operation described here it is assumed that the memory address of the catena to be replaced was retained in MAC from a preceding "Interrupt Read" operation (cf. Modes of Operation in (i)).

The catena which has to be replaced is transferred from the memory into MRR where it is replaced by the catena coming from the working register. The contents of MRR is then transferred back to the original memory location.

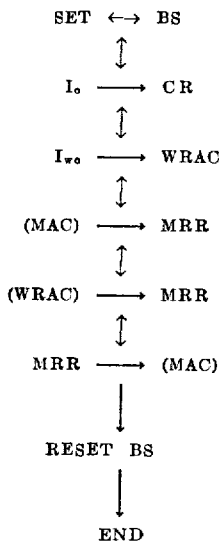

Chart I-24.—"Replace Catena" flow chart (iv) "Delete Item"

(a) Instruction Format:

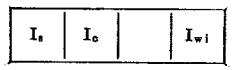

$I_c$ (6 bits): "Delete Item"

$I_{w1}$ (3 bits): Working register address of item the first catena of which contains the address of the item to be deleted. The second catena of this item is used for temporary storage in the "Delete Item" operation.

(b) Description of the flow chart (cf. FIG. 16):

The execution of the "Delete" instruction begins by clearing MAC. If flip-flop $T_1$ is reset the access to the LAS for "Delete Item" purposes takes place via the last LAS catena whose address is 11 . . . 1; consequently MAC has to be inverted in order to address this catena. If flip-flop $T_1$ is set the access to the LAS takes place via the Head of the List of Available Space (HELAS). Flip-flop $T_1$ remains reset as long as unused LAS catenae are available; it will be set as soon as the class of unused LAS catenae is exhausted during the "Store" operation.

The following schematic represents a picture of the memory in which the hatched areas indicate memory space that belongs to LAS while the cross-hatched areas represent the memory space due to the item to be deleted.

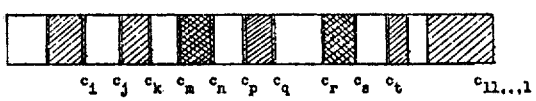

Let $c_i$, $c_j$, . . ., $c_{11\ldots1}$ represent the catenae the addresses of which are $i$, $j$, . . ., 11 . . . 1.

(1) If a jump catena, say $c_i$, is encountered, a comparison between the address to which the jump refers and the address of the item to be deleted takes place.

(a) Suppose the address to which the "jump" refers, say $j$, is smaller than the address of the item to be deleted, which is $n$; then, beginning with catena $j$, successive catenae are read out without restoration.

(b) Suppose a "jump" is encountered in catena $c_k$; the address to which the jump refers, say $p$, is then larger than the address of the item to be deleted, say $m$. In this case, the contents of the jump catena will be stored temporarily in the working register; a jump catena whose address refers to the item to be deleted, i.e., $c_m$, will be restored if catenae $c_k$ and $c_m$ are not contiguous. Successive catenae of the item to be deleted are then read out and not restored. If $c_k$ and $c_m$ are contiguous the jump catena will not be restored and the read-out of the item to be deleted takes place. A very similar procedure to the one outlined above is

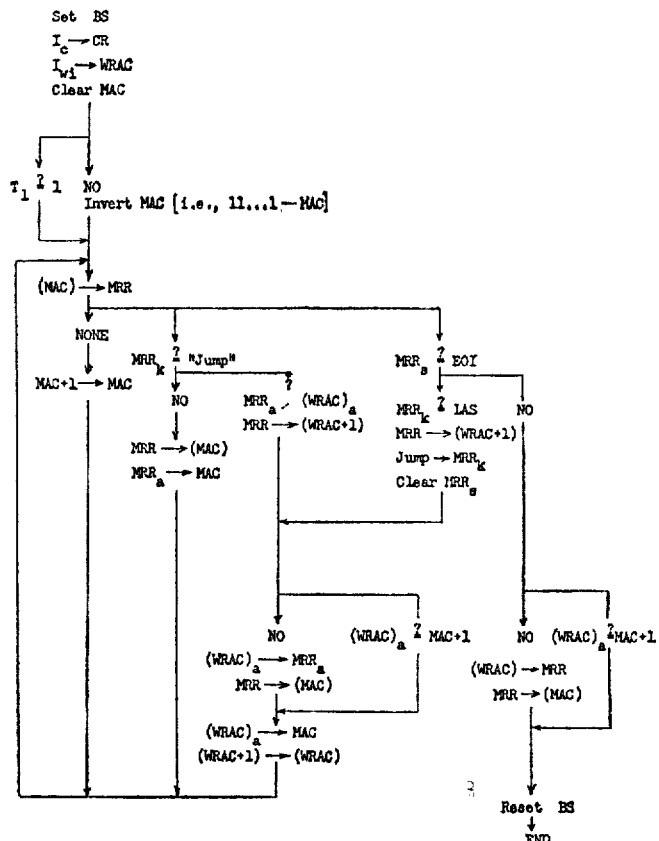

FIG. 16.—Delete item flow chart followed if a jump is encountered within the item to be deleted, e.g., in catena $c_n$.

(2) Suppose a catena of the LAS, say $c_q$ contains an EOI symbol. Its contents will be stored temporarily in the working register; a jump catena whose address refers to the item to be deleted, i.e., $c_r$, will be inserted in its place if catenae $c_q$ and $c_r$ are not contiguous. Successive catenae are then read out and not restored. If $c_q$ and $c_r$ are contiguous the EOI catena is not replaced by a jump catena.

(3) Suppose the EOI symbol of the item to be deleted is encountered, e.g., in $c_s$. If $c_s$ and $c_t$ are not contiguous the EOI catena is replaced by the catena that was temporarily stored in the working register, say $c_q$, and the delete operation is terminated. If $c_s$ and $c_t$ are contiguous, the operation is terminated without replacing the EOI catena.

PART II

CHAPTER 1.—MULTI-LIST CENTRAL PROCESSOR ORGANIZATION AND TIMING

(1) Introduction

A multi-list central processor must simultaneously meet the following requirements:

(a) The programmer should not have to address the main memory directly. Should he require a certain list or item on a list it should be sufficient for him to supply the name of the list or the address of only the first catena of the desired item. This latter address he should supply only indirectly, having derived it by other procedures. This is essential to easy communication with the computer through automatic-programming-like techniques.

(b) Minimum time should be expended on the execution of programs for instruction retrieval and houskeeping routines.

A very large store is required to contain the tree area and the multi-association list area where the data and programs are stored. The programmer may name a routine to be executed on some data for which he also supplies a name. It is noticed that the programs to descend a tree or to search a list are mainly composed of iterative loops. In fact, most list processing programs have this property. Therefore, it would be highly desirable to have the body of instructions constituting a loop available in a higher speed store than can be afforded for the main memory. The set of instructions would be fetched only once from the main memory instead of once for each iteration. Thus, lists of instructions would be read from the main memory into the auxiliary store, or, as we shall call them, the working registers. Instructions would not be executed on being read from the main store, but would be placed in the fast access store. Then the instructions are taken from the fast store and assume control of the machine.

Two questions must be investigated to define the size and speed of the auxiliary store:

(i) How many instructions are in a loop? and
(ii) How many instructions must be *executed* in the interval of one main memory accession?

These questions are discussed here only for the context of list processing programs, specifically with the multi-list processes in mind.

The basic operations of descending a tree or searching a list require that the same small set of instructions be executed on each catena acquired from the main store. In descending a tree, the catanae of a branch item are each queried in turn as to their being the branch to be followed, or in searching a list each catena of an item on the list is queried for being one of the descriptors or keys of the required item.

To a great extent, then, a small set of instructions operate on each catena obtained from the main memory. If this small set, presumably constituting an iterative loop, is to be contained (while in use) in a very high-speed store, then, to make optimum use of this speed, all constants and data needed by this set should also be contained in the same store. For example, it may be desired to compare an entire item to another item to determine distinguishing properties; here the reference item would be available at very high speed and each of its catena could be compared to each of the test item's catenae as they appeared from the main memory.

Finally, several sub-loops may be involved in a larger loop and the requirements on the size of the very high-speed store are again increased.

Summarizing, the main goals of the central processor design are to gain for list processing functions:

(i) programming independence of addressing the main memory, and
(ii) efficient use of a large random access main store by arranging for it to be in use nearly continuously, mainly for data rather than instruction acquisition.

(2) Basic operation of the central processor (2.1) *Working registers.*—A 64 catena fast access store (transistors or perhaps thin magnetic film) is directly addressable by the programmer. This store, called the working register, is divided into eight "item-segments" where each segment can contain an item of information. At first, each segment consists of 8 catenae; items longer or shorter than 8 catenae are discussed later.

This small fixed format set of working registers is an extension of the main associative memory. Thus, lists of instructions, and lists of associated data may have their heads (or middle parts for that matter) imbedded in these fast access working registers. The programmer need specify only the list and a process to be carried out on it; then the selected list is fed through the working registers where the processor examines it. Instructions are similarly handled as coherent lists. Thus instructions may be accessed in chunks, or large pieces intended to carry out some small function. The machine, so constructed, greatly speeds operation in the interpretive mode for which it is intended. Operation as a compiler or as an efficient interpreter of arbitrary languages will be further discussed in chapter 2, Part II, and in this chapter with reference to the machine's instructions and built-in functions that are beyond program control.

Although these working registers are at present divided among fixed length item segments, the ultimate intention of the work is to allow completely variable length item segments. Due to the present limitation of item segment locations and lengths some wasted space in these registers is unavoidable. This will be eliminated by the variable length item structure.

Variable length item-segments will be possible if a memory having an "associative" structure is used in the ultimate design of the working registers. This means that the hardware is so organized that a six bit address assigned arbitrarily is attached to any catena. The addresses are queried in parallel, when addressing the working registers, and the desired catena is found and read out. The total available space is still 64 catenae so that the operation of this automatic function may be rapid. Such a high-speed store is currently considered feasible and represents a realistic goal. The multi-list programs would then be executed directly from the instruction statement as presently planned, but without the inefficiency of the currently considered fixed length item-segments.

Of course, the working registers could be programmed to behave as if they were used as variable location, variable length item stores but the program itself would take up valuable space and would also be very time consuming.

The machine takes its instructions from an instruction "item-segment" in the working registers. As most instructions occupy only half a catena, an "item" of instructions can contain in the present plan at most 16 instructions.

We will allow an instruction item to overflow into at most another "item-segment" of the working registers. This presently limits instruction items to a maximum of 32 instructions, which is sufficient in the light of present experience. Only one item of instructions may be present in the working register at a time.

Usually the first instruction of an instruction item will call on the memory synchronizer to read an item of data from the main store; successive instructions will test the data called in by the read instruction and finally make a decision as to whether to keep control (in the currently operating instruction item), or to seek a new item of instructions from the main store. An end of instruction item is denoted by an end of item symbol and the appropriate exit is provided (described later).

(2.2) *Interactions with the memory synchronizer.*—Provisions for matching speeds between memory and processor are described in connection with the memory synchronizer in chapter 4, Part I. The discussion here is limited to circumstances arising in relation to the "Read Item" and "Stationary Read" instructions. These circumstances are as follows:

(a) Item too long for working registers: In this case, the *eighth catena* of the assigned working-register space will contain both a "jump" descriptor and the address of the next catena of the item in the main store. When an item containing more than 8 catenae is loaded into a working register item location, and the first 8 catenae of this item are successively interrogated by the machine under control of an instruction item, then if the instruction item is still in control (i.e., has not branched to a new item) when the last data catena (the jump indicator) is to be interrogated, the following operations take place automatically without program control:

(i) The jump address of the incomplete item is sent to the memory synchronizer and the synchronizer is instructed to read the rest of the item into the item location presently occupied by its initial seven catenae.

(ii) Some instructions of the instruction-item will have been indexed through the catenae of the data item. Consequently, they should be reset in preparation for interrogating the subsequent catenae of the data item. Each instruction of the current instruction item is automatically searched for instances of the last data catena address. All such instances are reset to the address of the initial catena of the allocated data item space.

(iii) As soon as the "read" command is initiated and the instruction item is reset, control is returned to the instruction that was interrupted by the jump indicator.

(b) Item being read not continuously stored: Here the memory synchronizer will intercept jump indicators occurring in the item being read. It will automatically follow the jumps and supply to the central processor only catenae of the item without jumps. Whenever the item is so interrupted, the speed with which the synchronizer, supplies new catenae will be reduced and the central processor may attempt to test catenae not yet accessed, or otherwise to get ahead of the memory. To prevent this the synchronizer sends a *halt* signal to the processor whenever it intercepts a jump indicator; this stops the central processor until the synchronizer sends a *continue* signal. The continue signal is generated by the synchronizer at the same relative place in the main memory cycle (where the next catena of the desired item is to be transmitted to the working register) so that program synchronization is maintained.

(c) Interruption of item retrieval orders; control of reading:

(i) Special control on "Stationary Read": When the memory synchronizer is instructed to "Stationary Read," successive catenae are read into the same working register location—thus destroying its previous contents. As soon as the synchronizer places an accessed catena into the designated working register location it immediately seeks the next catena of the item. However, the set of instructions being executed by the central processor during the accession may be too long and the synchronizer may supply a new catena before the program is finished with the old one. We wish to prevent this but at the same time we should not interrupt the reading any longer than necessary. Consequently, during the "Stationary Read" operation the synchronizer will keep track of the loading of catenae through the introduction of special modes of operation, to be described later. The process however can be described briefly as follows: After initially loading the "designated catena" the synchronizer will monitor the contents of the command part of the central processors instruction register. Whenever an instruction marked with a special mode is executed, in which case the designated catena of the Read operation is called (as an operand), then the synchronizer is permitted to replace that catena by the next one accessed from the memory. On the other hand, it could happen that the program is much shorter (quicker) than the memory accession, in which case the central processor must wait for the next catena to appear. To relieve this burden, again, each instruction has a mode of operation that will interrupt the instruction sequence in order to wait for the next synchronizer catena to be delivered. For example, when a "read" instruction is followed by an instruction sequence intended to operate on the item read, the "read" instruction should be used in the above indicated mode. Then, the first instruction subsequent to the "read" instruction will be delayed until the memory synchronizer delivers a *go-ahead* signal indicating the delivery of the first catena required. If a short loop of instructions operates on successive catenae supplied from the main store then the last instruction of the loop should be used in another special mode; this way the loop will be synchronized with the memory accession speed. For example, in this way it will be shown that a single "compare" instruction can loop back on itself and thus examine successive catenae being accessed.

(ii) Control of "Read item" instructions: To prevent the processor from getting ahead of the memory a mode of operation is used similar to the one mentioned above. That is, all processor instructions have a mode of operation requiring that the *next instruction* be delayed until the *continue* signal is sent by the synchronizer. Thus, the processor will not attempt to operate on catena locations that are not yet filled by a "Read Item" instruction.

(3) The Command structure (3.1) *Instruction format and overall structure.*—Two principal formats are used for the multi-list instructions. The two formats embrace either long or short instructions; i.e., a catena may contain either two short instructions or one long instruction. Short instructions mainly involve only two addresses and long ones involve up to five addresses. Specific formats will be given later.

Two memories may be addressed by multi-list instructions: they are the main memory with up to one million addressable locations, and the working registers of 64 catenae. Operands taken from the working register are specified by a 6-bit address. The main memory is addressable only by "read" and "store" instructions, and one special "compare" instruction, for retrieving "instruction-items."

A catena will have a length of 43 bits. One bit will be a parity check over the entire catena and hence is unavailable to the programmer. The format for the short-two-address instruction is shown below:

| Number of bits allotted to this symbol | 1 | 2 | 8 | 6 | 6 | 8 | 6 | 6 |
|---|---|---|---|---|---|---|---|---|
| Symbol indicating function | P | $I_s$ | $I_1$ | $A_1$ | $B_1$ | $I_2$ | $A_2$ | $B_2$ |

(2-address, 2-instructions per catena format)

P=parity bit,
$I_s$=symbol bits, bits may be used to identify up to four catena-types,
$I_1$=8-bit instruction code regarding $A_1$ and $B_1$,
$A_1$=6-bit working register address of operand,
$B_1$=6-bit working register address of operand,
$I_2, A_2, B_2$=2d instruction.

Several variations of this format are used in special cases. These will be brought out clearly when the individual commands are defined.

The main long 5-address format is shown below:

| 1 | 2 | 8 | 6 | 6 | 2 | 6 | 6 | 6 |
|---|---|---|---|---|---|---|---|---|
| P | $I_s$ | I | A | B | X | C | D | E |

I: 8-bit instruction code,
A, B, C, D, E: 6-bit spaces, used for addresses (to be discussed),
X: 2-bit space, not used by the instruction.

Another long format is used in one instruction (compare) which will be described.

(3.2) *Description of synchronizer-processor modes.*—Only 24 basic instructions are defined for the multi-list central processor; the 8-bit instruction code accounts not only for these 24 instructions but for various modes of operation allowed in each one. If each mode is counted as a separate instruction then there are 219 operations defined by the 8-bit instruction code. Imbedded in these operational modes is the facility to synchronize the central processor's program with the main memory accession rate. This facility, described in the last section, is defined here in detail. Most central processor instructions have 3 synchronizing functions available. (Exceptions will be noted for the individual commands.)

In addition to its data processing function the instruction being executed may cause any one of the following to happen.

Mode 0, no control: Where an instruction is executed in this mode no synchronizing function takes place.

Mode 1, condition a read interrupt: When this mode is an instruction a signal is sent to the memory synchronizer that directs it to stop reading when it has completed the current catena accession. But the current "read" instruction is not terminated; rather the synchronizer will simply wait for one of the two signals to be sent from the central processor. These signals are continue reading" or "terminate reading," and are described below. The signal to conditionally interrupt reading is sent to the synchronizer as soon as a Mode 1 instruction is active in the instruction register. This signal may be received by the synchronizer early in its accession cycle so that it is quite possible that a "continue" or "terminate" signal will be sent to the synchronizer before it completes the current accession. In this case the synchronizer will not wait but will immediately take the appropriate action.

Mode 2, generate a continue signal: This mode is intended for use with the "read item" instruction since the "stationary read" instruction has an automatic synchronizing property built in. Instructions in this mode should follow instructions in Mode 1. When a program involving successively accessed catenae is too long, the first instruction may be used in Mode 1, and the last in the loop may be used in Mode 2. (Rather than making a last instruction in the loop, the programmer should place an instruction in Mode 2 as far down the chain of instruction as necessary to make the next accessed catena available at or before the time it will be needed. (This mode is conditional in the case of its use with a "compare" instruction).) In the course of execution of the commands of an instruction item, a mode instruction may be followed by a decision to take the next instruction from the main memory, to get a whole new instruction item. The commands using Mode 2 which normally would complete this conditional interruption may, consequently, never be executed. To avoid problems in this area the following rule of operation is adhered to: processor orders in Mode 1 are immediately forgotten by the synchronizer if for any reason the current instruction item should lose control of the machine; i.e., when control is transferred out of the current instruction item the synchronizer assumes that no control signals have been sent to it.

Mode 3, interrupt central processor: Here the intended operation is to make the processor wait for the memory synchronizer. After a Mode 3 instruction is executed the central processor is interrupted so that the next instruction is not executed. A "go ahead" signal is generated by the memory synchronizer as soon as the current catenae undergoing accession is delivered to the working register. This "go ahead" signal starts the central processor at the point where it left off; i.e., the next instruction is executed. (Here, and in many other processor functions, the processor can encounter logical errors or dilemmas that can cause it to come to an uncontrolled halt. For example, should a Mode 3 instruction be executed while no read instruction is active in the memory synchronizer, the processor will be hung-up. To alleviate lost time due to such contingencies a monitor is provided that determines when the central processor has been idle too long (say 500 $\mu$sec). When the monitor indicates excessive idle time an overall contigency routine is automatically invoked. This routine will determine the situation causing the contingency and take appropriate action.) In the normal course of instruction execution the instructions are taken sequentially as they appear in the instruction item (except, of course, in jump instructions). The last catena of an instruction item will contain an "end of item" symbol. Another instruction item is need as soon as the last catena appears in the instruction register, unless the second half contains a jump back into the current item. In the absence of other means of obtaining a new instruction item, the last catena must contain a forced jump in the form of a "Compare-Type 1" (cf. list of instructions). This instruction will automatically replace the current instruction item by a new one. Naturally, the memory synchronizer is in use while a new instruction item is being supplied to the central processor. Nevertheless, the central processor is not halted for this entire period. Instead, control is turned over to the central processor as soon as the first instruction of the new instruction item is delivered by the synchronizer. Certainly no *synchronizer* instruction attempted by the central processor will be obeyed until the entire item of instructions is delivered, since the synchronizer is busy until then. An extension of the present system would be to allow the synchronizer to handle two instructions simultaneously provided that the addressee correspond to two different memory units. Such an extension can be incorporated with additional safeguards against similar conflicts. However, non-synchronizer instructions will be executed so long as they do not refer to instruction catenae not yet available. Count is kept of the number of new instruction catenae so far delivered by the synchronizer; hence, should any early instruction call for an undelivered instruction catena as an operand then the central processor is halted until the required catena is available.

(3.2) *Synchronizer Instructions*—(i) Read item:

Format:

| 2 | 8 | 6 | 3 | 3 |  |
|---|---|---|---|---|---|
| $I_s$ | I | $I_{wc}$ | $I_{wi}$ | | 20 | or:

| | | 8 | 6 | 3 | |
|---|---|---|---|---|---|
| | 22 | I | $I_{wc}$ | $I_{wi}$ | 3 |

Modes: 0, 1 and 3 (corresponding to $I=$0, 1, 2).

This instruction will deliver the first catena of the item requested and then obey the conditional interrupt order. Mode 3 will guarantee that the first catena of the item requested will be delivered prior to execution of the next instruction.

$I_{wc}$: The address of the catena holding the address of the requested item. $I_{wc}$ may not refer to locations within the instruction item itself. The case where a main memory address is part of an instruction is discussed later.

$I_{wi}$: Specifies block of 8 catenae where the requested item is to be deposited by the synchronizer. Since the usual operation of the multi-list processor will be in an interpretive mode the programmer will wish to avoid any direct addressing to obtain desired lists. If $I_{wc}$ refers only to catenae outside of the current instruction item, this is fairly well guaranteed. (An error signal will invoke the contingency routine whenever $I_{wc}$ refers to a catenae within the current instruction item.)

(ii) Stationary read (read and dump):

Format:

| 2 | 8 | 6 | 6 | |
|---|---|---|---|---|
| $I_s$ . I | $I_{wc}$ | $I_{wi}$ | | 20 | or;

| | 8 | 6 | 6 |
|---|---|---|---|
| 22 | I | $I_{wc}$ | $I_{wi}$ |

Modes: 0, 3 ($I=$3, 4).

$I_{wc}$: same as in Read item,
$I_{wi}$: catena into which successive catenae of the requested item are to be placed.

(iii) Read catena:

Format:

| 2 | 8 | 6 | 6 | |
|---|---|---|---|---|
| $I_s$ | I | $I_{wc}$ | $I_{wi}$ | 20 | or:

| | 8 | 6 | 6 |
|---|---|---|---|
| 22 | I | $I_{wc}$ | $I_{wi}$ |

Modes: 0, 3 ($I=$5, 6).

$I_{wc}$: address of catena storing the memory address of the desired catena.
$I_{wi}$: address of the catena into which the requested catena is to be placed.

(iv) Store item:

Format:

| 2 | 8 | 6 | 3 | | |
|---|---|---|---|---|---|
| $I_s$ | I | $I_{wc}$ | $I_{wi}$ | 3 | 20 | or:

| | 8 | 6 | 3 | |
|---|---|---|---|---|
| 22 | I | $I_{wc}$ | $I_{wi}$ | 3 |

Modes: 0, 1, 3 ($I=$7, 8, 9).

In Mode 3 the Store Item instruction interrupts the central processor until the item storage has been completed.

In Mode 1 the store operation will interrupt the central processor immediately after the central processor completes the execution of any mode 3 instruction. The central processor is re-started when the "Store" operation is completed.

$I_{wc}$: working register catena address where the address of the item stored is to be placed.

$I_{wi}$: specifies block of 8-catenae where the item to be stored is located.

(v) Replace item:

Format:

| 2 | 8 | 6 | 3 | 3 | 20 |
|---|---|---|---|---|---|
| $I_s$ | I | $I_{wc}$ | $I_{wi}$ | | | or:

| | 8 | 6 | 3 |
|---|---|---|---|
| 22 | I | $I_{wc}$ | $I_{wi}$ 3 |

Modes: 0, 1, 3 ($I=$10, 11, 12).

Same as Store Item except:
$I_{wc}$: address of catena containing the Item main memory location. The old item is replaced by a new one of the same length.

(vi) Replace catena:

Format:

| 2 | 8 | 6 | 6 | |
|---|---|---|---|---|
| $I_s$ | I | $I_{wc}$ | $I_{wi}$ | 20 | or:

| | 8 | 6 | 6 |
|---|---|---|---|
| | I | $I_{wc}$ | $I_{wi}$ |

Modes: 0, 1 ($I=$13, 14).

In Mode 1 the Replace Catena instruction will interrupt the central processor upon its execution of any Mode 3 instruction (as in Store Item). The central processor will resume operation after the Replace Catena operation is completed.

$I_{wc}$: address of catena containing the main memory address of the catena to be replaced.
$I_{wi}$: catena address of the replacing catena.

61

(vii) Delete item:

Format:

| 2 | 8 | 6 | 6 | 20 |
|---|---|---|---|----|
| $I_s$ | I | $I_{wo}$ | | | or:

| | | 8 | 6 | 6 |
|---|---|---|---|---|
| | 22 | I | $I_{wo}$ | $I_{wi}$ |

Modes: 0 ($I=15$).

(viii) Stationary store:

| 2 | 8 | 6 | 6 | |
|---|---|---|---|---|
| $I_s$ | I | $I_{wo}$ | $I_{wi}$ | 20 |

| | | 8 | 6 | 6 |
|---|---|---|---|---|
| | 22 | I | $I_{wo}$ | $I_{wi}$ |

Modes: 0 ($I=16$).

This instruction performs the same function as "store item" except that it is the dual of the "stationary read" instruction. Successive catenae of the item to be stored are taken from the same working register location $I_{wi}$. The synchronizer stops storing after it has stored a catena containing an end of item symbol.

Two aspects of program synchronization must be especially noted for this instruction. The first is that the synchronizer does not take the next catena to be stored until it receives a "continue" signal due to some other central processor instruction being in Mode 2 (and generating a continue signal). The second is that the synchronizer must be able to prevent the central processor from getting ahead of it by supplying a new catena in $I_{wi}$ before it has obtained the last one. Thus, the "Stationary Store" instruction supplies a "go-ahead" signal just as the "Stationary Read" instruction does. Any Mode 3 instruction will halt the central processor after its completion until the "go-ahead" signal is received from the synchronizer, then the central processor will execute the next instruction which, presumably, modifies the contents of $I_{wi}$.

(3.3) *Transfer instructions*—(i) Transfer catena:

Format:

| 2 | 8 | 6 | 6 | |
|---|---|---|---|---|
| $I_s$ | I | A | B | 20 | or:

| | | 8 | 6 | 6 |
|---|---|---|---|---|
| | 22 | I | A | B |

Modes: 0, 1, 2, 3.

Field selection: Entire catena, memory address field, key field, symbol field, everything except symbol field, A address field, B address field, C address field, D address field, E address field. Any combination of mode and field selection may be used; these combinations correspond to $I=17, 18, 19, \ldots 55, 56$. The instruction code may be obtained from the matrix below:

| | | entire catena | memory address | key | symbol | $\bar{s}$ | A | B | C | D | E |
|---|---|---|---|---|---|---|---|---|---|---|---|
| Mode | 0 | 17 | 18 | 19 | 20 | 21 | 22 | 23 | 24 | 25 | 26 |
| | 1 | 27 | 28 | 29 | 30 | 31 | 32 | 33 | 34 | 35 | 36 |
| | 2 | 37 | 38 | 39 | 40 | 41 | 42 | 43 | 44 | 45 | 46 |
| | 3 | 47 | 48 | 49 | 50 | 51 | 52 | 53 | 54 | 55 | 56 |

This operation takes the contents of the catena whose address is A, extracts the selected field, then places this data into the corresponding field of the contents of the catena addressed by B. That is, $$(A)_f \rightarrow B$$

The contents of A is not changed.

(ii) Transfer item:

Format:

| 2 | 8 | 6 | 6 | |
|---|---|---|---|---|
| $I_s$ | I | A | B | 20 | or:

| | | 8 | 6 | 6 |
|---|---|---|---|---|
| | 22 | I | A | B |

Modes: 0, 1, 2, 3, ($I=57, 58, 59, 60$).

The item whose initial address is A is transferred to a new position starting at address B of the working register. A and B need not be multiples of eight, and the transfer terminates upon finding either an "end-of-item" symbol (EOI) or a "jump" in the item addressed by A. If the item transfer causes overflow of the item-segment in the working register; then a dump descriptor is placed in the last catena of the "item-segment" and the rest of the item is stored in the memory.

This command may be used, for example, to form continuous items longer than 8 catenae in the working register. A long instruction item (two item segments) may be formed this way.

(iii) Combine:

Format:

| 2 | 8 | 6 | 6 | 2 | 6 | 6 | 6 |
|---|---|---|---|---|---|---|---|
| $I_s$ | I | A | B | X | C | D | E |

Modes: 0, 1, 2, 3 ($I=61, 62, 63, 64$).

A, B: addresses of catenae that are to be combined,
C: destination address for the combination of (A) and (B),
D: address of field selector for (A),
E: address of field selector for (B),
X: 2-bit space, not used in this instruction.

In this instruction the bits of (A) corresponding to the *one*-bits of (D) are placed into the corresponding positions of (C) destroying C's previous contents in those bit positions. Similarly (B) is put through the sieve formed by (E) with the result placed into C. Bits of (C) for which *no* one-bits of either (D) or (E) are present are left unchanged by the operation. Logically, the transfer is characterized by the following function:

Let:

$a_i$ be the $i^{th}$ bit of (A)
$b_i$ be the $i^{th}$ bit of (B)
$c_i$ be the $i^{th}$ bit of (C)
$d_i$ be the $i^{th}$ bit of (D)
$e_i$ be the $i^{th}$ bit of (E)
$c_{ir}$ be the *resulting* $i^{th}$ bit of (C)

Then: $c_{1r} = a_i d_i \vee b_i e_i \vee c_i \overline{d_i} \overline{e_i}$

This instruction is intended to simplify the construction of composite catenae from arbitrary pieces; however, its purely logical function should also be noted.

(iv) Shift:

Format:

| 2 | 8 | 6 | 6 | |
|---|---|---|---|---|
| I$_s$ | I | A | ±N | 20 | or:

| | | 8 | 6 | 6 |
|---|---|---|---|---|
| | | 1 | A | ±N |

Modes: 0, 1, 2, 3 ($I=65, 66, 67, 68$).

A: address of catena to be shifted. The result of the shift is left in A—i.e., the previous contents of A is changed.
±N: the number of places to be shifted. The range of the shift is ±31 bit positions—i.e., $$-31 \leq \pm N \leq +31$$

and if $N=0$, no shift takes place.

(3.4) *Compare.*—There are several types of compare instructions.

(i) Compare (1):

Format:

| 2 | 8 | 6 | 6 | 20 |
|---|---|---|---|---|
| I$_s$ | I | A | B | memory address |

Modes: 0, 1, 3 (see below for interpretation of Mode 3).

Mode 3: If the result of the comparison is *negative*, then the next instruction is delayed (in execution) until a "go ahead" signal is delivered by the memory synchronizer. If the result of the comparison is affirmative.

I. The instruction code embraces the mode, comparison-type, and field selection.

Comparison types: $\{= \geq >\}$,
Field selection: entire catena, key field, symbol field, memory address field.
Instruction codes are derived from the table below:

| Mode | Field | Type | | |
|---|---|---|---|---|
| | | = | ≥ | > |
| 0 | e.c. | 69 | 70 | 71 |
| 0 | k | 72 | 73 | 74 |
| 0 | s | 75 | 76 | 77 |
| 0 | m.a. | 78 | 79 | 80 |
| 1 | e.c. | 81 | 82 | 83 |
| 1 | k | 84 | 85 | 86 |
| 1 | s | 87 | 88 | 89 |
| 1 | m.a. | 90 | 91 | 92 |
| 3 | e.c. | 93 | 94 | 95 |
| 3 | k | 96 | 97 | 98 |
| 3 | s | 99 | 100 | 101 |
| 3 | m.a. | 102 | 103 | 104 |

Operation: A; B—catena addresses of operands; (A) is to the left of the comparison-type symbol.

If the result of the comparison is *negative* the central processor will take the next normal instruction (conditioned, possibly, by Mode 3).

If the result of the comparison is *affirmative*, then the entire instruction item containing this instruction is discarded and the following takes place:

The current read instruction is terminated at the end of current cycle, if the synchronizer is, in fact, reading. (Other operations of the synchronizer are not interrupted.) An instruction is sent to the synchronizer to "read-item." This instruction has the following format; but it is generated automatically and does not take up space in the working registers.

| 8 | 6 | 3 | |
|---|---|---|---|
| I | I$_{wc}$ I$_{wi}$ | 3 | 22 |

$I=2$ (Read item, Mode 3)

$I_{wc}$: the current contents of the control counter—i.e., the address of this instruction in the working register. Hence the memory address contained in this instruction is used to fetch a new item.

$I_{wi}$: the address of the first catena of the instruction item-segment. The overall effect of the above operation is to, in case of an affirmative comparison, replace the current instruction item by a new instruction item whose address is contained in the compare instruction.

(ii) Compare (2):

| 2 | 8 | 6 | 6 | 2 | 6 | 6 | 6 |
|---|---|---|---|---|---|---|---|
| I$_s$ | I | A | B | X | C | D | E |

Modes: 0, 1, 2, 3 (see below for interpretation),
Comparison types: =, ≥, >.
Table of instruction codes:

| Mode | Type | | |
|---|---|---|---|
| | = | ≥ | > |
| 0 | 105 | 106 | 107 |
| 1 | 108 | 109 | 110 |
| 2 | 111 | 112 | 113 |
| 3 | 114 | 115 | 116 |

A; B: catena addresses of operands (as in: is $(A)<(B)$?)
X: 2-bit space; not used by this instruction
C: address of next instruction in case of *affirmative* result of comparison.
D: address of next instruction in case of *negative* result of comparison.
E: address of field selecting catena.

The field selector E is restricted to working register addresses 8, 9, . . ., 63 for general field selection. Working register addresses 0, . . ., 4 give the standard formats: i.e., 0: entire catena
1: entire catena less symbol bits
2: symbol field
3: key field
4: memory address field Operation: The two operands are compared only in those bit positions specified by *ones* in the catena designated by E. This allows any field to be selected for comparison whether or not its bits are contiguous. The interpretation of modes is as follows:

Mode 0: no control over reading
Mode 1: normal interpretation—i.e., as soon as this instruction becomes active in the instruction register a "condition interrupt" signal is sent to the synchronizer.
Mode 2: if result of comparison is *affirmative* a *terminate read* signal is sent to the synchronizer. Negative comparison results in a *continue* signal being sent to the synchronizer. The "condition interrupt" signal of Mode 1 is also incorporated in Mode 2.
Mode 3: this mode is a combination of Modes 2 of this instruction and the ordinary Mode 3. On negative comparisons a continue signal is sent to the synchronizer and the next instruction is delayed until the next catena has been delivered by this synchronizer. This is the same as the ordinary Mode 3. On an affirmative comparison the next instruction is taken from (C) and executed *without* delay and a terminate read signal is sent to the synchronizer. This is as in Mode 2 above. Mode 3 is here intended to function in a single comparison instruction being used to examine successive catenae being delivered by a "Stationary Read" operation. The D address would be the same as the instruction's address, thus causing the instruction to repeat itself. When the synchronizer terminates its reading due to an end of item symbol, without making an affirmative comparison and when this instruction is self referencing, the central processor does the following: A command is sent to the synchronizer to read a new instruction item that replaces the current instruction item in the working registers; this item is taken from a main memory address stored in the *a* address portion of the *last* catena of the current instruction item.

(iii) Compare (3):

Format:

Format:

| 2 | 8 | 6 | 3 | 3 | |
|---|---|---|---|---|---|
| I, | I | A | β | γ | 20 | or:

| | | | 8 | 6 | 3 | 3 |
|---|---|---|---|---|---|---|
| | 22 | | I | A | β | γ |

Modes: 0, 1, 2, 3.
Fields: symbol, everything except symbol, key, memory address.
Comparison types (=, ≥, >).

Table of instruction codes:

| Mode | s | s̄ | k | m.a. | s | s̄ | k | m.a. | s | s̄ | k | m.a. |
|------|---|---|---|------|---|---|---|------|---|---|---|------|
| 0 | 117 | 118 | 119 | 120 | 121 | 122 | 123 | 124 | 125 | 126 | 127 | 128 |
| 1 | 129 | | | | | | | | | | | |
| 2 | | | | | | | | | | | | |
| 3 | | | | | | | | | | | | 165 |
| I | | = | | | | ≥ | | | | > | | |

This instruction provides a comparison in a half catena format. It does so as the expense of having more limited scope than the other two compare instructions.

A: catena address of left operand.
β: item address of right operand: i.e., the address of the right operand has β as its 3 most significant bits and 000 as its 3 least significant bits.
γ: address of exit: explained below.

Operation: In case the comparison is negative the central processor takes its next instruction from the next half catena in the sequence. For affirmative comparisons the next instruction is taken from the first half catena whose address is denoted by γ in the following way: the *two* most significant bits of the address are 00, the next 3 bits of lesser significance are given by γ, the least significant bit is 0, i.e., the address is $00\gamma_3\gamma_2\gamma_10$. In this way the next instruction may be located in alternate catenae from address zero up to fourteen (0, 2, 4, 8, 10, 12, 14). The instruction is taken from the first half of the catena so designated if there are two instructions there. Otherwise, the long format instruction designated is executed.

In case the item in which this instruction is used is not of the double length type, catenae 8, 10, 12, and 14 must not be used. In any case, catenae must not be addressed outside of the current instruction item or the contingency routine will be invoked.

Within this limitation the programmer may address, at least every fourth instruction by the affirmative link.

Description of modes: all modes have the interpretation given in the description of compare (2).

(3.5) *Other instructions*—(i) Add; subtract-catenae:

Format:

| 2 | 8 | 6 | 6 | | 20 |
|---|---|---|---|---|----|
| I, | I | A | B | | | or:

| | | | 8 | 6 | 6 |
|---|---|---|---|---|---|
| | 22 | | I | A | B |

Modes: 0, 1, 2, 3.
A: catena address of operand.
B: catena address of operand and put-away.

Operation: $(A)\pm(B)\rightarrow B$.

Field selection: The addition takes place over any of the following fields of both operands: entire catena less symbol, key field, and the memory address field. Instruction codes for all combinations are given below.

| Field and operation Mode | Entire catena less symbol (s̄) + | Key (k) + | Memory address (m.a.) + | s̄ − | k − | m.a. − |
|---|---|---|---|---|---|---|
| 0 | 166 | 167 | 168 | 169 | 170 | 171 |
| 1 | 172 | . | . | . | . | . |
| 2 | . | . | . | . | . | . |
| 3 | . | . | . | . | . | 189 |

In this operation only the indicated field of (B) is changed. If the summation results in an overflow, i.e., a carry or borrow to the left of the indicated field, then the overflow alarm is set. (But the machine does not stop; a later contingency routine may test the overflow alarm.) The sign bit is the most significant bit of the selected field and the binary point is immediately to the right of the sign bit.

(ii) Add, subtract-item.

Format:

| 2 | 8 | 3 | 3 | 3 | | |
|---|---|---|---|---|---|---|
| I, | I | α | β | γ | 3 | 20 | or:

| | | | 8 | 3 | 3 | 3 |
|---|---|---|---|---|---|---|
| | 22 | | I | α | β | γ | 3 |

Modes: 0, 1, 2, 3 (*I*=190, 191, 192, 193).
α: item address of adderd or minnerd (3 bits).
β: item address of augend or subtrahend (3 bits).
γ: item put-away address for sum or difference (3 bits).

The operands of this instruction may be as long as 8 catenae. However, the catenae designated as parts of operands must be identified by "data" symbols. Thus the "associative" catenae of an item will not be used as parts of the corresponding operand.

The binary point of each operand is considered to be immediately to the right of the most significant bit of the most significant data catena in the item, i.e., to the right of the third bit from the left.

The most significant non-symbol bit of the most significant *data* catena is the sign bit. A *zero* denotes "positive" and a *one* denotes "negative."

(iii) Multiply catenae:

Format:

| 2 | 8 | 6 | 6 |    |
|---|---|---|---|----|
| L | I | A | B | 20 | or:

|    |    | 8 | 6 | 6 |
|----|----|---|---|---|
| 22 |    | I | A | B |

Modes: 0, 1, 2, 3 ($I=194, 195, 196, 197$).

A: catena address of multiplier.
B: catena address of multiplicand and product.

During multiplication the symbol bits are stripped from (A) and (B) then the resulting product is placed into B with the original symbol of B. The operands are considered to be fractions with the binary point and sign as indicated.

Operand format:

| 2 | 1 | ⌐binary point |
|---|---|---|

| L | S | x x ... operand ... x x | sign⌐

(iv) Multiply items.

| 2 | 8 | 3 | 3 | 3 |    |
|---|---|---|---|---|----|
| L | I | α | β | 3 | 20 |

|    |    | 8 | 3 | 3 | 3 |
|----|----|---|---|---|---|
| 22 |    | I | α | β | 3 |

Modes: 0, 1, 2, 3 ($I=198, 199, 200, 201$).

α: item address of multiplier.
β: item address of multiplicand.
γ: item address for product.

In this multiply instruction only the data parts of the items are operands. The operands are constructed as in the add-substract (2) instruction.

(v) Divide catenae:

Format:

| 2 | 8 | 6 | 6 |    |
|---|---|---|---|----|
| L | I | A | B | 20 | or

|    |    | 8 | 6 | 6 |
|----|----|---|---|---|
| 22 |    | I | A | B |

Modes: 0, 1, 2, 3 ($I=202, 203, 204, 205$).

A: Catena address of dividend.
B: Catena address of divisor and quotient.

It is assumed that $(A)<(B)$ so that the resulting quotient is less than one. Operand format is the same as in multiply (1).

Divide items:

Format:

| 2 | 8 | 3 | 3 | 3 |    |
|---|---|---|---|---|----|
| L | I | α | β | γ | 3 | 20 |

Modes: 0, 1, 2, 3 ($I=206, 207, 208, 209$).

α: item address of dividend.
β: item address of divisor.
γ: item address of quotient.

In divide (2) as in multiply (2) only the *data* catenae are considered as parts of the operands. Associative catenae are ignored and the operands and results are formed exactly as in add (2).

(vi) Left justify catena:

Format:

| 2 | 8 | 6 | 6 |    |
|---|---|---|---|----|
| L | I | A | B | 20 | or:

|    |    | 8 | 6 | 6 |
|----|----|---|---|---|
| 22 |    | I | A | B |

Modes: 0, 1, 2, 3 ($I=210, 211, 212, 213$).

A: Catena address of operand.
B: Catena address for deposit of number of places shifted.

The contents of A is shifted left until its most significant non-zero digit is in the third bit position (see chart below). The number of places shifted (0, 1, . . . , 39) is placed into the least significant 6-bits of (B).

Example:

before:

| Symbol | ⌐binary point |
|--------|---|
| S | 0 0 0 1 0 1 — — — | after:

| S | 1 0 1 . . — — — — | sign⌐

In this example 3 (000011) would be placed into the catena addressed by B.

If the contents of A is zero then the number of places shifted is zero.

(vii) Left justify item:

Format:

| 2 | 8 | 6 | 6 |    |
|---|---|---|---|----|
| L | I | A | B | 20 | or:

|    |    | 8 | 6 | 6 |
|----|----|---|---|---|
| 22 |    | I | A | B |

Modes: 0, 1, 2, 3 ($I=214, 215, 216, 217$).

A: Item address of operand.
B: Catena address for deposit of number of places shifted.

This instruction is similar to *justify* (1) except that the justification takes place only with respect to the data catenae of the specified list. The operand format is the same as in add (2).

(viii) Halt:

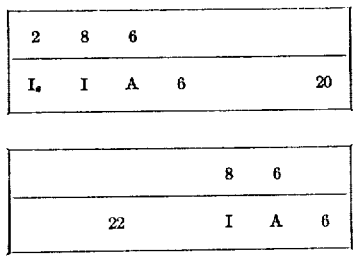

Modes: 0 only ($I=218$).

(A) Catena address of the next instruction should be "compute" button on the console be pushed.

(3.B) *Plans for Additional Instructions.*—The Read and Store instructions can be used for transfers between memory units such as tape and core memory for instance. Additional instructions not stated here may be needed for ease in editing and establishing format of print outs.

As described in chapter 3, Part II, of this report, two processes are required for operating the multi-list system in an interpretive mode. These two processes would then constitute the "Tree Growing" and "Executive" instructions. The process of the "Tree Growing" is the subject of chapter 2, Part I, of this report. The "Executive" process simply picks instruction words in a pseudo-language from a pop-up list of such words and initiates their decoding and execution.

CHAPTER 2—ORGANIZATION AND TIMING OF THE CENTRAL PROCESSER (1) *Main information flow*

FIG. 17 is a simplified block diagram of the central processor. In tracing the information flow we may start from the working registers, numbered 0 to 63. Several read-gates, are shown for address in the catenae of the working registers. The working registers are addressed (a) from the instruction register, to obtain the operands of an instruction and (b) from the control counter to obtain the next instruction. The operands (at most 3 at a time) are sent to the main combinational logic where the appropriate operation is performed on them—again under control of the instruction register. The result of the operation appears at the output of the main logic section and is sent to the *write-gate* where, under control of the instruction register, it is stored in one of the 64 working register catenae. (The block diagram of FIG. 17 implies indirectly that flip-flops be used for working register storage. Other means of storage, such as thin magnetic film, may be used. In that case the addresses may be supplied in a one time interval previous to the scheme described in this chapter. This can be done without disturbing the sequence of other events. The difficulty, however, lies in requiring the reading of three arbitrary catenae plus an instruction catena simultaneously. A special device may be necessary.) At the same time the next instruction is interpretated and stored in the instruction register, being readied for execution in the next time interval.

(2) *Single phase clocking system*

A single phase system is proposed here as means for simply describing the processes involved.

The present state of the machine, is the state of the 64 working register catenae, the instruction register and the control counter. The *read gates, address switching gates, instruction counting* and *decoding logic*, and the *main combinational* logic, act as one huge combinational logic block whose outputs determine the next state of the above registers. When the transients in this large block have died out, the next clock pulse samples its output and establishes the next state of the working registers. This entire process corresponds then to a single time interval. Successive instructions are executed one per *time interval*.

To start the above operation an instruction is inserted first into the instruction register. Next the output of the instruction register conditions the above described information flow. In a single phase system this control is applied "on the fly." The address portions of the instruction activate gates that steer the information in the addressed catenae to the appropriate inputs of the main logic. At the same time, the command provides appropriate control signals to the *main logic* through gates.

The next instruction is obtained by the action of the *control counter* through a "read gate #4" (refer to FIG. 17). Thus, during the entire execution of instruction $I_n$ as above, the control counter contains the number $n+1$ which is the address of the next instruction (exceptions to this rule are described below). At the completion of $I_n$ the results of $I_n$ (the next state of the working registers) are admitted to the working registers by the clock pulse. Simultaneously the next instruction ($I_{n+1}$) addressed by the control counter is admitted into the instruction register. Thus $I_{n+1}$ is contained in the instruction register during the next clock pulse interval.

The *control counter* itself normally "counts-up" at this moment. That is, while the control counter is addressing $I_{n+1}$, it is also activating the logic to place *itself* into state $n+2$. Hence, the next clock pulse does all of the following simultaneously:

(a) Places the Results of $I_n$ into the instruction register.

(b) Places $I_{n+1}$ into the instruction register.

(c) Places $n+2$ into the control counter.

This is illustrated in the timing diagram, Chart II–2.

(3) *Jump situations*

In the case of compare instructions the next instruction may be taken out of sequence. In this section we describe how such jumps are handled.

A special piece of logic called the *Jump address extractor* overrides the normal instruction address count-up when any jump instruction is transferred into the instruction register. The address placed into the control counter is the one that would be taken in case of a *negative* comparison. Thus, the D address (see campare instruction format, chapter 1) of a long comparison instruction would be set into the control counter. In a short compare instruction the normal "count-up" logic prevails.

This choice of one of the two exits provided in a compare instruction is, of course, a guess, and could be wrong. However, during this clocking interval the jump decision is obtained from the main logic and is ready to be used prior to the next clock pulse. If the guess was right the next instruction is already available and is executed in the next time interval. If the guess turns out to be wrong then the following happens:

(a) During the entire subsequent timing interval the states of all working registers and the instruction register are preserved. Hence, the inputs to the working registers, when the subsequent, pulse appears, are the same as before.

(b) The control counter is set to the address of the correct next instruction while all other changes are inhibited. So at the next time interval the instruction register is appropriately loaded, and the results of the previous instruction are successfully stored in the working registers.

(4) *Handling of one and two instructions per catena*

A micro-program sequence controller and logic is provided that handles, both cases, where there are two instructions per catena and where the instructions require more than one time interval for execution. This section is concerned with the former case.

When a two instruction catena is set into the instruction register, this fact is made known to the *controller* by the instruction decoder. When a new catena is obtained, the controller ordinarily calls for the command code stored in the first half of the catena. Thus the *controller* also activates the *address steering gates* for the appropriate addressing of the working registers.

At the conclusion of the first half instruction (assuming it is not a compare instruction involving a jump) the control counter is inhibited from "counting-up" by the *controller*. The *controller* also inhibits the accession of a new instruction catena via the gate in the input line to the instruction register. However, the sequence counter (not shown—but a part of the *controller*) charges state to permit the execution of the instruction in the second half of the catena. Next, normal operation of the control counter is resumed and another instruction catena is brought into the instruction register.

(5) *Multi-time interval*

Two classes of instructions are not included to be completed within one cycle-time with the indicated central processing system. These are: "item"-type instructions, and instructions involving more than three operand addresses.

"Item" instructions such as "transfer item" or "add item" certainly require sequential treatment since only one *write gate* is provided to the working registers.

Instructions involving more than three operand addresses must be executed sequentially because only three *read-gates* are provided to the working registers.

Information as to the class to which the current instruction belongs is brought to the controller via the instruction decoder. The controller sends a new control signal to the Main Combinational logic during each of the time-intervals of a multi-time interval instruction. During this time, also, the control counter is inhibited from "counting-up" and the working registers are not addressed to retrieve additional instructions. In the last time interval normal operation of the control counter and instruction addressing are restored (unless of course, a second-half instruction is yet to be executed).

(6) *Interaction with the memory synchronizer*

Letters "S" on the block diagram indicate information and control paths to and from the memory synchronizer.

In line with the results of queing studies of interacting fast and slow subunits of a large processor, the slowest units are here to be given the highest priority. This means that when the memory synchronizer asks for a catena from the working register, or indicates that it is ready to deliver one to the working registers then the next instruction is delayed until the communication with the synchronizer is completed, i.e., as soon as the current instruction is completed, the next clocking interval is given to the synchronizer. Since only an information transfer is involved, only one time interval delay of the main program is sufficient. Furthermore, the central processor instructions are, on the average, to be executed at a rate of 8 instructions per main memory accession. The previous discussion on the central processor organization justifies this speed ratio in terms of contemporary high speed core memories and high speed flip-flops and logic.

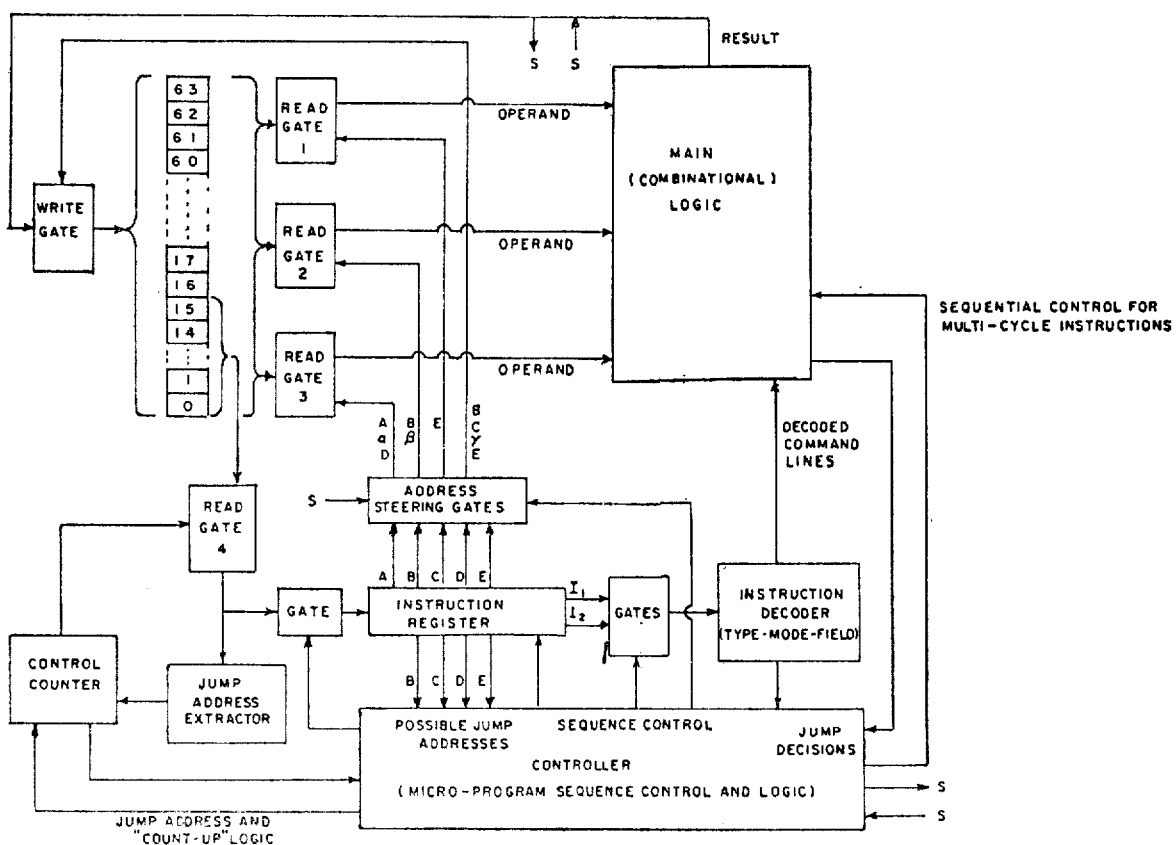

FIG. 17.—Simplified block diagram of the multi-list central processor

| | | | | | | |
|---|---|---|---|---|---|---|
| normal sequence | Control Regular contents, (i.e., address of instruction being retrieved) | n | n+1 | n+2 | n+3 | |
| | Instruction register contents,(i.e., instruction being executed) | $I_{n-1}$ | $I_n$ | $I_{n+1}$ | $I_{n+2}$ | |
| clock pulses | | ⋀ | ⋀ | ⋀ | ⋀ | ⋀ |
| Jump sequence for correct guess | Control number | n | Jump address = j | j+1 | j+2 | |
| | Instruction register contents | $I_{n-1}$ | $I_n$ | $I_j$ | $I_{j+1}$ | |
| Jump sequence for incorrect guess | Control number | n | Jump address = j | Correct jump address = k | k+1 | |
| | Instruction register contents | $I_{n-1}$ | $I_n$ | | $I_k$ | |

Chart II–2.—Timing diagram

CHAPTER 3.—BUILT-IN AUTOMATIC PROGRAMMING

(1) Introduction

One of the objectives of the research has been to ease communication with the computer. This objective has had a major influence on the design as reported in the preceding chapters. For instance, to this end the following features have been incorporated as built in functions.

(a) A synchronizer to relieve the programmer of memory address assignment.

(b) Instructions having two, three, four, and five addresses, allowing a single instruction to stand for a longer and more complex statement.

(c) Automatic tests of synchronization of memory and processor to relieve the programmer of housekeeping routines to provide the necessary delays. These tests are incorporated in the various modes discussed in chapter 1 of Part II.

(d) Automatic test of *end of item* and other symbols. These relieve the programmer of keeping track of item length allowing variable length items.

(e) Automatic indexing to reset addresses in an entire instruction item when new data is brought into the working registers.

(f) Accession of entire instruction items automatically.

(g) The use of instruction items provides small building blocks for construction of entire programs. This allows the programmer to consider at one time only one instruction item. Such an instruction item may represent a complex recursive process and serve as a building block in several places.

However, to provide true ease of communication requires, in addition, the following features:

(1) Availability of large command vocabulary.
(2) Flexibility allowing the changing of command vocabulary. The desired command language must be open ended allowing additions or deletions.
(3) The use of natural language for programming.

This chapter deals primarily with a description of how these latter features can be incorporated in the multi-list system and how the built-in functions simplify their incorporation.

Automatic programming can be carried out in an interpretive mode, a compiling mode, or some combination of these. Assume that the entire body of instruction items (each corresponding of up to 32 instructions) may be stored in a large disc memory. In the interpretive mode, these items are retrieved one at a time and executed.

In the compiling mode, all the instruction items involved in the program would be first retrieved from the disc memory and stored in a random access memory. They will then be brought into the working registers one item at a time and executed. Thus, in the compiling mode, many more instruction items must be retrieved from the disc memory, as each instruction item may branch into several other instruction items and the choice of one of the latter may depend on the execution of the problem. Since this choice is not known in advance, all possible successive instruction items must be retrieved, and their successors, in turn, and so on. The design of the system provides for other improvements in efficiencies over current systems for operation in the interpretive mode. Therefore, the automatic programming scheme discussed in this chapter is based on the interpretive mode, though the compiling mode could be used as well. An optimum situation probably would be storing the instruction items most frequently used in a random access memory and the less frequently used in a disc type memory.

In the course of this research familiarity with previous work in this field was of great value. Specifically important was the work on Generalized Programming of Holt and Turanski (Univac Generalized Programming, Management Services and Operation Research Department, Remington Rand Univac, 1957, New York), and the work on IPL (Information Processing Languages) of A. Newell, J. C. Shaw and N. H. A. Simon (The Exploration of the Logic Theory Machine. A Case Study in Hueristics, Proceedings of the Western Joint Computer Conference, 1957, pp. 218–230).

(2) General description

The flow of information in the system is described schematically in FIG. 18. The functions of the blocks in FIG. 18 are described in the rest of this section, thereby describing the entire system.

(a) Input: FIG. 18 shows the existence of three inputs; these are as follows:

(i) *New data.*—Input 101 is in the form of data and associative catenae already organized into items. The associative catenae consist of the descriptor (or key) and blank spaces for the addresses. The addresses would be assigned through the automatic memory space assignment to be discussed later in this section. Other formats for new data may be acceptable as well. As indicated in chapter 3, Part I, the descriptors may be in natural langauge and the assignment of machine codes for the corresponding keys would be made automatically. *Data* is information that is not classified into descriptors for which keys are generated. Thus, the machine can take an arbitrary string of data headed by descriptors and separate it into the catenae-item format. Addition of descriptors to the storage amount to adding new words to the descriptor language used in communicating with the machine.

(ii) *Programs defining new words in a pseudo-language.*—These programs may each consist of a number of instruction items and may have recursive portions. Addition of such programs to the storage amounts to adding words to the vocabulary in the pseudo-language. If the programmer is aware of instruction items previously stored in the machine which could form a part of newly added program, he may refer to such items thereby eliminating their duplication in storage. In that case, he may also want to somewhat modify the instruction items previously stored which are to be part of the newly added program so that they can be used for more than one program.

(iii) A command-word and operand pseudo-language program input 105 consists of a list of command-words and names of operands. Next to each command-word there may be several names of operands. The command-word then is a word in the vocabulary of the pseudo-language. The names of operands are words in the vocabulary of the descriptors. The research to date has been limited to study of such mechanical languages. We plan to study an extension of the proposed system that would allow sentences in a natural language to be translated into statements consisting of uniquely defined commands and names of operands. Specifically, processes such as those described by N. Chomsky (Three Models for the Description of Lanugages, IRE Transactions on Information Theory IT–2, pp. 113–124, September 1956, and Syntactic Structures, Moutons' Gravenhage, 1957), will be applied to the decomposing of sentences appearing in the program.

(b) *Tree growing programs.*—The tree growing programs 107 are essentially decoding devices which translates a name into a storage location. The new data input 101 and the pseudo-language input 103 are transmitted to said programs 107 by means 109 and 111 respectively.

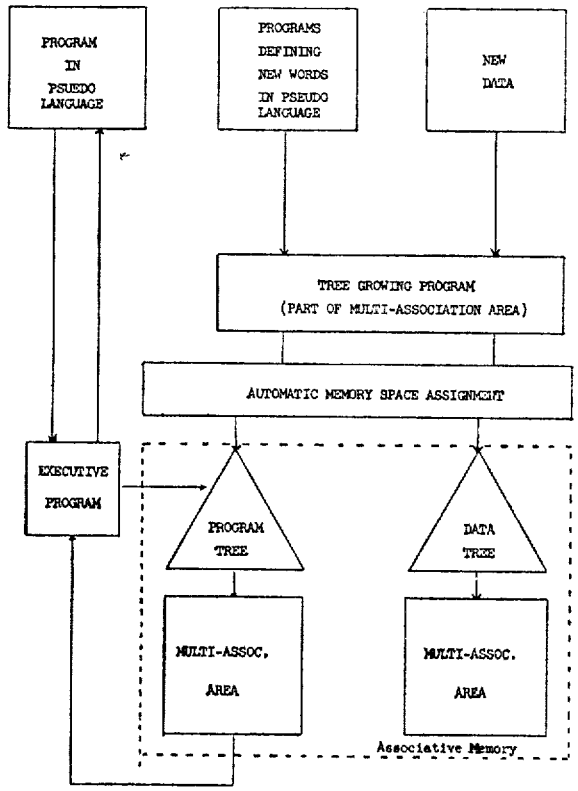

FIG. 18.—Schematic description of flow of instructions and data in the interpretive mode The flexibility of the tree as expressed in the ease of adding or deleting names is its major advantage in the application at hand.

The tree growing program can be applied to both programs and data as indicated below (see item (f) below).

(c) *Automatic memory space assignment.*—This process is carried out by the synchronizer and has been described in chapter 4, Part I, and in chapter 1, Part II. Both the new data and the programs defining new words in the pseudo-language come in with blanks in places where linking addresses must be provided. In the course of automatic memory space assignment the addresses to be inserted are made available.

(d) *Trees, for programs and data.*—The format of these trees is the same as that of the growing trees described in chapter 2 of Part I. The trees provide the translations between the names of lists (which correspond to commands in the programming pseudo-language, or descriptors in the data system) and an address in the multi-association area, where the corresponding list is stored.

(e) *Executive program.*—The incoming programs are in pseudo-language and consist of sentences each having a command and names of operands. The command word must have previously been stored with the corresponding program. The names of operands also must have been added to the storage previously.

The functions of this program are as follows:

(i) Takes one sentence at a time from the top of the program (i.e., the program is treated as a pop-up list).
(ii) Separates the command from the operand names.
(iii) Initiates the retrieval and execution of a program corresponding to the command.
(iv) Inserts the names of the operands in the program in the appropriate places.

In future research we plan to consider the case where the format of the program in pseudo-language is not fixed and sentences in natural langauges may be used. The decomposition of these sentences into statements consisting of commands and operands must, of course, be done previous to procesing.

(f) *Multi-association area.*—In this area are stored both items of data and instructions. In the case of data the addresses which go together with keys in associative catenae provide links between items. In the case of instruction items, the memory addresses which go with compare and jump instructions form the associative catenae to provide links between instruction items. These addresses are put there from information provided by the synchronizer while storing the items involved (see Synchronizer Instructions in chapter 4, Part I). Programs for determining the inter-connecting addresses and the appropriate places in the respective catenae have also been reported previously. (Information Retrieval and the Design of More Intelligent Machines, Final Report No. AD59URI, the Moore School of Electrical Engineering, July 1959, pp. 60–77.) Recursive processes are possible entirely within the multi-association area, where the instruction items are stored, without having to go out to the executive program. Such recursive routines can be within the single instruction items or involve several instruction items. There could of course be subroutines inside subroutines.

(3) *Discussion of features of the programming system*

One disadvantage is that a new programmer may have difficulty in using the previously stored instruction items as part of new programs which he may wish to introduce.

The advantages of the system are primarily in its flexibility of allowing changes. It is an open-ended system, new words can be added or deleted efficiently. The filing of the programs is automatic and may involve filing of only portions of the problem as the other portions may be part of previously stored programs which can be utilized. Another advantage is that the programmer can develop his own building blocks, namely instruction items from which he can draw upon in solving other problems.

It is interesting to note the elements necessary for initiation of such a system. From FIG. 18, one may see that these are three, namely the tree growing program, the automatic space assignment and the executive program. The availability of these three programs allows the initiation of what has been called "boot-strapping operation" where the introduction of some programs aids in preparing subsequent programs. In the system proposed in this report, the automatic memory space assignment has been built in and the other two processes have been considered for hardware mechanization as well. However, in the present scheme, the system would be completed only after these latter two processes are stored in the memory, i.e., the storing of these two processes is actually part of the construction of the system.

PART III

CHAPTER 1—PROCESSOR ORGANIZATION

(1) *Introduction*

In chapter 1, Part I, it was mentioned that the multi-list structure was suggested by the study of human thought processes. Historically, the development of the multi-list machine started out in three directions. One approach was to lead to the development of the machine starting from the basic operations of transfer and compare. Another of the approaches selected as the basic processes such complex ones as the finding, filing, and deletion of an item of information. The third approach chose basic processes that were similar to the ones used by Newell and Simon in IPL V, processes having a complexity between those of the aforementioned approaches. In sections 2 to 5 below, the results of the second approach that affect the processor organization will be discussed. Other consequences are discussed in chapter 2 and chapter 3.

In principle, the design of a digital computing system is carried out as a sequence of steps (with a great deal of feedback). These steps are:

(a) The statement of the class of problems to be handled by the system.

(b) The analysis of representative problems leading to the preparation of flow-charts in terms of operations which are not necessarily the basic operation of the machine.

(c) The determination of the type and size of the hardware entities to be used in the system, how they are to operate together, the machine alphabet, and the instruction code. The choice among the various possibilities is based on the maximization of some suitably chosen figure of merit such as the reciprocal of cost times speed (the definition of efficiency used here).

(d) The detailed logical and electrical design of the system and other steps which need not be listed here.

Since there is a great deal of feedback in the following of the above procedure, it is neither extremely important that the first step be done before the others nor described before the others. Historically, the concept of a multi-list structure was invented first and then a study for applications followed. There seemed to be potential applicability in information retrieval, general-purpose data processing, and artificial intelligence problems, although the last of these was not emphasized in this study. Since the first two can be handled by human beings, they should be capable of being handled by a machine which simulates certain processes that the human mind carries out at the verbal level. Thus we state that the problems to be handled by the multi-list machine are to be members of the class of problems that a human can handle.

If we try to analyze the way humans handle information, one fact stands out vividly: this is the fact that information is obtained from another person by describing to him the kind of information wanted rather than by giving to him the address of the location in which the information is stored. That is, information is retrieved on the basis of *name* or *description* rather than on the basis of storage location. The research results to be reported in sections 2 to 5 and chapter 2 have to do with the mechanization of this basic process of information retrieval using addressable memories while in chapter 3 some initial work is reported which deals with the problem of constructing more complex processes (mechanisms) from the basic processes.

(2) *Multi-list structure used in this study*

Consider an item of information such as that conveyed by the words, "brown, leather, briefcase." These words *describe* an object that may exist in the world and can be visualized by many people. If the mental image is regarded as data, these three words are the *descriptors* of the object at the verbal level. These particular descriptors have been chosen with increasing complexity. For example, the word "brown" describes a sensation. Since all the knowledge a human has of the world has been gained through his senses, all his knowledge can be factored into appropriately chosen independent sensory factors. Thus the sensation of brown is a basic quantity (or, as previously stated in Part I, a value of the attribute "color"). In a machine, one would use some code word to stand for the sensation of brown; for the moment let the word "brown" stand for the sensation. Now the word "leather" stands for a set of sensations rather than for one sensation (group attribute). What sensations this set consists of is clearly and of necessity subjective in nature, varying from one person to the next, but these sensations are largely tactile in nature. The word "briefcase" stands for a complex set of sensations both tactile and visual. However, we will assume for the present that the three descriptors are on an equal footing.

Freud outlines an experiment with "free-associations" that some people can perform. If this experiment is performed, the state of affairs shown in the multi-association area of Chart III–1 can be deduced. An item of information is represented by a dot labeled with numbers (in Chart III–1, those numbers not in parentheses in the multi-association area). The numbers are the descriptors of the item. For example, 2 might be the code for "brown." All items having "brown" in common are connected together by associative links which are represented by lines. To mechanize the multi-association area in an addressable memory, the list technique, which was probably first suggested by Newell, Shaw, and Simon, is used. Each item is a list of keys (numbers standing for descriptors) with the head of the list at an addressable location (the item address) in such a way as to allow one to switch from one associative trail to another at an item if so desired. The tree is an ad hoc construct at present to enable one to enter the multi-association area from one point. (However, Prywes has found evidence of three structures in preception.) Canonical tree terminal coding (after Gorn) is used in this example so that the key names the exit of the tree. Thus the item having the description 13, 15, 2 can be reached via a search on the lists labeled 13, 15, 2. The four-way branch at each tree node has previously been shown to be optimum. To show how the key names the tree exit consider, for example, the exit named 7. Since a four-way branch occurs at each node, express the exit name in base 4. We have $7 = (13)_4$. If the branches from a node are named 0, 1, 2, and 3 from left to right, then the node name $(13)_4$ directs that Branch No. 1 be taken at the entrance node and that Branch No. 3 be taken at the next level of the tree which brings us to Exit No. 7.

There are two ways of treating a description or a set of keys.

(1) Positional significance is attached to each key (the description 2, 7 does not mean the same as 7, 2 etc.). Properties of positional significance are:

(a) A separate tree is required for access to each key position.
(b) The number of keys in an item is fixed in the case of a particular class of information items.
(c) It is possible that two or more keys in an item may be identical.

(2) No positional significance is attached to each key. (The description 2, 7 means the same as 7, 2 etc.) Properties are:

(a) The number of keys in an item can be variable from item to item.
(b) In an item no two keys are the same.
(c) A given key has a unique meaning.
(d) A single tree provides access to all key positions.

Disadvantages of 1 (positional significance) are:

(a) Fixed format is required—all data must meet this requirement.
(b) The equivalent of no positional significance of catenae cannot be achieved by coding.

Advantages of No. 1 (positional significance) are:

(a) Vector interpretation of a set of descriptors is possible and may be of value in applications such as pattern recognition.
(b) Matching of keys in item with the input request is simpler (multi-association comparisons per item examined) than in the case of no positional significance.

Advantages of No. 2 (no positional significance) are:

(a) No fixed information format is required.
(b) The equivalent of positional significance can be achieved by incorporating an identifying number into the key.

Disadvantages of No. 2 (no positional significance) are:

(a) Requires extra bits in key to identify component of vector in the case of a vector description.
(b) Matching of keys in item with input request requires $M_a^2$ comparisons per item examined.

Because of the greater flexibility and the greater potential efficiency of the no positional significance case when handling items of variable length, this way of treating the keys has been chosen for this portion of the study.

Summarizing this section:

(a) Any item of information that is to be recalled from the multi-list memory is obtained by means of a description consisting of one or more keys.
(b) Access to the multi-association area is via a tree having four branches from every node.
(c) No two keys in an item are identical. Hence an item containing five keys can be reached via five distinct exits from one tree.
(d) Coding in the case of a vector description must be handled by a processor external to the multi-list memory.

(3) *System organization*

A simplified block diagram of the system envisioned at present is shown in FIG. 19.

The multi-list memory contains the tree and the multi-association area. The processor contains a number of working registers, a "control memory" and the associated logic. Each working register is addressable and is under the control of the control memory so that the processor is essentially a general purpose computer with loop-control and stored logic. Hence, it can be programmed to provide any type of basic logic for a multi-list processor. It is conceivable that some day one may find it more efficient to provide wired-in logic in the processor than to use a control memory. The nature of the input-output processor is not yet known.

At this point it is appropriate to give the reasoning that led to the adoption of a control memory separate from the multi-list memory. It is envisioned that the basic processes of this machine are such as "file an item," "find an item," "delete item," etc. These processes are quite complex in that it would require a large amount of hardware to mechanize the execution of any of them. Also, if part of the work of determining efficient basic processes for such a machine requires experimentation with the machine, or if new processes are discovered that are considered desirable to be included in the set of basic processes, it would be desirable that the logic that mechanizes these basic processes be easily alterable. This is achieved if the logic is stored in a "control memory" since if the multi-list memory is of large capacity, it will be certainly slower than memories of less capacity such as required for the working registers. In any process involving the multi-list memory, many operations involving transfers of information can occur in one list memory cycle. This requires that each such operation (such as a transfer from one working register to another) should be executed in a fraction of the multi-list memory cycle and, therefore, it is required that the control memory have a faster cycle time than the multi-list memory. It is thus obvious that the control memory could not be part of the multi-list memory.

In previous work, it has been shown that there is an improvement in efficiency if the processor registers (working registers) are separated from the memory that stores the sequencing information. This establishes the separate existence of the working registers, the control memory, and the multi-list memory. In any operation sequenced by the control memory there would be several actions taking place in the working registers so that the latter would need to be faster than the control memory. Hence, we can set down the following very tentative table (Table 1) giving orders of magnitudes of the speeds and sizes of the various memories that might be used in a multi-list system. Word sizes are approximate and are developed in other sections of this report. The number of words in the working registers and the control memory are estimates based on the work so far. The large capacity 10 $\mu$s. cycle memory is a tenuous projection of today's technology. It should be noted that the control memory does not have to be written into during the operation of the system and, therefore, can be a "read only" memory.

TABLE 1

| Size | Speed | Function |
| --- | --- | --- |
| 64 words, 64 bits/word | 0.4 $\mu$s. cycle | Working registers |
| 1024+ words, 35 bits/word | 2 $\mu$s. access | Control memory |
| $10^6$+ words, 80 bits/words | 10 $\mu$s. cycle | Tree and MA area |
| $10^9$ bits | About 1 ms. | References from MA area |

The next thing to be considered is the way the control memory should sequence the processor. A block diagram of a synchronous sequential system which operates like the Huffman-Moore model of a sequential system is shown in FIG. 20. Let us assume that the input and output synchronizer paths carry information from and to the multi-list memory and the input-output processor. Then the box labeled "register" consists of the working registers while the box labeled "combinational logic" consists of the control memory, the input and output switching networks for the working registers, and *elementary processing units* such as comparators, adders, etc. As shown in FIG. 19, the control memory sequences the components of the system and in turn, it is under the control of the information content of the multi-list memory. (The nature of the multi-list memory instructions is discussed in chapter 3.) Since the control memory augments the combinational logic of the system, two ways in which it can do this are:

(a) Control bit method: The states of the control lines in the combinational logic during a working register cycle are stored in a control memory position. The control memory and working registers cycle together and successive words in the control memory set up the combinational logic for the desired operations that are to be carried out in each cycle.

(b) Address method: Bits or words are transferred between working registers and basic processors as in the traditional general-purpose computer.

If there are N units between which information can be transferred then in the control bit method there are $N(N-1)$ paths to control if transfers are allowed from any unit to any other. If a common transfer bus is used, the number of paths to be controlled is N. If it is assumed that one bit can control flow in one direction in a path, the two cases require on the order $N(N-1)$ and $N+1$ bits respectively in a control memory word. However, if a conventional three-address code is used, at least $3 \log_2 N$ bits are required in a control memory word. For 64 working registers, the address method clearly requires the least number of bits in the control memory word. (Note that if there were only four working registers, a different conclusion would have been reached.)

Hence, the control memory word is an instruction of the conventional type with an address structure yet to be determined (chapter 3). Several, rather than one, working register cycles may occur in one control memory cycle so that a further increase of efficiency would be obtained using the address method were the process or speed limited by the access time of the control memory. We may also conclude that the technique of indirect addressing must be used so that the contents of a working register can affect the addressing. If this way, the need to modify the contents of the control memory is eliminated allowing the use of the more efficient read-only memory for the control memory.

(4) Word structure

The multi-list memory is considered here to be a single addressable memory in which the three and the multi-association area are stored. No attempt is made to consider a detailed hierarchy of memories for the multi-list memory because (a) the optimum hierarchy depends strongly on the type of application and (b) we wish to establish and demonstrate theoretical feasibility before conducting a thorough optimization.

Each addressable location can hold one *word*. The three kinds of words possible to date are shown in Chart III-4. A tree word is used at each node of the tree and contains space for the addresses $A_0$, $A_1$, $A_2$, and $A_3$ which are either the address locations of the four tree nodes on the next lower level or the addresses of the first items in the multi-association area on the respective lists.

The multi-association word can contain up to two catenae (the various catenae will be described in the next section). As will be seen, a catena contains somewhat more bits than an address; therefore there will be enough bits in a multi-association word so that it will not be wasteful to make the tree word the same size as the multi-association word. How multi-association words can be chained to produce an item and why there are two catenae in such a word will be explained in the next section.

In order that the system can allocate its own storage locations and to allow the bypassing of storage locations that are electrically defective, after Newell and Simon, usable, but unused, storage locations are linked together in the "List of Available Space" (LAS). To provide this linking, an address is required in each word in the LAS giving the location of the next word. It is convenient to use an associative catena (see next section) for this purpose.

An Item Type Bit (ITB) is required to enable the processor to determine whether it is scanning the tree or the multi-association area. However no such identification is required in the case of the LAS word because such words are examined by the processor only in the case of LAS processes. The choice of binary zero to identify tree words and of binary one to identify multi-association words is based on minor simplifications that this choice enables one to make in the processor.

The presence of the parity bit serves to indicate that some form of error detection, and possibly of error correction, is to be used; the choice of which cannot be determined until the size, type, and reliability of the addressable memory is known.

(5) Item structure and catenae

The item structure and catenae are shown in Chart III–5. An item in the multi-association area consists of enough multi-association words to make up the item as shown in Chart III–5a. The required number of associative catenae are used to identify the item and a sufficient number of data catenae are used to store whatever "data" needs to be stored if the item is a *data item*. If the item is an *instruction item*, sufficient instruction catenae are used to store the information necessary for the execution of some process. Thus both data and instructions can be retrieved by name. The composition of the instruction catenae and how they are handled will be discussed in chapter 3.

Words occupy successive addressable locations if available. When two words in an item are not in successive locations, the first word will contain a jump catena in the second catena position whose address gives the location of the second word. If a word had room for only a single catena and no two memory positions on the LAS were in successive locations, no items could be stored. However, an item having N catenae could be stored in this instance in N locations if the word has room for two catenae. The extreme case of no two memory positions on the LAS being in successive locations will probably never occur, so that the choice between having one and having two catenae in a word would have to be made by comparing the efficiencies of the two methods, as applied to the storage of given information and in connection with the kinds of memories used. If the multi-list memory access time is significant, compared to the processor operation times, the speed is greater if two catenae can be stored in a word because two (rather than one) catenae can be obtained in one memory cycle. Thus, it appears that if both methods are equally efficient in the use of storage space, greater overall efficiency is realized if two catenae can be stored in a word.

A catena contains the Catena Type Code (CTC) that tells the processor which type catena it is. There are four main types but since there are several types of instruction catenae, the CTC requires at present 5 bits. At present the CTC has the following form:

(a) Data catena
(b) Associative catena      } 2 bits
(c) Instruction catena
(d) Jump catena
(e) End of item catena (1 bit)
(f) Last associative catena in item (1 bit) (in descriptive instruction catenae, this bit marks "End of process name").
(g) Descriptive or basic instruction catena (1 bit). The associative catenae hold the keys, and the addresses which provide the associative links. That is, the address gives the location in the multi-list memory where the first two catenae of the next item on that key list are located.

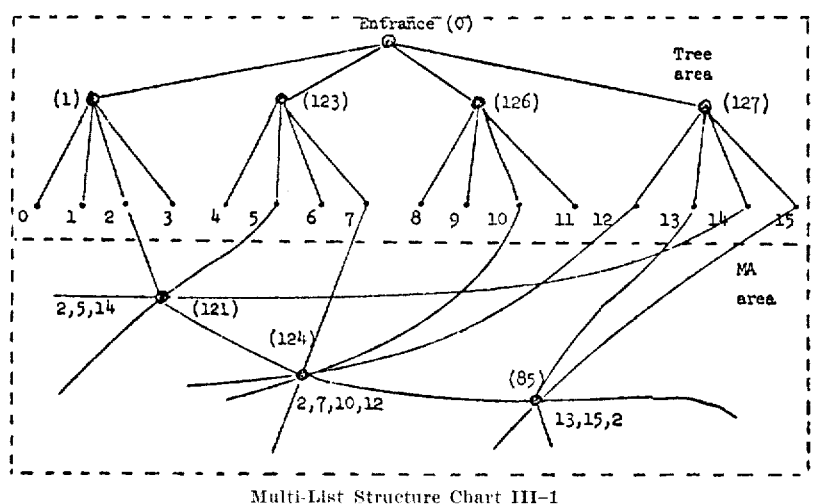

Multi-List Structure Chart III-1

In Chart III-6, the contents of the multi-list positions are shown, if the tree and multi-association area of Chart III-1 were stored. It is assumed that the LAS contained as available space, the positions 0, 1, 122, 123, 124, 125, 126, 127, 85, and 43. It is also assumed that the items arrived sequentially in time beginning with item 2, 5, 14 and ending with item 13, 15, 2. The numbers in parentheses in Chart III-1 are the item addresses of the various items.

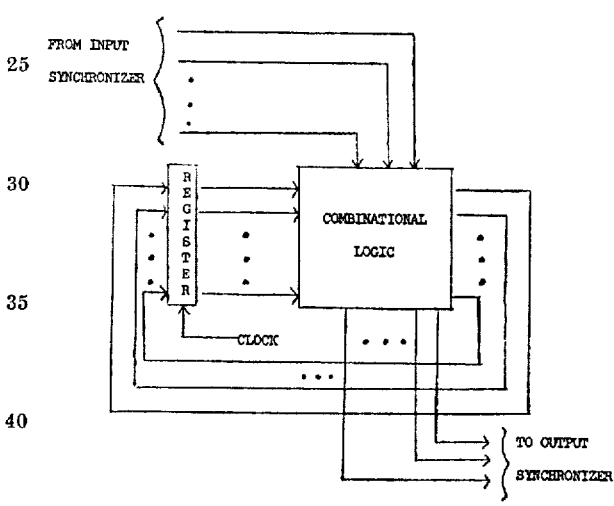

FIG. 20.—Synchronous sequential system

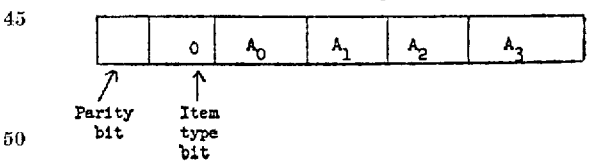

(a) Tree word

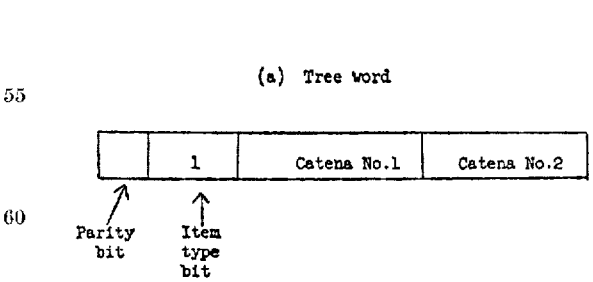

(b) MA word

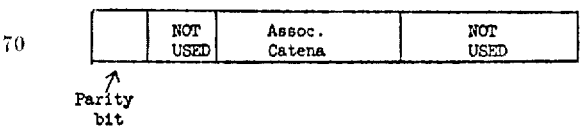

(c) LAS word

Chart III-4.—Word structure

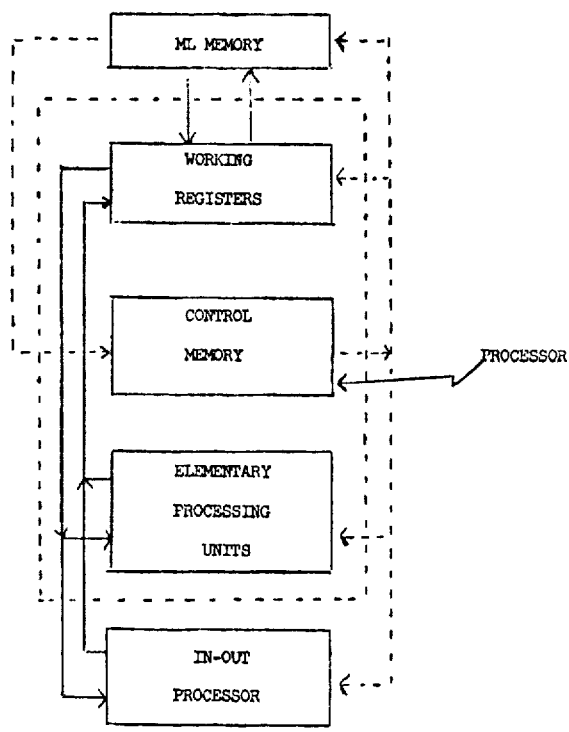

- - - - CONTROL
———— DATA

FIG. 19.—Simplified system block diagram

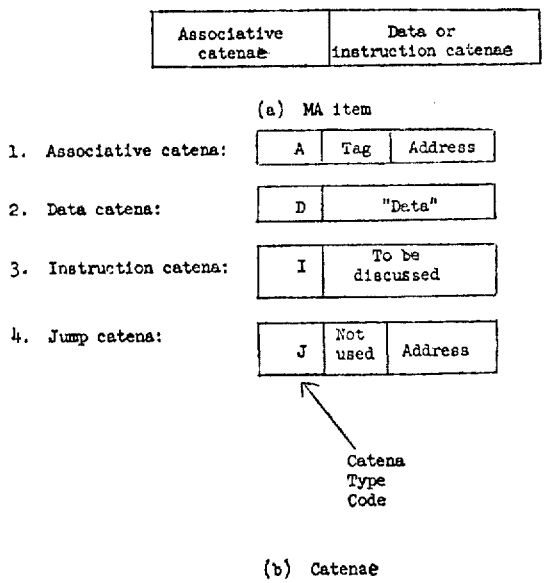

Chart III-5.—Item structure

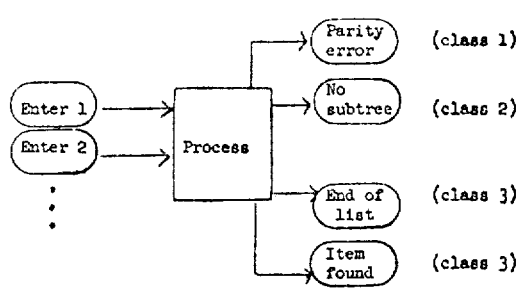

A process.

Chart III-7

Chart III-6.—Example of ML memory contents for Chart III-1 process is called a *basic processor*. In principle, if one prepares flow-charts of the basic processes in terms of operations performed by the elementary processing units and then groups these operations into the particular grouping that maximises efficiency, one has defined a large part of the control memory instructions.

If one knew all the basic processes and the characteristics of the elementary processing units, the development of the instructions could be an easier task. Unfortunately, the multi-list system organization differs so radically from the organization of the traditional general-purpose computer that neither the basic processes nor the nature of the elementary processing units are well known. However, it does appear at present that at least the following will be needed:

(a) Item finding: Several types are required, but in the multi-list system we flow-chart only that process of finding an item which exactly fits a given description.
(b) Taking from LAS.
(c) Putting in LAS.
(d) Item filing.
(e) Item deletion.
(f) Advancing on a list.
(g) Item readout.

All of the these above processes have their flow charts given in section 3 below; the elementary processing units required can be partly determined by examining these flow charts.

(2) *Definition and symbols*

An instruction in the multi-list memory calls into effect a process that may have several exits. Such a process is the one carried out for finding an item that exactly satisfies a given description with $n$ keys by virtue of the fact that the item contains $n$ keys. The key on which the search is based is also given. Such a process will be used many times in a program and, therefore, will have several entrances. Such a process is shown in Chart III-7.

We introduce the following classes of exits from a process:

Class 1—Equipment failure.
Class 2—Program or information error of a detectible nature.
Class 3.—Consequence of a valid program.

For reasons that will be made evident in chapter 3, every exit from a process must enter another process. For example, the exit "end of list" in Chart III-7 may signify that the searched for item is not in the file. In this

CHAPTER 2—PROCESSOR INSTRUCTIONS

The sections below are continuation of the report of work that was begun in chapter 1, Part III.

(1) *Basic processors*

As stated previously, the basic processes of this system include "find an item," "delete item," "add item," etc. These processes will be mechanized using the control memory, the working registers, and the elementary processing units. The combination of the control memory program and the hardware items that can carry out a basic case, one might wish to modify the input description and repeat the search, whereby this exit would lead to the entrance of another process. In another program, the "end of list" exit might signal an entirely different process, and, thus, mechanization of a variable connector would be required. There are two kinds of variable connector mechanizations required: one kind is required in the basic logic (control memory) and will be discussed in section 4 of this chapter; the other is required in the multi-list programs which are discussed in Part III.

The symbols used in the system of flow-charting considered in this part of the report are shown in Chart III–8. The function box in Chart III–8 will contain the description of a function, and it may have several entrances and several exits. In interpreting the flow charts, one should keep in mind the nature of the registers involved. The choice box, shown in Chart III–8, indicates which one of two or more paths is to be followed as a result of answering a question. The fixed connector is used to connect remote parts of the flow chart and it helps eliminate long lines. The assertion box and reference marks serve to label lines. There are two types of nodes, OR nodes and AND nodes, the functions of which are implied by their names. These are the only flow-chart symbols that we need.

For the purpose of ease in flow-charting of the various routines to be stored in the control memory, the various working registers and bits thereof, in the case of flip-flops, have been given names. A list follows:

$R_1, R_2 \ldots R_1', R_2', \ldots$ = Catena length registers storing catenas of an item to be filed or the descriptors of an item to be retrieved.
$S_1, S_2, \ldots$ = Counters.
WR = Catena length register having a special function.
AAR = Address length register.
MDR = Word length register in which catenas are addressable.
$L_1, L_2, \ldots$ = Flip-flops storing data.
$F_1, F_2, \ldots$ = Flip-flops storing control information.
$C_1, C_2, \ldots$ = Flip-flops storing results of comparisons.
MAR = Address length register having Multi-List memory connection (memory address register).
$SR_1, SR_2, \ldots$ = Address length registers.
D = Two-bit length registers.
$\phi$ = The "null register" (address exists but the register does not).
I = The unit register.

The 64 addressable working registers are all alike and, except for five, are of catena length. The exceptional five registers are: the "null register" $\phi$, the "unit register" I, and the registers MAR and MDR. Since MDR must hold two catenas, a parity bit, and the item type bit, it has two addresses corresponding to its left and right halves (MDRL, MDRR); the item type bit and the parity bit are in the left half. The null register is an addressable working register which does not exist in the sense that all zeroes are stored there. The unit register is also an addressable working register which is the equivalent of a register with all ones stored in it. Both MDR and MAR, the memory address register, each have a multi-list memory connection. The MAR need only provide room for an address of the multi-list memory length.

Unless otherwise stated, the bits in a working register are numbered as follows (40 bits assumed).

$$a_{39} \ldots a_2 a_1 a_0$$

Registers and flip-flops are assumed to be automatically cleared of previous contents when new information is inserted. The notation AAR→SR, means that the bits in AAR are transferred to corresponding places in $SR_1$. The notation (MAR)→MDR means that the bits in the multi-list memory at the location given by the address in MAR is sent to MDR, T, D, and A stand respectively for key, descriptor, and address.

(3) *Flow charts for basic processes*

In this section, flow charts are given for the basic processes listed in the previous section. Since these flow charts were prepared before there was any knowledge of the form of the control memory instructions, there is lacking perfect consistency in the choice of the elementary operations; therefore there is some lack of precision inherent in the flow charts, which is unavoidable at this stage in the development of the system.

(3.1) *Item finding.*—The flow chart for finding an item given its exact description is shown in FIG. 21. It is assumed that the description $D_1, D_2, \ldots D_n$ are stored respectively in registers $R_1, R_2, \ldots R_n$ and that the key on which the search is to be made is specified by flip-flop $L\alpha$ which is set. Some flip-flops and registers are then cleared. The first item in the tree is stored in the multi-list memory position, $\phi$. Branchings are made at each node in the tree until the multi-association area is reached or until it is determined that the part of the tree searched for does not exist ($d$ is the number of bits in a descriptor). When the first multi-association item is reached, comparisons are made of the keys (T) in the item with the descriptors stored in registers $R_1 \ldots R_n$. The result of the comparisons indicates whether or not the item searched for has been found. At all exits, the

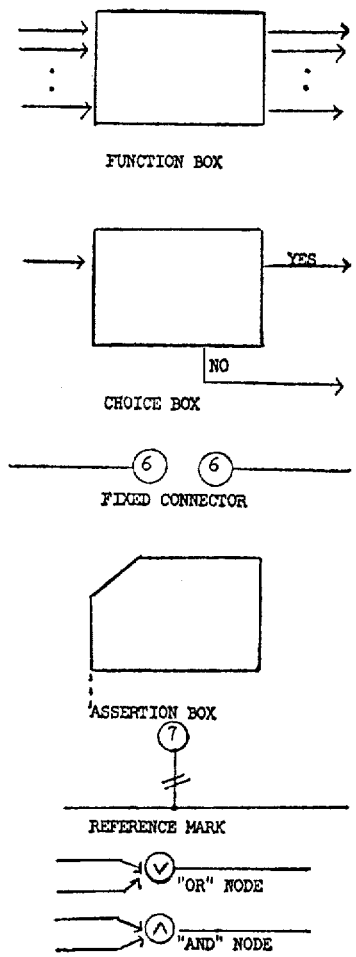

Chart III–8.—Flow chart symbols states of flip-flops and the contents of registers are left undisturbed.

Charts III-10 through III-20 show the flow chart of the process of FIG. 21 broken up into sub-processes which illustrate the operations involved at the register level. The level of this division into sub-processes is tentative, the final choice being dependent on those to be used in other processes. Modification of this process to that of finding items given a partial description is chiefly one of redesigning the "Test for End of Comparisons" block in Chart III-18.

The "Test for End of Comparisons" block was designed from the following tables of combinations:

| $S_1=n?$ | $F_2$ | $\overset{S_1}{\underset{1}{\Pi}} C_j$ | Item Found | Follow List | Get Next Catena |
|---|---|---|---|---|---|
| 0 | 0 | 0 | | | 1 |
| 0 | 0 | 1 | | | 1 |
| 0 | 1 | 0 | | 1 | |
| 0 | 1 | 1 | | 1 | |
| 1 | 0 | 0 | | | 1 |
| 1 | 0 | 1 | | | 1 |
| 1 | 1 | 0 | | 1 | |
| 1 | 1 | 1 | $Z_1$ | $Z_2$ | $Z_3$ |

We have:

$$Z_1 = S_1 \cdot F_2 \cdot \prod_1^{S_1} C_j$$

$$Z_2 = F_2 \left[ S_1' + \left( \prod_1^{S_1} C_j \right)' \right]$$

$$Z_3 = F_2'$$

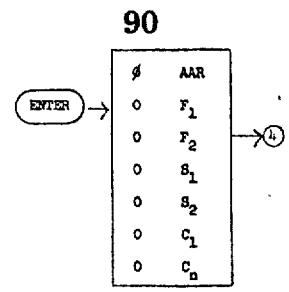

Chart III-10.—Initializing Block

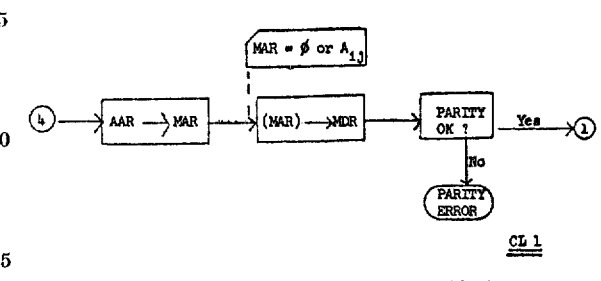

Chart III-11.—Associative access block

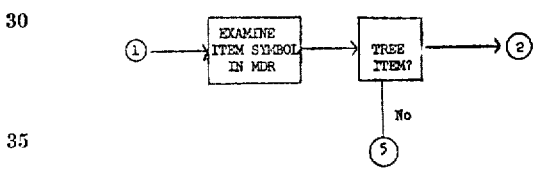

Chart III-12.—Item identification block

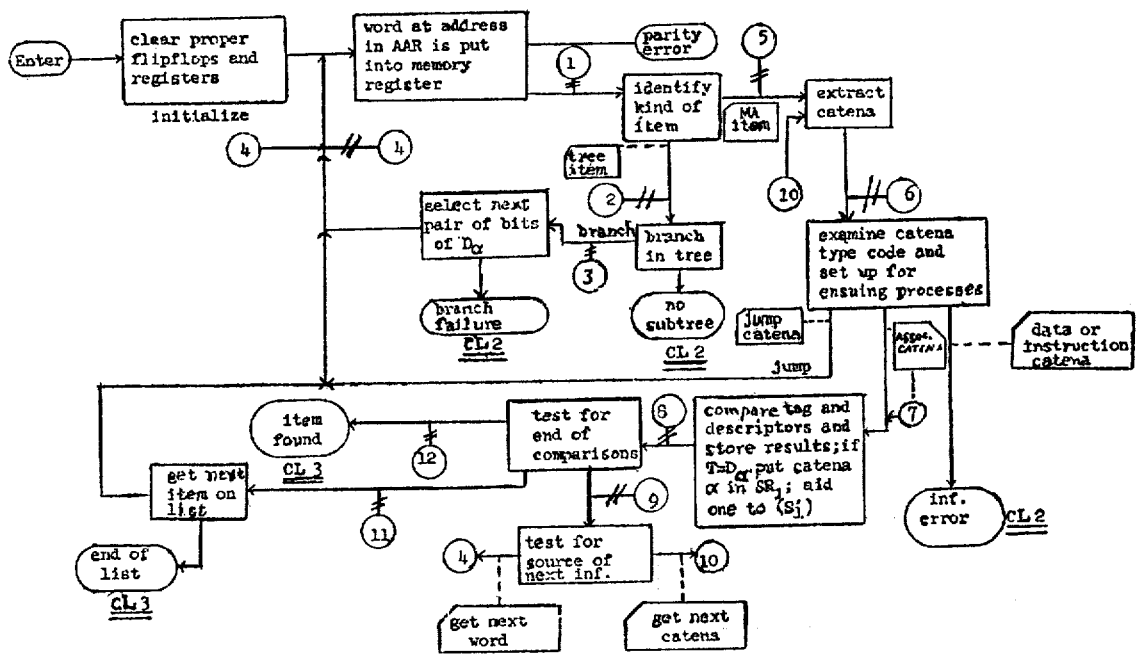

FIG. 21.—Flow chart for finding an item given its exact description

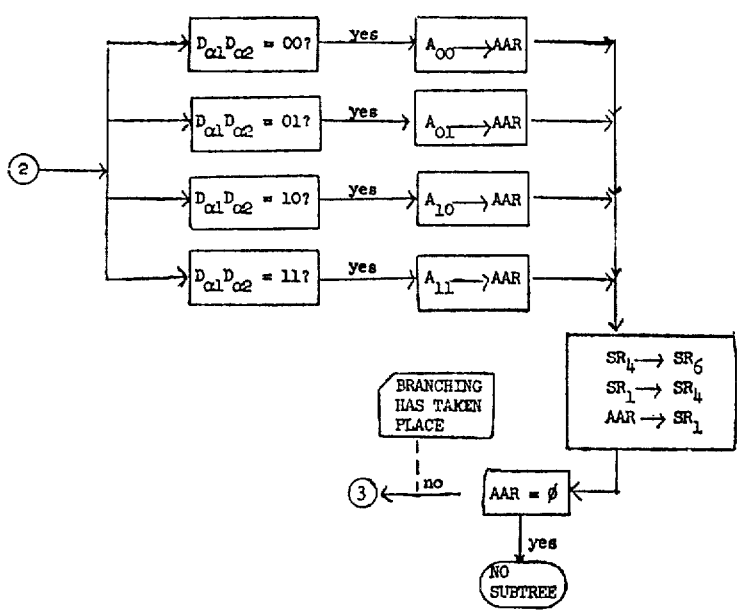
Chart III-13.—Tree branching block
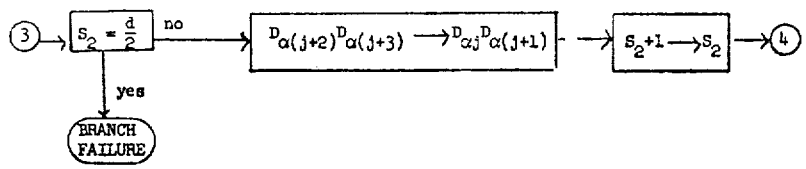
Chart III-14.—Selection of next pair of bits of $D_a$
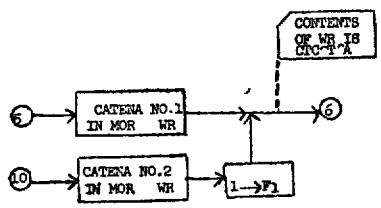
Chart III-15.—Catena extraction block
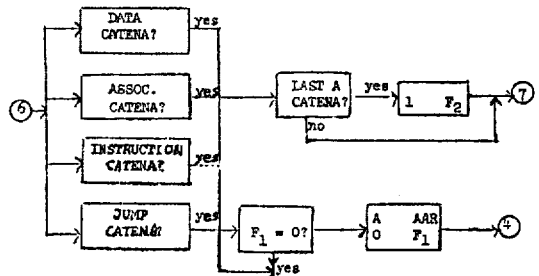
Chart III-16.—Catena examination and sub-process selection block
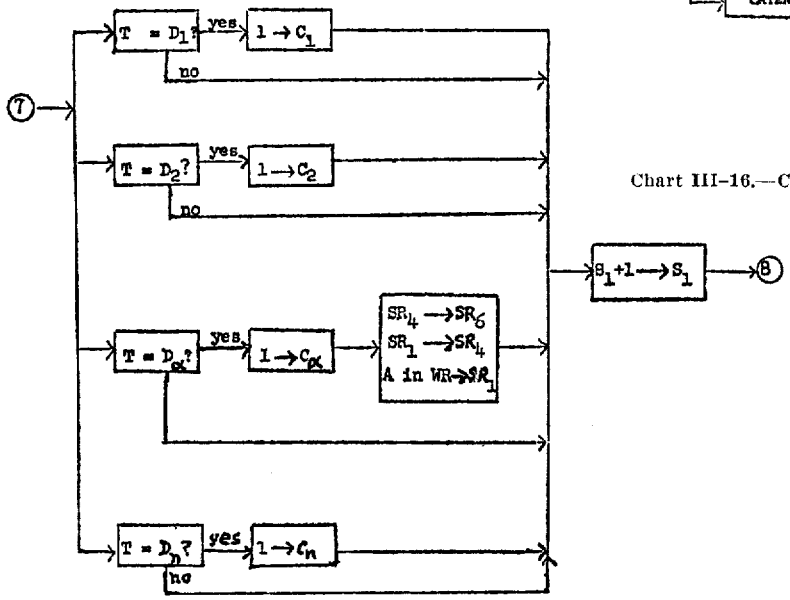
Chart III-17.—Tag-descriptor comparison and recording block

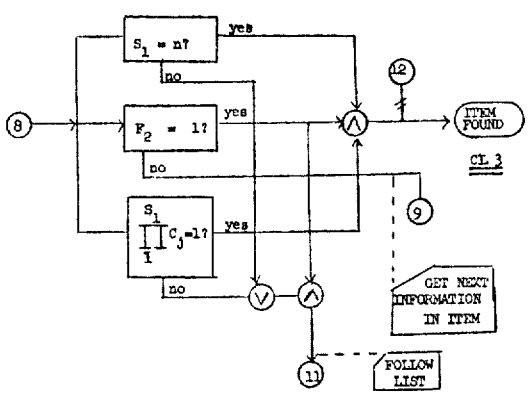

Chart III-18.—Test for end of comparison block list memory position N is N+1 unless the ML memory position N+1 is defective. If it is, then the address in position N is N+2 unless, etc. In the initial state of the multi-list memory all usable positions except position $\varphi$ contains LAS words. The CTC of the associative catena in the last word in the LAS contains the "last associative catena" bit. Any space taken from LAS is taken from its head and any space returned to LAS is put in at the end so that few, if any, jump catenas are required for information storage until the entire multi-list memory has been gone through once.

Registers $SR_2$ and $SR_3$ are used. Flip-flop $F_3$ is also used. $SR_3$ contains $\phi$ or the address of the previous space extracted from LAS. $SR_2$ contains the address of the first space in LAS. The flow chart for taking from LAS is shown in Chart III-21 and the various blocks are detailed in chart III-22.

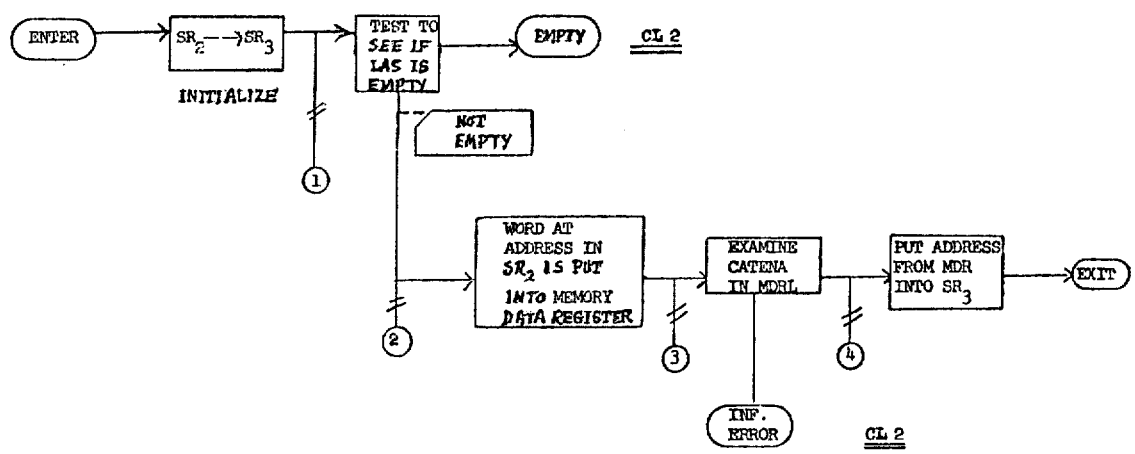

Chart III-21.—Process flow chart for taking from LAS

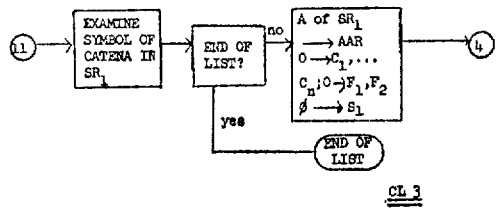

Chart III-19.—List following test block

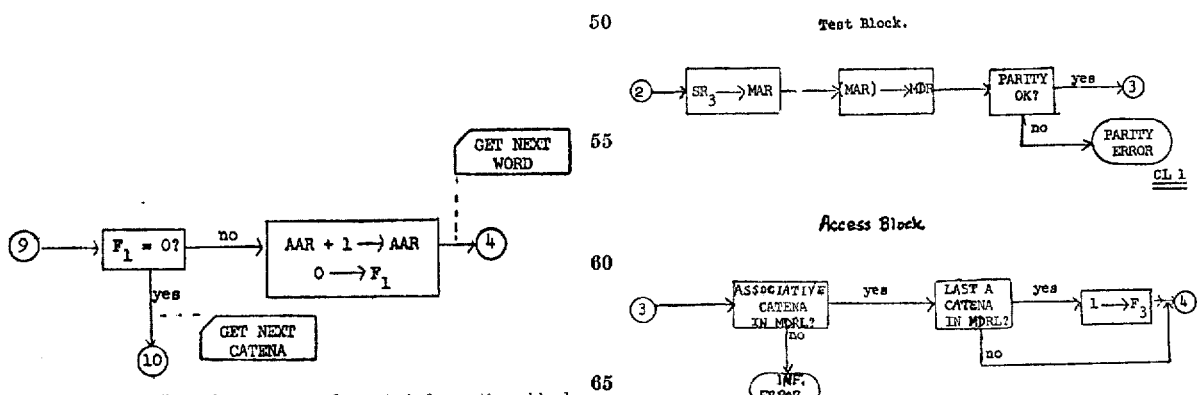

Chart III-20.—Test for source of next information block (3.2) *Taking from list of available space.*—An LAS word is shown in Chart III-8c of chapter 1, Section III, of this approach. The LAS contains such a word in each position. The address in the associative catena of multi- Chart III-22.—Detail for taking from LAS (3.3) *Putting in list of available space.*—In this process it is assumed that the address of the last word in LAS in stored in $SR_7$ and that the address of the space to be put in LAS is in MAR. The space is put in at the end of LAS. The process is a simple one and is detailed in Chart III–23.

We are given the keys of the item $T_1, T_2, \ldots T_n$ and $p$ "data" segments which may be instruction or data catenas. There must exist a process which puts $T_j$ into $R_j$ ($j=1 \ldots n$), assigns catena type codes, and puts the $p$ data segments into $R_{n+1} \ldots R_{n+p}$. It will be assumed that this process has been executed and we are

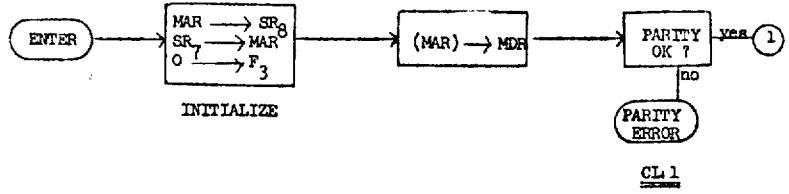

Extraction of Former Last Word in LAS.

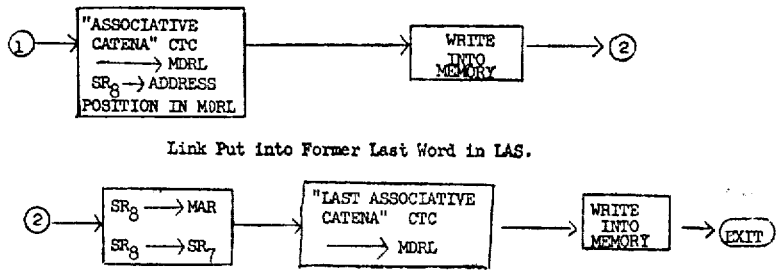

Link Put into Former Last Word in LAS.

New Last Word Updated.

Chart III–23.—Process flow chart for putting in LAS (3.4) *Item filling.*—When an item is filled, it cannot be assumed that the tree has been built or even that the tree exists. Hence, it is necessary to build the part of the tree that is needed for future retrieval of the item. The process that builds the tree contains the self-organizing feature of the multi-list system. If there are $n$ keys in the item, there are $n$ associative links from the tree to the item. Thus the tree must be traversed $n$ times in order to file the item.

ready to file the item. There are three major steps in the filling of the item. These are: the reservation of the memory space for the item; the building of the tree together with establishment of the associative links to the item; the sending of the item to the memory. These steps are shown in the macro-flow chart for the item filling process in chart III–24.

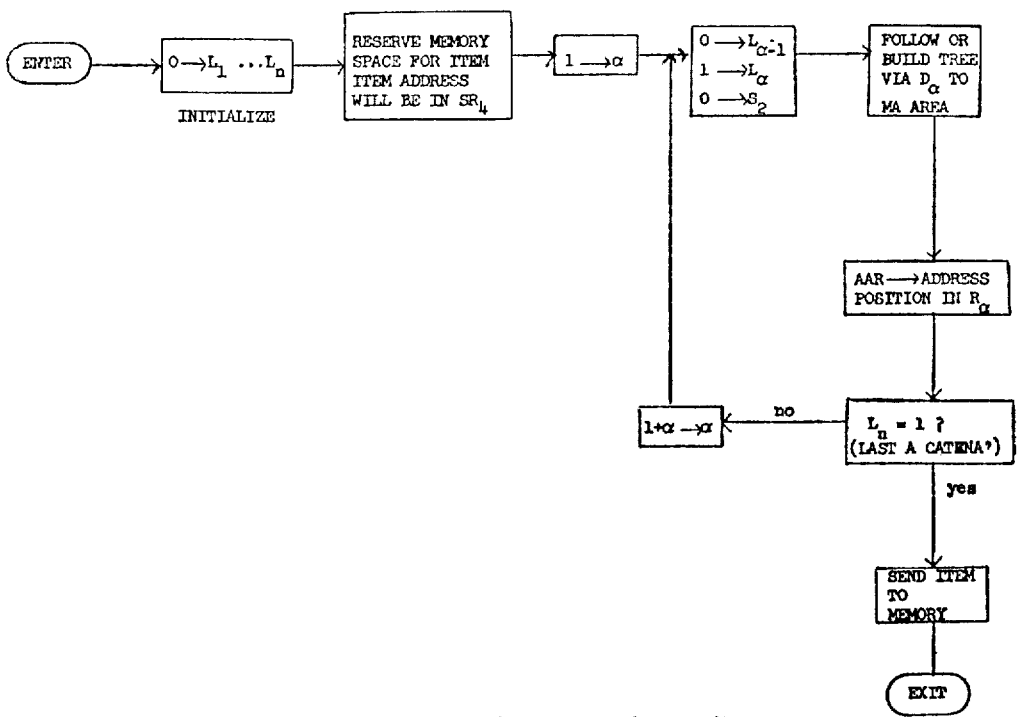

Chart III–24.—Process flow chart for filing an item

In the reservation of the memory space for the item, registers $R_1', R_2', \ldots R_n'$ are used to store jump catenae if necessary. The flow chart for this process is shown in chart III-25.

item type bit is "zero" for a tree item and "one" for a multi-association item. The process flow chart for building a tree is shown in chart III-26. It is assumed that $L_a$ is set and $R_a$ contains $T_a$ and the proper CTC. Also

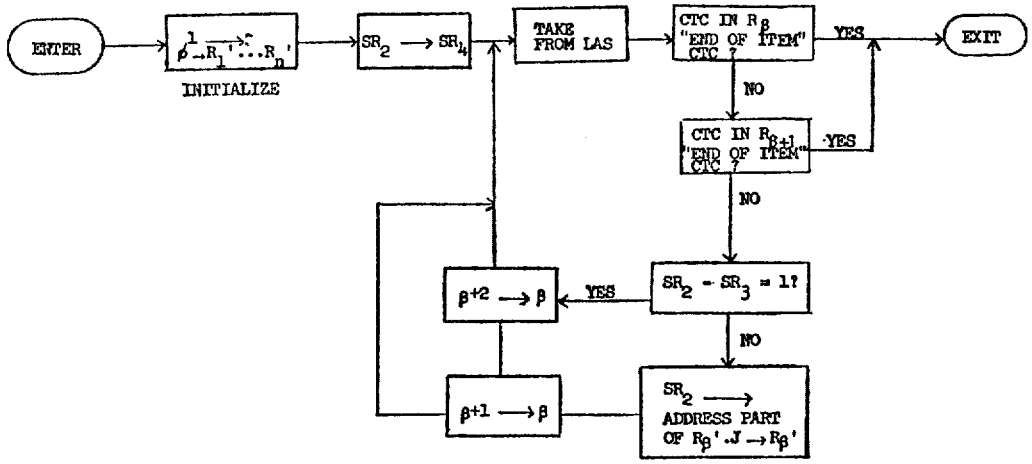

Chart III-25.—Process flow chart for reserving ML memory space for item

For building a tree, it is assumed that odd parity over an even number of bits is used in a multi-list memory word, so that a blank position contains a "one" in the parity bit position. Hence, the process is simpler if the it is assumed that the initial state of the machine, $SR_2$ contains unity, the address of the first space on LAS. Some of the blocks in chart III-26 have been used before and may be found detailed in previous figures.

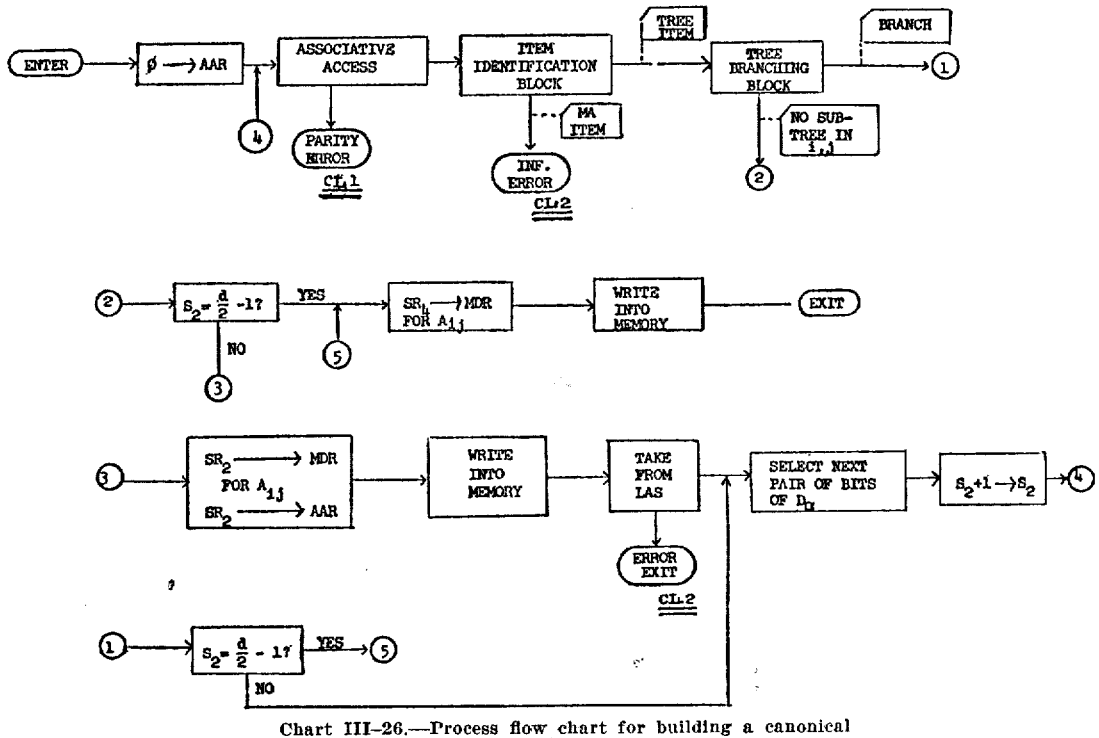

Chart III-26.—Process flow chart for building a canonical tree

At the conclusion of the establishment of all the associative connections, the item must be sent to the memory. The item address is in $SR_4$ and the item is completely constructed and is in registers $R_1 \ldots R_p$ and $R_1' \ldots R_n'$. The flow chart for this process is shown in chart III-27.

The process of item deletion is more complex than any of the processes considered so far. It is assumed that the item has been found as a result of a "find item" process. Once the item has been found, it is necessary to break all of the associative connections, erase the item, and re-

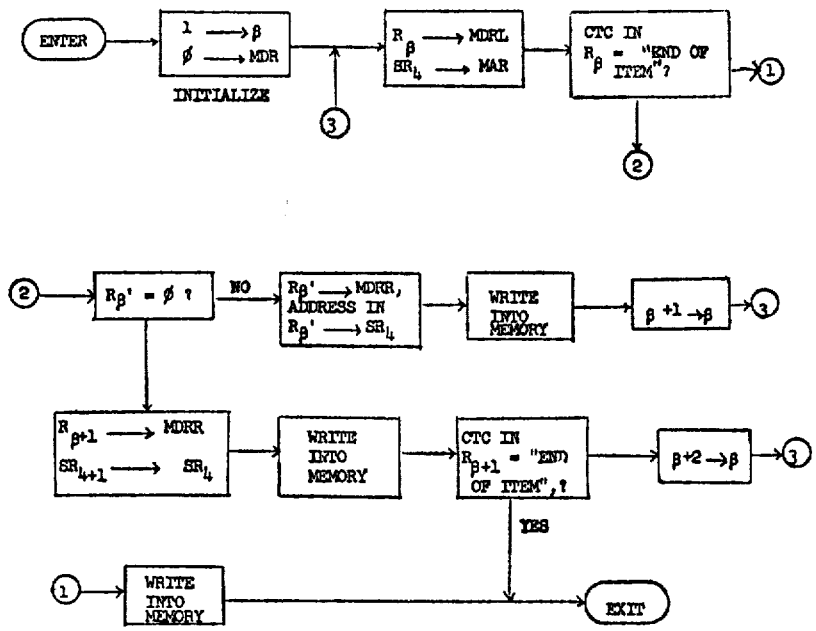

Chart III-27.—Process flow chart for sending an item to the ML memory (3.5) *Item deletion*.—There is indisputable evidence that no process corresponding to item deletion exists in the human mind. However, there do exist processes in the human mind which correspond to the modification of an item. In the multi-list system, it is conceptically simpler (but not necessarily more efficient) to modify an item by deleting it and then filling it after modification. Also, in a machine with limited memory capacity it is necessary to be able to erase unwanted or obsolete information. Hence, it is necessary to have a process of item deletion.

turn the vacated space to LAS. The macro-flow chart for this process is shown in Chart III-28.

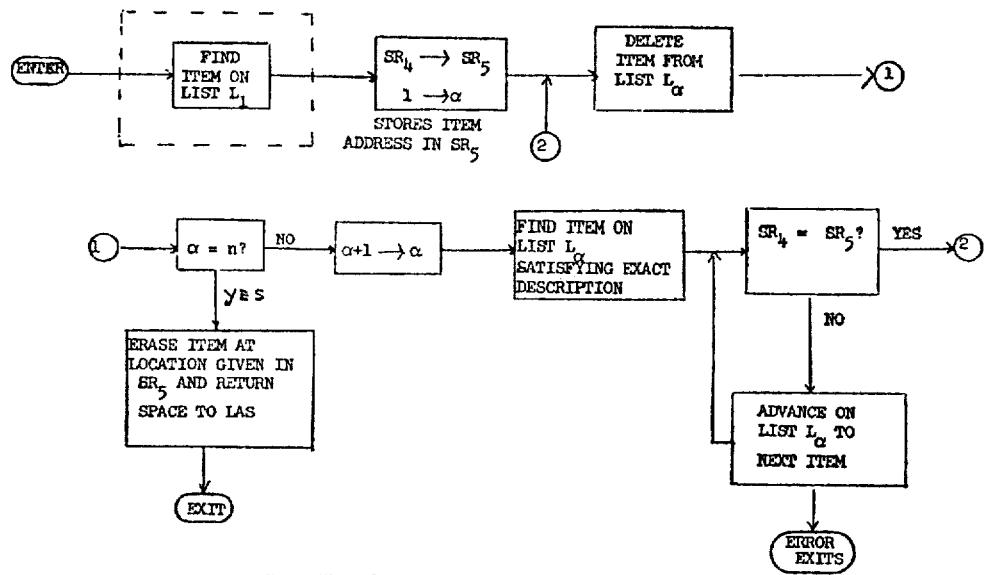

Chart III-28.—Process flow chart for item deletion

In order to break all the $n$ associative connections, the addresses of the locations referring to the item must be stored. This is done in the tree branching block (Chart III-13) and in the key-descriptor comparison and recording block (Chart III-17) of the "find item" process. This information is stored in both blocks because the item to be deleted may be either at the exit of the tree or buried deep in the multi-association area. With this information stored, the item can be deleted from a list. The process for this deletion is flow charted in Chart III-29.

scription at the list following the test block (Chart III-19).

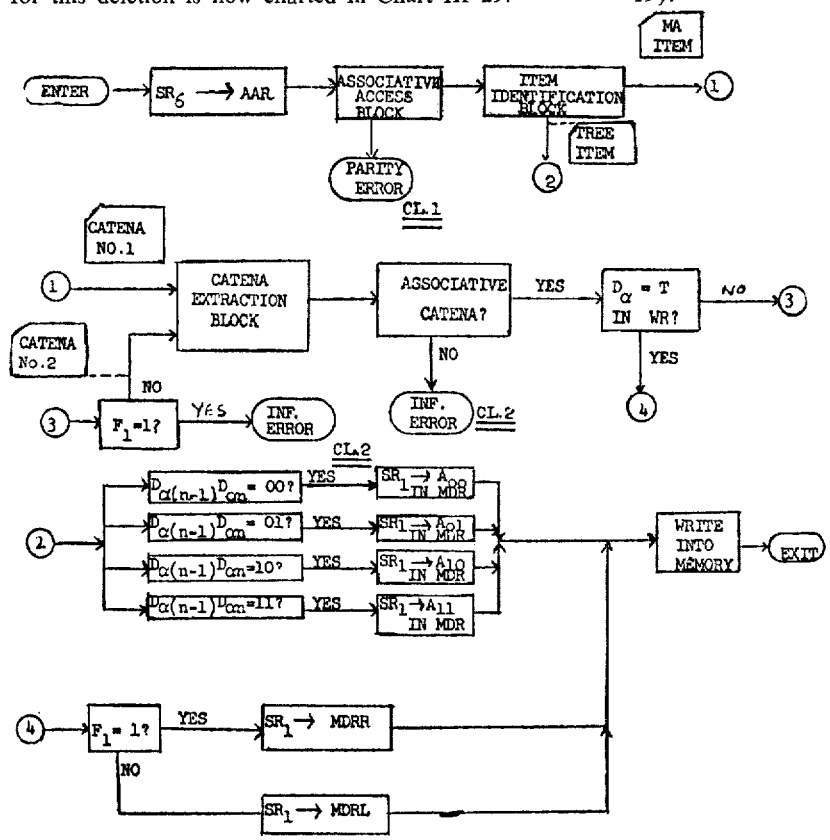

Chart III-29.—Process flow chart for deletion of item from list $L_a$

The block titled, "Advance on list $L_a$ to next item satisfying the exact description," is not flow charted, since this process can be accomplished by entering the process flow chart for finding an item that is given an exact description at the list following the test block (Chart III-19).

The process flow chart for erasing an item at a location given in $SR_5$ and the return of the vacated space to the LAS is shown in Chart III-30.

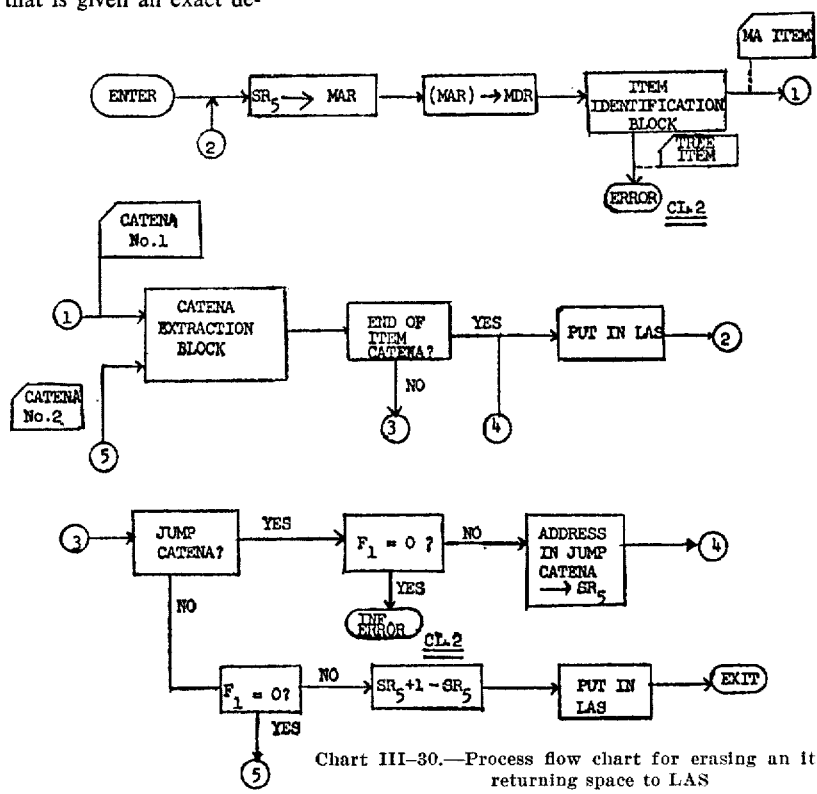

Chart III-30.—Process flow chart for erasing an item and returning space to LAS (3.6) *Advancing on a list.*—To advance on a list, enter the process for finding an item given an exact description at the list following test block (Chart III–19).

(3.7) *Item readout.*—The item readout process consists of taking an item from a known position (item address is in $SR_5$) and putting it into the register $R_1, R_2 \ldots$ Jump catenas are put into registers $R_1', R_2', \ldots$ Such a process would be useful if, for example, an item is found and it is to be transferred to the output processor. The flow chart for this process is shown in Chart III–31.

tion of the multi-list language to control. To select exits, a process exit designator must be included as part of the order type of the basic process. This way of achieving exits from subroutine is in keeping with the philosophy that the control memory and processor registers should simulate wired in logic as it avoids any need for modifying the contents of any control memory positions.

(4.3) *Control memory instructions.*—The development of an efficient set of instructions for the control memory would require that all the basic processes be known and

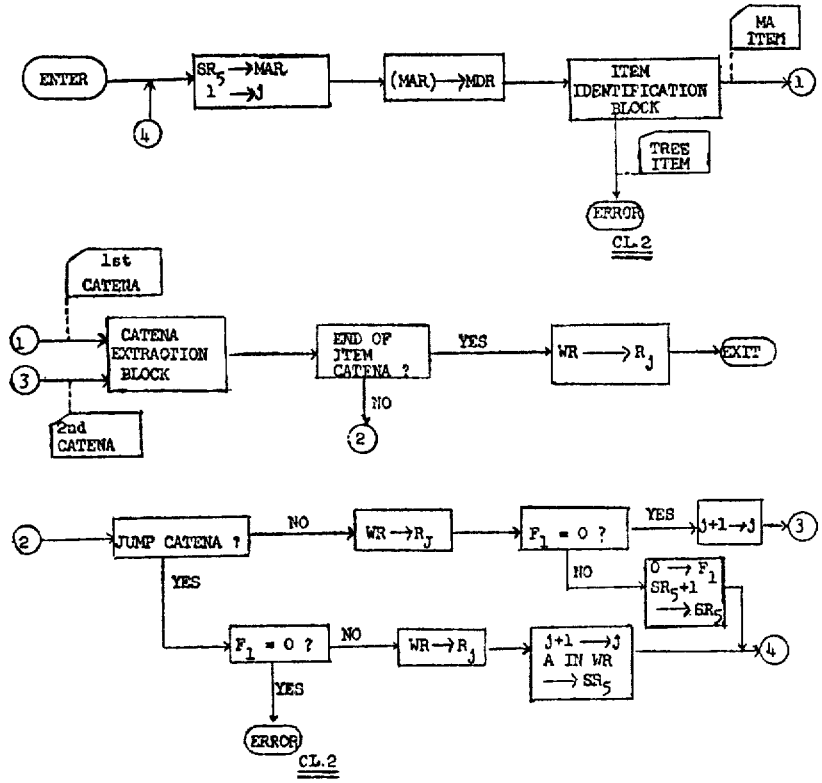

Chart III–31.—Process flow chart for item readout

(4) Mechanization of basic processes

In this section we will discuss how the basic processes are mechanized using the control memory.

(4.1) *Discussion.*—As noted before, it appears that it is more efficient to store the sequencing information for the elementary steps that constitute the basic processes in a separate storage unit called the control memory. The control memory, together with the processor (working) registers and such units as adders, comparators, etc., must perform the sequential logic that is to be carried out by the processor. In sequential logic, information is transferred from one register to another through combinational logic and under the control of the contents of flip-flops, counters, and registers. The combinational logic may add quantities, compare them, or perform word dissecting operations. By the use of the technique of relative addressing, it is possible to have the sequence controlling registers as part of the processor registers. In this way, the contents of the control memory need not be changed during the execution of the basic processes and, therefore, it can be the more efficient read only memory.

(4.2) *Control memory organization.*—A basic process will consist of a sequence of instructions in the control memory. It will be entered at some control memory address which will later serve at part of the order type of the basic process (chapter 3). To provide a means for using sub-processes in several different processes without having to store the control memory instructions more than once, exits must be provided for. This provision will be achieved by means of exit choice instructions, an adaptaflow-charted. Then elementary operations would be grouped to form a tentative set of instructions. The basic processes would then be programmed and modifications made in the instructions to maximize efficiency. Recall that our measure of efficiency is the reciprocal to the product of time and cost. As the complexity and number of the instructions increase, there is a tendency for processing time to be reduced; however, the cost of the equipment required to mechanize the control memory instructions tends to increase as the complexity and number of the instructions increase. For example, if the total equipment cost is $c_0 + c_1 n$ and the time is $c_2 + c_3/n$ where $n$ is the number of different instructions, maximum efficiency occurs when $$n = \sqrt{\left(\frac{c_0}{c_1}\right)\left(\frac{c_3}{c_2}\right)} \quad (1)$$

Since the cost of the mass memories can be expected to be quite large, $c_0 \gg c_1$ while $c_3$ is probably the order of magnitude of $c_2$. Eq. 1 suggests that the optimum number of control memory instructions will be quite small. This suggests an approach to the choice of control memory instructions that avoids the computation of efficiency factors. (The computation of precise efficiency factors at this stage of the multi-list system design would be premature as cost and time figures are known only to rough orders of magnitude.) This approach is:

(a) From the flow charts devise those instructions that approximately keep all units equally busy.

(b) Improve the efficiency of those that are essential such as transfers and compares.
(c) Devise only those additional ones that give a marked reduction in processing time.

In this section the initial results of step (a) will be presented. Initial results of attempting step (b) are given in the next section.

So far, ten categories of instructions have been found. These are:

(1) Multi-list memory operations
(2) Transfers
(3) Comparisons
(4) Shifts
(5) Arithmetic operations
(6) Flip-flop operations
(7) Tests
(8) Branches
(9) Control operations affecting basic logic
(10) Input-output operations.

A partial list of these control memory instructions follows. Each exit refers to the position in the control memory where the next instruction is located. Other information provided includes the operation code and the addresses of any working registers, counters, or flip-flops that are affected.

(1) *Multi-list memory operations*

These operations are performed by the memory synchronizer and are the minimum that are necessary, since they do not include read, write, or erase item.

(a) *Memory access (RM).*—In this instruction, the word (2 catenae) at the multi-list memory location, given in MAR, is transferred into MDR.

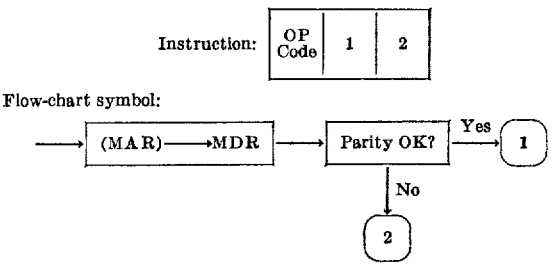

(b) *Write into memory (WM).*—In this instruction, the word in MDR is put into the multi-list memory position given in MAR.

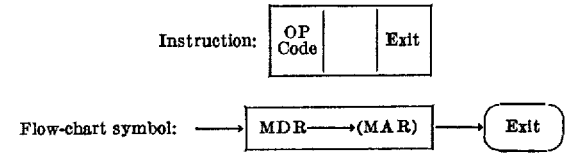

(2) *Transfers*

These instructions transfer information among working registers including the MAR, MDR, WR, and D registers. Since the D register can hold only two bits, the catena stored in it is assumed to have the form: BIT, BIT, 0, 0, 0, . . . .

(a) *Address transfer type 1 (TA1).*—This instruction transfers the address portion of register α into the address position of register β.

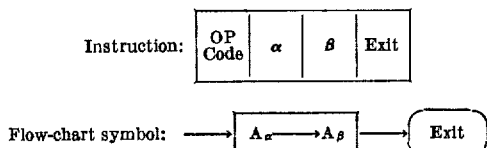

(b) *Address transfer type 2 (TA2).*—This instruction transfers the address portion of register α into the address position of register β where α is in register γ and is treated as a binary fraction in γ.

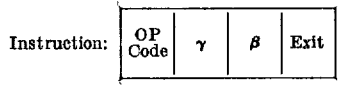
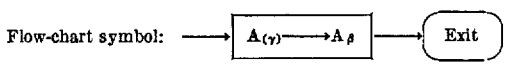

(c) *Address transfer type 3 (TA3).*—This instruction transfers the address portion of register α into the address portion of register β where β is in the address position of register γ. Contents of γ are treated as a binary fraction.

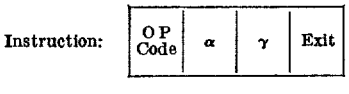
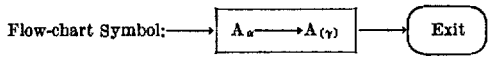

(d) *Catena transfer (TC).*—This instruction transfers the catena in register α to register β.

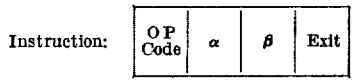
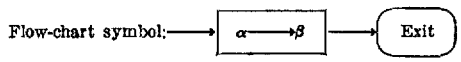

There are as yet no single instructions for the transfer of descriptors or symbols.

(3) *Comparisons*

These instructions compare significant portions of one working register with another. Previous remarks about the registers apply.

(a) *Descriptor comparison type 1 (CD1).*—This instruction causes the comparison of the descriptor in register α with the descriptor in register β.

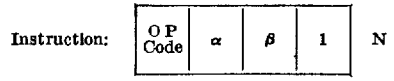
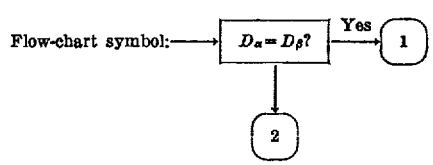

(b) *Descriptor comparison type 2 (CD2).*—This instruction compares the descriptor in register α with the descriptor in register β where α is in register γ.

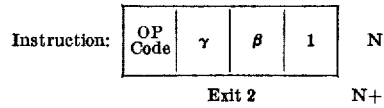
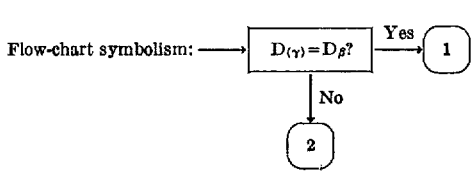

(c) *Compare on equality (CE).*—This instruction compares the contents of register α with that of both treated as binary fractions.

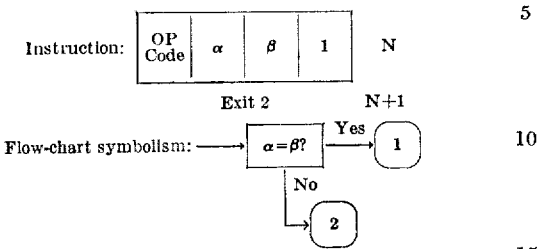

(4) *Shifts*

These operations affect a single register.

(a) *Arithmetic shift (SA).*—This operation is the equivalent of multiplying by $2^{\pm n}$. Shift contents of register $\alpha \pm n$ places. Ignore overflow.

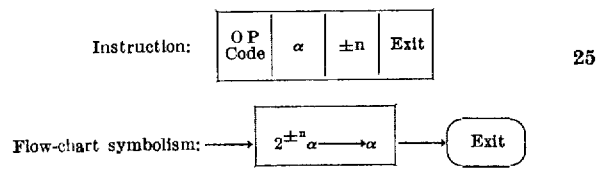

(b) *Shift into D (SD).*—Descriptor in register α is shifted left two places. Overflow is put into D register. Previous contents of D register is erased.

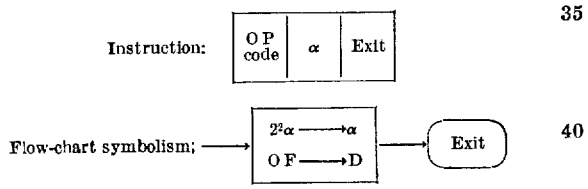

(5) *Arithmetic operations*

(a) *Add (A).*—This instruction adds the contents of two registers. Fractional binary representation is used and overflow is ignored. The purpose will usually be that of increasing the content of counter registers.

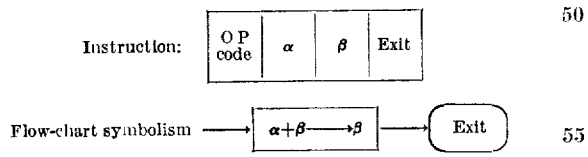

(6) *Flip-flop operations*

(a) *Set flip-flop α (FFS):*

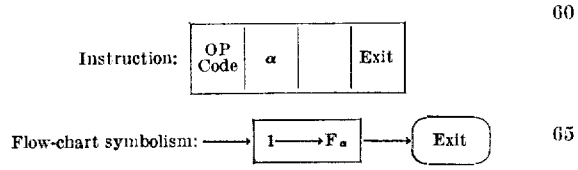

(b) *Reset flip-flop α (FFR):*

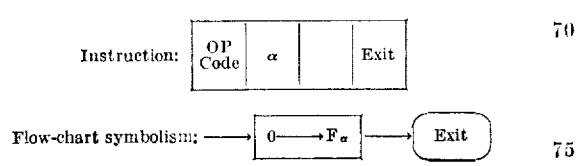

(c) *Interrogate flip-flop α (FFI):*

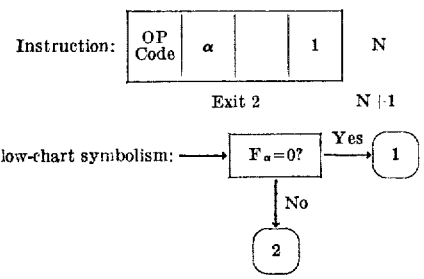

(d) *Test on $C_j$ (CJT).*—This instruction logically multiplies the bits of several flip-flops in sequence to make a choice. α And β are in registers α and β and αβ.

(b) *Symbol test #1 (catena in WR) (TS1):*

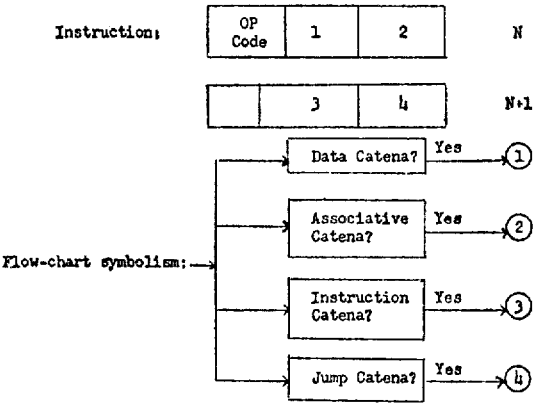

(c) *Symbol test #2 (catena in WR) (TS2):*

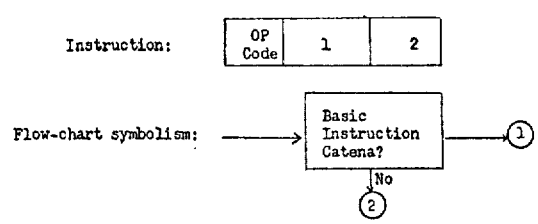

(d) *Symbol test #3 (catena in WR) (TS3):*

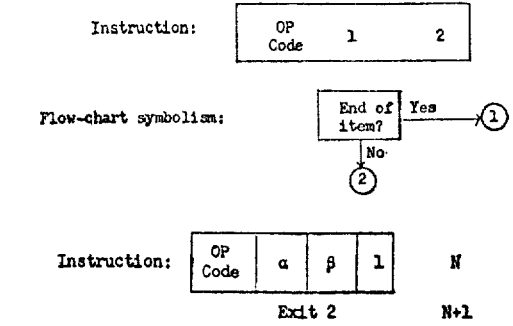

Flow-chart Symbolism:

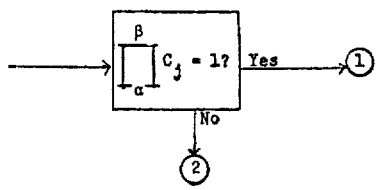

(e) *Clear $C_j$ (CJC):*

(7) *Tests*

(a) *Item identification (word is in MDR) (D1):*

(e) *Symbol test #4 (catena in WR) (TS4):*

(8) *Branches*

(a) *Branch, type 1 (on pair of bits in D register; $A_{i,j}$ are in MDR) (B1):*

(b) *Branch, type 2 (on pair of bits in D register; $A_{i,j}$ refer to the four address positions in MDR for a tree item) (B2):*

(9) *Control operations affecting basic logic*

(a) *Exit choice (EC).*—This instruction allows one to have a subroutine structure in control memory without messy housekeeping.

The order type is stored in a register as yet undesignated. The details of the transfer of control to the IPDLR have also not been worked out.

(10) *Input-output operations*

These are more tentative than the instructions discussed above.

(a) *Input transfer (IT).*—Transfers item to working registers beginning with a register α. Item comes from input buffer register. If input buffer register is empty, machine halts until it is filled.

(b) *Output transfer.*—Transfers item to output buffer starting with register α (OT).

The size of the instructions will now be considered. The form of most of the instructions is as shown below.

If we assure there are 64 working registers, α and β each contain 6 bits. The op. code must have at least 6 bits. The number of such instructions in a basic operation is of the order of magnitude of ten. Since the number of basic operations such as "file," "delete," "retrieve," etc., is of the order of five and since these appear only once in the control memory, the order of magnitude of control memory positions needed is 100. We shall be generous and assume 1024 positions. Hence the address position contains ten bits. The total instruction contains of the order of 28 bits.

111

(4.4) An alternate set of instructions.— Let us assume 64 addressable working registers, each capable of holding a catena of the order of 40 (but not more than 64) bits in length. If single bits and groups of bits could be addressed economically, then for example, the number of kinds of transfer instructions could be reduced. For example, the transfer of a catena or address could be ordered by the same instruction provided the appropriate bit addressing is used. Also such instructions would allow other catena formats than the ones presently envisioned thereby contributing to the flexibility of the machine as a research tool.

The 64 addressable working registers are all alike except for five. These five are the "null register" $\phi$, the "unit register I, and the registers MAR and MDR. Since MDR must hold two catenae, a parity bit, and the item symbol bit, it has two addresses corresponding to its left and right halves; the item symbol bit and the parity bit are in the left half. MDR also has a multi-list memory connection. MAR, the memory address register, also has a memory connection. It need only provide room for an address of the multi-list memory length. The null register is an addressable position which does not exist in the sense that all zeroes are stored there. The unit register also is an addressable position which is the equivalent of a register with all ones stored in it.

Unless otherwise stated, the bits in a working register are numbered as follows (40 bits assumed):

$$a_{39} \ldots a_2 a_1 a_0$$

(1) Multi-list memory operations

These are unchanged.

(2) Transfers [Type 1 (T1)]

(a) This instruction transfers the bits S to F inclusive in register $\alpha$ to register $\beta$ after being shifted by $\pm n$ ($n=32$). Bits previously occupying space transferred into and overflow bits are deleted. All other bits are unaffected.

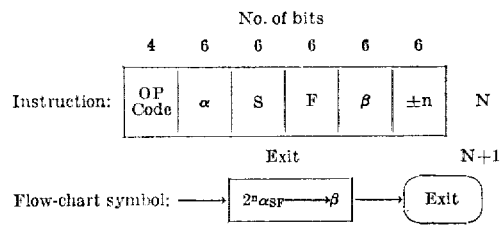

The total bits required are seen to be of the order of 34 instead of the 28 bits previously required. The total number of instruction types required is considerably less than before. Hence, it is suspected that this is more efficient set of instructions from the cost-speed point of view.

(b) *Transfer type 2 (T2).*—This indirect address type of transfer instruction transfers bits S to F inclusive in register $\alpha$ to the corresponding positions in register $\beta$ where $\alpha$ (6 bits) may be found starting at P in register $\gamma$.

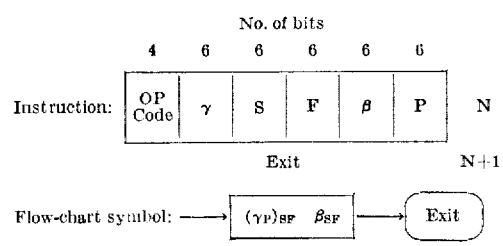

(c) *Transfer type 3 (T3).*—This instruction transfers bits S to F inclusive in register $\alpha$ to the corresponding

112 positions in register $\beta$ where $\beta$ (6 bits) may be found starting at P in register $\gamma$.

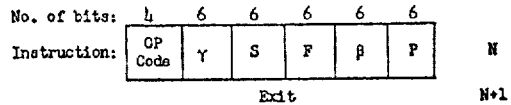

(3) Comparisons (a) *Compare type 1 (C1).*—This instruction compares bits $2^nS$ to $2^nF$ inclusive in register $\alpha$ to bits S to F inclusive in register $\beta$ assuming that the string of bits $\alpha_{SF}$ and $\beta_{SF}$ are treated as binary numbers.

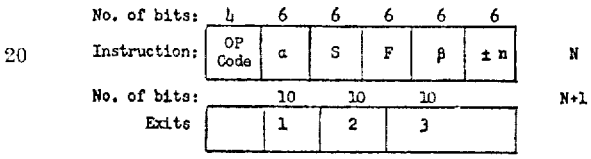

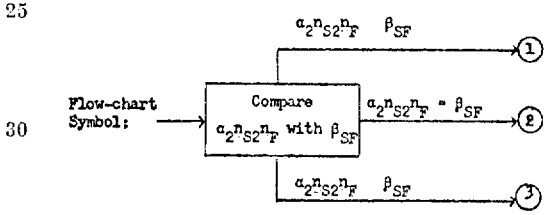

(b) *Compare type 2.*—This indirect addressing instruction compares bits S to F inclusive in register $\alpha$ to the corresponding bits in register $\beta$ assuming that the strings of bits $\alpha_{SF}$ and $\beta_{SF}$ are treated as binary numbers where $\alpha$ (6 bits) may be found in register $\gamma$ starting at P.

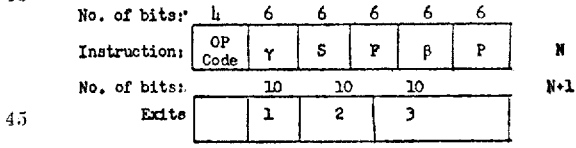

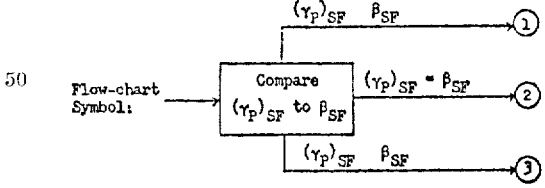

(4) Logical operations (a) *Logical multiplication and negation (L).*—This instruction evaluates the logical product of the bits $S_a$ to $F_a$ inclusive in register $\alpha$, where $\alpha$ $S_a$ $F_a$ is at $\gamma S_\gamma$ (18 bits), negates the result, and places it in register $\beta$ at position P.

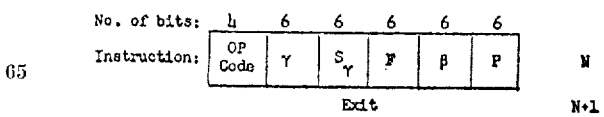

(5) Arithmetic operations (a) *Add (A).*—This instruction adds the contents of registers $\alpha_{SF}$ and $\beta_{SF}'$ putting the result in $\beta_{SF}'$ treating the quantities as integers and neglecting overflow. Bit numbering for $S=2, F=5$:

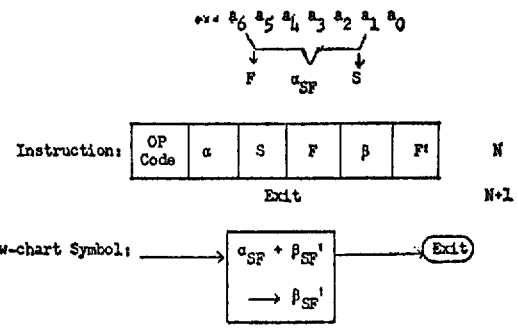

(6) The control operations affecting basic logic are as before.

(7) The input-output instructions are as before.

Chapter 3—Built-In Automatic Programming (1) *Introduction*

The purpose of this part of the multi-list system study is to find the basic process or processes that are indispensable to the operation of a variable control machine capable of utilizing an indefinitely expandable language. Once they are found, they can be mechanized using the control memory instructions. As stated by S. Gorn in letter to the editor, Communications of the Association for Computing Machinery, vol. 1, No. 1 (January 1958), pp. 2–4:

"Edvac had a three-plus-one address word structure. The tendency has since been definitely toward one-address hardware and three-plus-zero address pseudo-codes. Programming and coding for Edvac was more logical and easier, redundancy in the use of that fourth address notwithstanding. Sentences with only one verb and one noun simply do not express big enough thoughts for most people. We want a language system in which each sentence has one or more verbs and an indefinite number of nouns. We want machine (or pseudo-machine) words to be complete sentences. In other words, we want variable instruction-word-length machines.

"Furthermore, we want to be able to add new words to our language whenever they can be defined in terms of previous words. We want to be able to refer to complicated thoughts by single words. These thoughts can be orders or names, verbs or nouns. Thus we want the language to have such a structure that its indefinite expandability is part of its everyday use. We want a variable control machine so that the order types, i.e., the verbs may be varied. Note that this is a feature the original Eniac had, though the variation was by handwriting."

One may ask what has caused us to develop wants such as those spelled out by Gorn here. The answer may be that computing machines are being used to solve problems that human beings can solve or at least can formulate. These problems are always formulated initially in a language that humans such as programmers, mathematicians, etc., find convenient to use. Hence, it would follow that programmers would want to communicate with the machine in their own language.

Such a language always has a forced structure because the language is a product of the human mind, that can realize only a language structure with which it is humanly familiar. This suggests that we might be able to find clues as to what the basic processes of the human mind are by analyzing the verbal productions (oral and written) of humans. (We are interested in what the basic processes of the human mind are because it appears to have some of the characteristics of the variable control, indefinitely expandable language machine we wish to design.) Obvious productions to study are those programs and programming languages developed for scientific and business data processing, information retrieval, etc. Less obvious areas are those of education, the foundations of mathematics, the art and science of engineering, etc. The difficulty that is encountered in the study of these human productions is the separation of the basic processes themselves from the information that is processed by these basic processes. This is a skill that has to be acquired and the study that is in course to develop this skill has caused a learning process to occur, the study of which has been helpful itself.

It has become clear that one cannot become an expert on matters of the mind by reading a few books and popular articles just as one is not a concert pianist, after a year's study of the piano. However, our defense is that at this stage we are not interested in designing a machine that exactly duplicates the working of the mind but that we are interested in mechanizing only those processes that we think will be of value so that our ignorance is less of a handicap than if we were interested in giving psychotherapy or doing research in psychology.

We have seen in a previous chapter how the structure of free associations suggested the multi-list structure. We have also seen how we have made use of the fact that all we know of the world has been received through our senses so that our complex languages and ideas should be factorable into sensations. From the analog character of the nerve cell and the nature of the afferent pathways, we see in another way that a sensation is characterized by type and intensity, such as the intensity and color of the sensation we may perceive in a specified portion of the visual field. Such a sensation is analogous to the attribute and value meaning that by coding can be put into the key that accompanies an item. Other onclusions, briefly stated, obtained by joining psychological, physiological and other knowledge are:

(1) Complex actions such as the tying of one's shoes are decomposable into elementary actions, for instance, the contraction of a muscle. This is also true of speech.

(2) We know only that which we have been taught or have acquired by instinct. If a person had never been taught to tie his shoes, he would not be able to do it except by chance. "By example" is assumed here to be a method of instruction (we do not know whether minicry is learned or instinctive).

(3) Understanding of a process consists of the individual being able to perform all the sub-processes making up the process. This also applies to data in the understanding of a data item consists of the indivual being able to relate the data to basic sensations and their association.

(4) At very early ages, a person is more receptive than when older in that initially he files all information proffered developing selectivity only through experience.

When a person is required to execute a process which he does not understand, he generally looks for an explanation unless he has been conditioned not to. If no explanation is forthcoming, he does nothing in connection with it unless he has been taught to achieve understanding by "research" (which is born of frustration). If the situation is one requiring immediate action (in his opinion) for survival, he acts as he did when he first experienced (and repressed) a similar situation and that is with the rage or fear of the infant. Depending on the extent of his understanding and his conditioning he may or may not repress the memory of the whole incident. These phenomena of repression are, as is well known, at the root of every neurosis. It is the opinion of at least one worker who has cured some of its victims that schizophrenia, the most common psychosis, differs from a neurosis only in the severity of the illness, i.e., the number of and terror in these repressed memories. Thus, no additional basic processes were found to be operative in this disease.

The above conclusions about human data processing have served as a guide in the development of the material in the next two sections. The reader should have no difficulty in detecting where we have used these processes and also where we have deviated from their direct application.

(2) Definitions and symbols

We now will develop the means by which the multi-list system can be made to operate as a variable control machine capable of utilizing an indefinitely expandable language insofar as the execution of processes is concerned.

There are two types of instruction catenae:
(a) Basic
(b) Descriptive

A "basic" instruction catena has a direct hardware connection in that it contains an order type which would be sent to a list operation order type selector for decoding. When the processor is mechanized using a control memory, this order type contains the location in the control memory of the beginning of the set of instructions that are to be carried out by the processor. Exits are achieved from the control memory without necessity for address modification by means of exit choice instructions. This is in keeping with the philosophy that the control memory and working registers should simulate wire-in logic. The form of the basic instruction catena is shown in Chart III–31a.

A set of descriptive instruction catenae provides a process name. Hence the form of a descriptive instruction catena will be as given in Chart III–32.

At the present time it appears that $n$ will be of the order of 2. Since in some cases more than two keys may be required to name a process, it is necessary to provide information in the catena to indicate the end of a process name since an instruction item may contain several basic instructions or processes to be performed in sequence. This function is provided by the catena type code. At present, the catena type code has the following forms:

(a) Data catena
(b) Associative catena
(c) Instruction catena
(d) Jump catena
} 2 bits.
(e) End of item catena (1 bit)
(f) Last associative catena (1 bit) (in descriptive instruction catenae this bit marks end of process name).
(g) Descriptive or basic instruction catena (1 bit).

A typical process is shown in Chart III–33. It can have several entrances and it has several exits which have been classified according to whether they result from an equipment error (class 1), or from a detectable program error (class 2), or from a normal consequence of a program (class 3). The process shown is the *basic* process of finding an item given its exact description. Some of the other basic processes known are as previously stated "File Item Found," "Print Item Found," "Find Next Item," and "Delete Item Found." While the last one does not appear in the human, it may be necessary for economical processing of data in a machine.

Suppose that a process named THINK is executed by executing in order, B, C, X, RUN, Y where B, C, X, and Y are basic processes and RUN is a name for a process which is executed by executing Y and B in order. The item corresponding to THINK would be THINK: Assoc. Catenae
B, C, X, RUN, Y: Instruction Catenae where B, C, X, and Y would be basic instruction catenae and RUN would be one or more descriptive instruction catenae. The item corresponding to RUN would be RUN: Assoc. Catenae
Y, B: Instruction Catenae If the machine is ordered to execute THINK, the item would be retrieved and placed in an Instruction Push Down List Register in the Multi-List memory (IPDLR) with B last in and first out. B, then C, then X would be peeled off and executed. Since these are basic instructions, they would call for the various micro-programs stored in the control memory. Normal (class 3) exits from the control would transfer control to the IPDLR. When RUN is peeled off, it is recognized as a descriptive instruction the keys of which are used to retrieve RUN from the files. RUN is then placed in the IPDLR. The IPDLR then contains Y, B, Y which are executed in turn from left to right. When the second Y process has been executed and a normal (class 3) exit has been made, the machine awaits further data or instructions from the input processor.

(3) Basic cycle

The results of a first attempt at flow-charting the basic cycle of the multi-list system is shown in Chart III–3. In analogy to the human being, the flow chart for the basic cycle must be a closed loop. The machine must be accessible only through the input system and must be initially completely open in that it must accept and file all information initially proffered developing selectivity only through experience. The complex repression process described at the end of section 1 has been abandoned in favor of the simple process in which the machine stops until its questions are answered. All data and processes built from the basic processes are filed and retrieved by name. These names can be assigned by the programmer on an arbitrary basis.

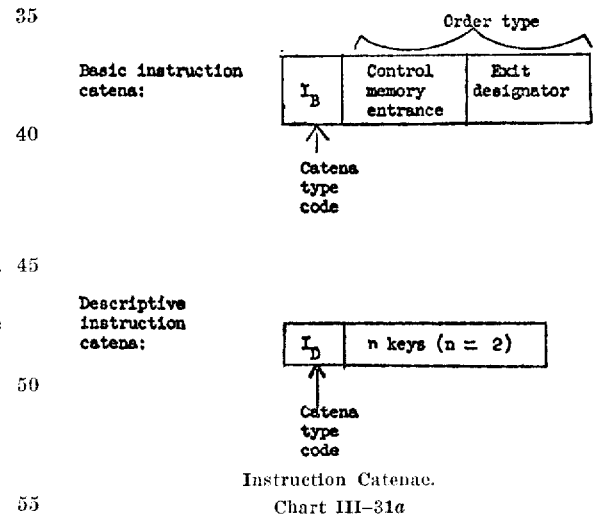

Instruction Catenae.

Chart III–31a

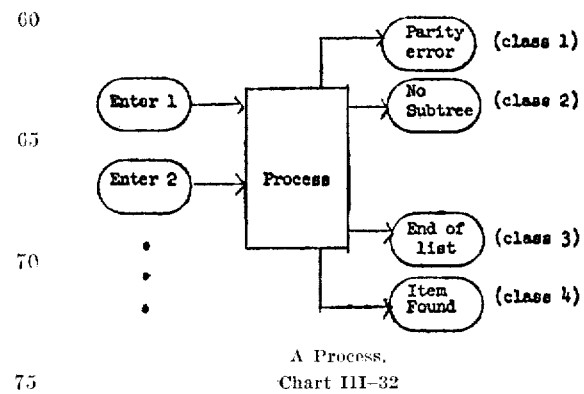

A Process.

Chart III–32

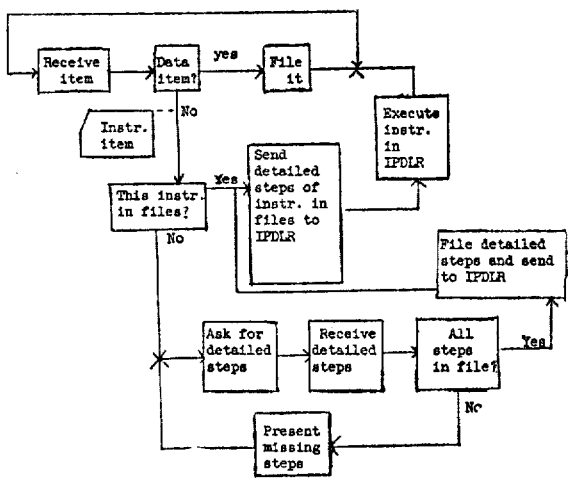

Basic Cycle.
Chart III-33

Obviously many modifications and variations of the present invention are possible in the light of the above teachings. It is therefore to be understood that within the scope of the appended claims the invention may be practiced otherwise than as specifically described.

We claim:

1. An automatic data processing system comprising
a plurality of new data inputs,
means for differentiating said data into associated parts, data parts and items,
a directory,
means for transmitting said associative parts into said directory,
an associative memory comprising a hierachy of memories,
means for filing said items into said associative memory,
a plurality of new program inputs,
means for differentiating said program inputs into associative parts, program parts and items,
means for entering the associative parts of said last-named means into said directory,
means for entering said program items into said associative memory,
a plurality of programs in pseudo language,
means for recognizing words in said pseudo language corresponding to associative words of said programs,
means for recognizing words in said pseudo language corresponding to associative words of said data,
means for retrieving from said associative memory the programs and data corresponding to the conjunction, disjunction or negation of the associative words in said pseudo language program,
means for executing said retrieved programs with said retrieved data, and
means for sending the output generated by such execution to a plurality of stations.

2. Automatic programming means, based on the interpretive mode, comprising
a plurality of new data inputs having data and associative words organized into items,
the associative words comprising a descriptor and blank spaces for the addresses,
such descriptors being in natural language,
said new data input including automatic means for the assignment of machine codes for the corresponding descriptors, and further including blanks where linking addresses are required,
a pseudo-language input of a plurality of programs defining new words,
each program having a plurality of instruction items and further including blanks where linking addresses are required,
selected programs being recursive,
a command-word and operand pseudo-langauge program input comprising a plurality of command words each accompanied by at least one operand,
the command words each being a word in the vocabulary of the pseudo-language and the names of operands each being words in the vocabulary of the descriptors,
tree growing programs having decoding means for translating a name into a storage location,
means for transmitting said new data input and said pseudo-language input to said tree growing programs,
automatic memory space assignment means including a synchronizer for providing linking addresses,
said space assignment means being fed by said tree growing program and further including means for inserting addresses in such blanks,
an executive program coupled to said commandword and operand pseudo-language input by means for selecting sentences sequentially from said program,
said executive program including means for separating the command from the operand names, means for initiating the retrieval and execution of a program corresponding to the command, and means for inserting the names of the operands in the program, and
an associative memory fed by said automatic memory space assignment means and said executive program, and in turn feeding said executive program,
said associative memory comprising at least one data tree coupled to said automatic memory space assignment means and feeding at least one multi-association area,
at least one program tree coupled to said automatic memory space assignment means and said executive program and feeding at least one multi-association area,
said last-named multi-association area being coupled to said executive program.

3. A control memory for the control of a data processing system comprising
an instruction register containing a macro instruction,
means for transmitting said macro instruction and for then translating said macro instruction into a sequence of micro instruction signals,
means for executing each said micro instruction immediately following said translation,
a plurality of logical units,
a plurality of gates coupling said register and said logical units,
means for sending said micro instruction signals to one of said gates to transfer information from said register to one of said logical units, and
means for thereafter storing such micro instruction signals.

4. A memory synchronizer coupling the output of a hierachy of memories to the input of a processor having working registers and instruction registers, said memory synchronizer comprising
a memory recirculation register adapted to receive the read output of such memories,
said memory recirculation register having means for separating and for assembling the symbols, keys and addresses thereof in words,
a memory address register and counter containing the address of the word to be read into the memory recirculation register in the read operation, and the address of the location where a word is to be stored in the store operation,
means coupling said memory address register and counter to said memory recirculation register for delivery of said address of the word thereto, and
means coupling said memory address register and counter to such memories for delivery of the address of the location where a word is to be stored in the store operation,

119 a working register address register and counter having means for controlling the flow of information between the memory recirculation register and the working register, a commond register containing the command to be executed, said command register having means coupling it to the instruction register, and means for feeding an item address from said instruction register to said working register address and counter, whereby the synchronizer with the addressable memory appears to the processor as an associative memory.

5. A multilist central processor comprising an instruction register, a control counter, a multiplicity of working registers each carrying catenae, three or less read gates coupled to said working registers for address in the catenae of said working registers, said working registers being addressable from said instruction register for obtaining the operands of an instruction and being addressable from said control counter for obtaining the next instruction, a mean combinational logic,

120 means to transmit said operands to said main combinational logic for operation thereon under the control of said instruction register, a write gate, means to deliver the resultant output of said main combinational logic to said write gate, said write gate being coupled to said instruction register for storing such output in one of the working register catenae, and means for interpreting and storing the next instruction in the instruction register.

References Cited

UNITED STATES PATENTS

| | | | |
|---|---|---|---|
| 2,843,841 | 7/1958 | King | 340—173 |
| 3,069,658 | 12/1962 | Kramskoy | 340—172.5 |
| 3,093,814 | 6/1963 | Wagner | 340—172.5 |
| 3,149,309 | 9/1964 | Schmidt | 340—172.5 |

OTHER REFERENCES

J. R. Kiseda et al.: "A Magnetic Associative Memory," I.B.M. Journal, April 1961, pp. 106, 115–121.

ROBERT C. BAILEY, *Primary Examiner.*

P. L. BERGER, I. S. KAVRUKOV, *Assistant Examiners.*